(12) United States Patent
Li et al.

(10) Patent No.: US 10,013,667 B2
(45) Date of Patent: Jul. 3, 2018

(54) DASHBOARD COLLABORATOR

(71) Applicant: Business Objects Software Limited, Dublin (IE)

(72) Inventors: Zi Qin Li, Shanghai (CN); Jinming Zhang, Shanghai (CN); Chunsen Chen, Shanghai (CN)

(73) Assignee: Business Objects Software Limited, Dublin (IE)

( * ) Notice: Subject to any disclaimer, the term of this patent is extended or adjusted under 35 U.S.C. 154(b) by 823 days.

(21) Appl. No.: 13/689,711

(22) Filed: Nov. 29, 2012

(65) Prior Publication Data
US 2014/0136489 A1    May 15, 2014

(30) Foreign Application Priority Data
Nov. 15, 2012 (CN) .......................... 2012 1 0457893

(51) Int. Cl.
*G06F 7/00*    (2006.01)
*G06F 17/00*   (2006.01)
*G06Q 10/06*   (2012.01)

(52) U.S. Cl.
CPC ..... *G06Q 10/0639* (2013.01); *G06Q 10/0637* (2013.01)

(58) Field of Classification Search
USPC ......................................................... 707/691
See application file for complete search history.

(56) References Cited

U.S. PATENT DOCUMENTS

| | | | |
|---|---|---|---|
| 2007/0101297 A1* | 5/2007 | Forstall et al. | 715/841 |
| 2007/0130541 A1* | 6/2007 | Louch et al. | 715/804 |
| 2008/0104498 A1* | 5/2008 | Molander et al. | 715/212 |
| 2011/0314403 A1* | 12/2011 | Yan | G06Q 10/067 715/772 |

OTHER PUBLICATIONS

Kloosterman, Eddo, "Providing Web-Based Publish-On-Demand Software With a Networked Business Strategy", Oct. 2, 2009.*

* cited by examiner

*Primary Examiner* — Tuan A Pham
*Assistant Examiner* — Muluemebet Gurmu
(74) *Attorney, Agent, or Firm* — Klarquist Sparkman, LLP

(57) ABSTRACT

Described herein is a technology for designing a dashboard. In some embodiments, first and second dashboards are provided. Conflict analysis on the first and second dashboard is performed. The conflicts are resolved if any conflicts are detected. The first and second dashboards are merged to form a merged dashboard if no conflicts are detected or after resolving the conflicts.

20 Claims, 63 Drawing Sheets

310

320

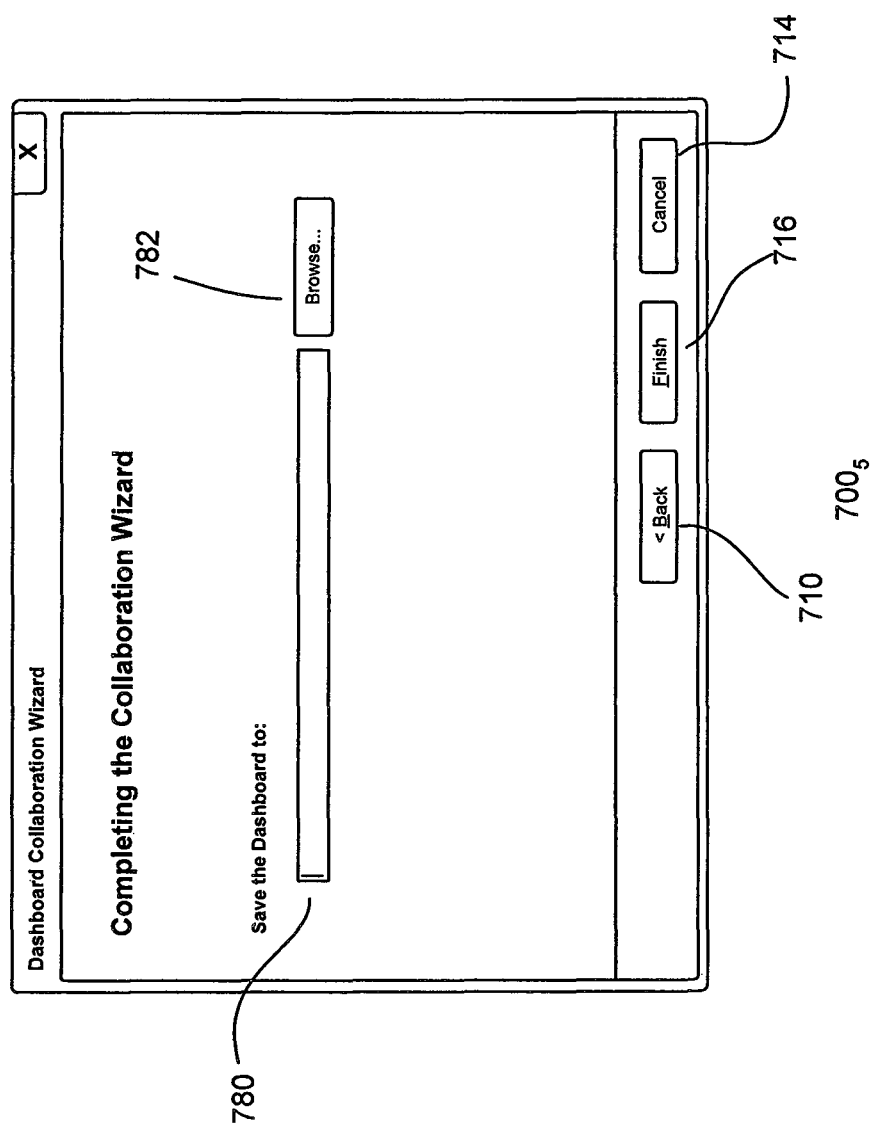

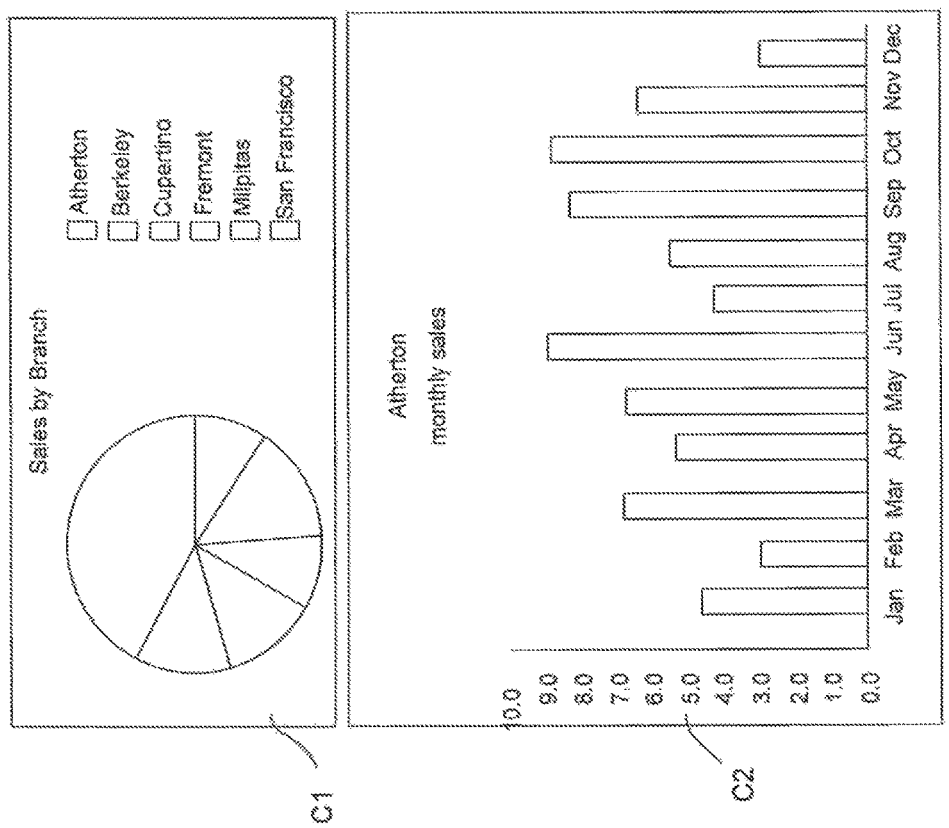

| | A | B | C | D | E | F | G | H | I | J | K | L | M | N |
|---|---|---|---|---|---|---|---|---|---|---|---|---|---|---|
| 1 | Insert in Range | | | | | | | | | | | | | |
| 2 | | | | | | | | | | | | | | |
| 3 | | | | | | | | | | | | | | |
| 4 | Actual Data | | | | | | | | | | | | | |
| 5 | Sales by Branch | Jan | Feb | Mar | Apr | May | Jun | Jul | Aug | Sep | Oct | Nov | Dec | Totals |
| 6 | Atherton | $4.6 | $3.0 | $6.9 | $5.4 | $6.8 | $9.0 | $4.3 | $5.6 | $8.3 | $8.9 | $6.5 | $3.0 | $72.1 |
| 7 | Berkeley | $13.0 | $8.3 | $11.3 | $10.7 | $8.8 | $9.9 | $7.8 | $10.1 | $7.1 | $10.2 | $10.0 | $8.6 | $115.0 |
| 8 | Cupertino | $6.0 | $6.4 | $6.5 | $5.5 | $7.0 | $6.1 | $5.2 | $7.8 | $7.2 | $5.0 | $4.8 | $5.9 | $73.5 |
| 9 | Fremont | $8.5 | $6.2 | $7.3 | $9.7 | $8.3 | $11.0 | $7.3 | $9.5 | $7.6 | $6.1 | $6.9 | $0.8 | $97.3 |
| 10 | Milpitas | $9.9 | $8.5 | $9.2 | $5.6 | $8.1 | $8.6 | $9.3 | $9.4 | $5.7 | $7.5 | $5.9 | $5.2 | $93.9 |
| 11 | San Francisco | $27.5 | $28.4 | $28.1 | $27.6 | $25.0 | $25.9 | $27.2 | $29.3 | $26.7 | $29.0 | $28.2 | $29.4 | $332.3 |
| 12 | | | | | | | | | | | | | | |
| 13 | | | | | | | | | | | | | | |

| | A | B | C | D | E | F | G |
|---|---|---|---|---|---|---|---|
| 1 | Sales by Branch: | | | | | | |
| 2 | | | | | | | |
| 3 | | FY02 | FY03 | FY04 | FY05 | FY06 | |
| 4 | Atherton | $ 19.70 | $ 17.10 | $ 18.30 | $ 14.80 | $ 19.80 | |
| 5 | Berkeley | $ 14.40 | $ 18.00 | $ 16.40 | $ 16.70 | $ 19.30 | |
| 6 | Carmel | $ 16.80 | $ 13.50 | $ 18.70 | $ 13.90 | $ 15.70 | |
| 7 | Cupertino | $ 12.00 | $ 16.20 | $ 17.50 | $ 17.80 | $ 13.80 | |
| 8 | Fremont | $ 19.20 | $ 15.60 | $ 19.60 | $ 15.90 | $ 14.40 | |
| 9 | Irvine | $ 18.90 | $ 14.60 | $ 18.70 | $ 12.10 | $ 13.90 | |
| 10 | Milpitas | $ 18.70 | $ 17.80 | $ 14.00 | $ 18.50 | $ 13.70 | |
| 11 | Orange County | $ 17.00 | $ 19.40 | $ 17.10 | $ 17.30 | $ 17.30 | |
| 12 | San Francisco | $ 14.40 | $ 14.00 | $ 13.90 | $ 15.40 | $ 18.30 | |
| 13 | | $ - | $ - | $ - | $ - | $ - | |
| 14 | Insert In Row: | | | | | | |
| 15 | | | | | | | |

Fig. 8h

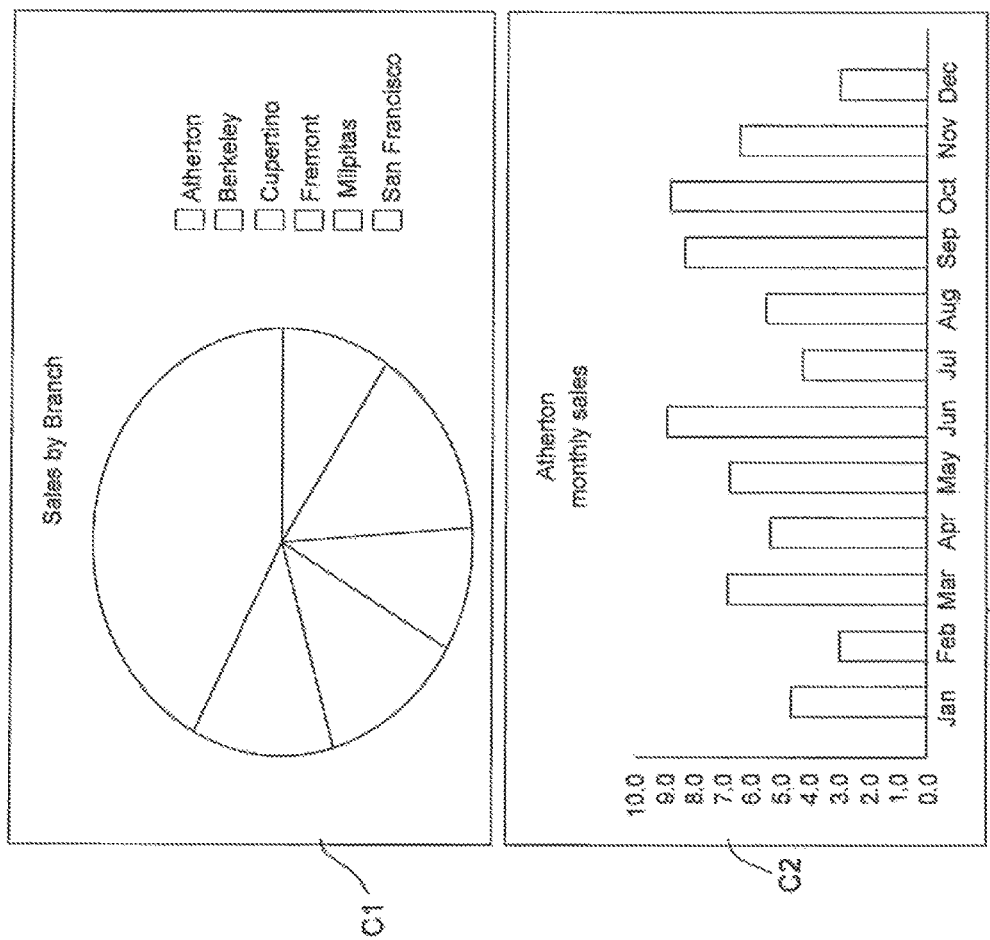

Fig. 9b

| | A | B | C | D | E | F | G | H | I | J | K | L | M | N |
|---|---|---|---|---|---|---|---|---|---|---|---|---|---|---|
| 1 | Insert In Range | | | | | | | | | | | | | |
| 2 | | | | | | | | | | | | | | |
| 3 | | | | | | | | | | | | | | |
| 4 | Actual Data | | | | | | | | | | | | | |
| 5 | Sales by Branch | Jan | Feb | Mar | Apr | May | Jun | Jul | Aug | Sep | Oct | Nov | Dec | Totals |
| 6 | Atherton | $4.6 | $3.0 | $6.9 | $5.4 | $6.8 | $9.0 | $4.3 | $5.6 | $8.3 | $8.9 | $6.5 | $3.0 | $72.1 |
| 7 | Berkeley | $13.0 | $8.3 | $11.3 | $10.7 | $8.8 | $9.9 | $7.8 | $10.1 | $7.1 | $10.2 | $10.0 | $8.6 | $115.0 |
| 8 | Cupertino | $6.0 | $6.4 | $6.5 | $5.5 | $7.0 | $8.1 | $5.2 | $7.8 | $7.2 | $5.0 | $4.8 | $5.9 | $73.5 |
| 9 | Fremont | $8.5 | $6.2 | $7.3 | $9.7 | $8.3 | $11.0 | $7.3 | $9.5 | $7.6 | $6.1 | $8.9 | $8.8 | $97.3 |
| 10 | Milpitas | $9.9 | $8.5 | $9.2 | $5.6 | $8.1 | $9.6 | $9.3 | $9.4 | $5.7 | $7.5 | $5.9 | $5.2 | $93.9 |
| 11 | San Francisco | $27.5 | $28.4 | $28.1 | $27.6 | $25.0 | $25.9 | $27.2 | $29.3 | $26.7 | $29.0 | $28.2 | $29.4 | $332.3 |
| 12 | | | | | | | | | | | | | | |
| 13 | | | | | | | | | | | | | | |

| ▲ | A | B | C | D | E | F | G |
|---|---|---|---|---|---|---|---|
| 1 | Sales by Branch |  |  |  |  |  |  |
| 2 |  |  |  |  |  |  |  |
| 3 |  | FY02 | FY03 | FY04 | FY05 | FY06 |  |
| 4 | Atherton | $ 19.70 | $ 17.10 | $ 18.30 | $ 14.80 | $ 19.80 |  |
| 5 | Berkeley | $ 14.40 | $ 18.00 | $ 16.40 | $ 16.70 | $ 19.30 |  |
| 6 | Carmel | $ 18.80 | $ 13.50 | $ 18.70 | $ 13.90 | $ 15.70 |  |
| 7 | Cupertino | $ 12.00 | $ 16.20 | $ 17.50 | $ 17.80 | $ 13.80 |  |
| 8 | Freemont | $ 19.20 | $ 15.80 | $ 19.60 | $ 15.90 | $ 14.40 |  |
| 9 | Irvine | $ 18.90 | $ 14.80 | $ 16.70 | $ 12.10 | $ 13.90 |  |
| 10 | Milpitas | $ 18.70 | $ 17.80 | $ 14.00 | $ 18.50 | $ 13.70 |  |
| 11 | Orange County | $ 17.00 | $ 19.40 | $ 17.10 | $ 17.30 | $ 17.30 |  |
| 12 | San Francisco | $ 14.40 | $ 14.00 | $ 13.90 | $ 15.40 | $ 18.30 |  |
| 13 |  | $  -  | $  -  | $  -  | $  -  | $  -  |  |
| 14 | Insert In Row: |  |  |  |  |  |  |
| 15 |  |  |  |  |  |  |  |

Fig. 10b

|   | A | B | C | D | E | F |
|---|---|---|---|---|---|---|
| 1 | Sales by Branch: | | | | | |
| 2 | | | | | | |
| 3 | | FY02 | FY03 | FY04 | FY05 | FY06 |
| 4 | Atherton | $ 19.70 | $ 17.10 | $ 18.30 | $ 14.80 | $ 19.80 |
| 5 | Berkeley | $ 14.40 | $ 18.00 | $ 16.40 | $ 16.70 | $ 19.30 |
| 6 | Carmel | $ 18.80 | $ 13.50 | $ 18.70 | $ 13.90 | $ 15.70 |
| 7 | Cupertino | $ 12.00 | $ 16.20 | $ 17.50 | $ 17.80 | $ 13.80 |
| 8 | Freemont | $ 19.20 | $ 15.80 | $ 19.60 | $ 15.90 | $ 14.40 |
| 9 | Irvine | $ 18.90 | $ 14.60 | $ 16.70 | $ 12.10 | $ 13.90 |
| 10 | Milpitas | $ 18.70 | $ 17.80 | $ 14.00 | $ 18.80 | $ 13.70 |
| 11 | Orange County | $ 17.00 | $ 19.40 | $ 17.10 | $ 17.30 | $ 17.30 |
| 12 | San Francisco | $ 14.40 | $ 14.00 | $ 13.90 | $ 15.40 | $ 18.30 |
| 13 | | | | | | |
| 14 | Insert In Row: | $ - | $ - | $ - | $ - | $ - |
| 15 | | | | | | |

Fig. 10e

| | A | B | C | D | E | F |
|---|---|---|---|---|---|---|
| 1 | Sales by Branch: | | | | | |
| 2 | | | | | | |
| 3 | | FY02 | FY03 | FY04 | FY05 | FY06 |
| 4 | Atherton | $ 19.70 | $ 17.10 | $ 18.30 | $ 14.80 | $ 19.80 |
| 5 | Berkeley | $ 14.40 | $ 18.00 | $ 16.40 | $ 16.70 | $ 19.30 |
| 6 | Carmel | $ 18.80 | $ 13.50 | $ 18.70 | $ 13.90 | $ 15.70 |
| 7 | Cupertino | $ 12.00 | $ 16.20 | $ 17.50 | $ 17.80 | $ 13.80 |
| 8 | Freemont | $ 19.20 | $ 15.60 | $ 19.60 | $ 15.90 | $ 14.40 |
| 9 | Irvine | $ 18.90 | $ 14.60 | $ 16.70 | $ 12.10 | $ 13.90 |
| 10 | Milpitas | $ 18.70 | $ 17.80 | $ 14.00 | $ 18.50 | $ 13.70 |
| 11 | Orange County | $ 17.00 | $ 19.40 | $ 17.10 | $ 17.30 | $ 17.30 |
| 12 | San Francisco | $ 14.40 | $ 14.00 | $ 13.80 | $ 15.40 | $ 18.30 |
| 13 | | $ - | $ - | $ - | $ - | $ - |
| 14 | Insert In Row: | | | | | |
| 15 | | | | | | |

Fig. 10h

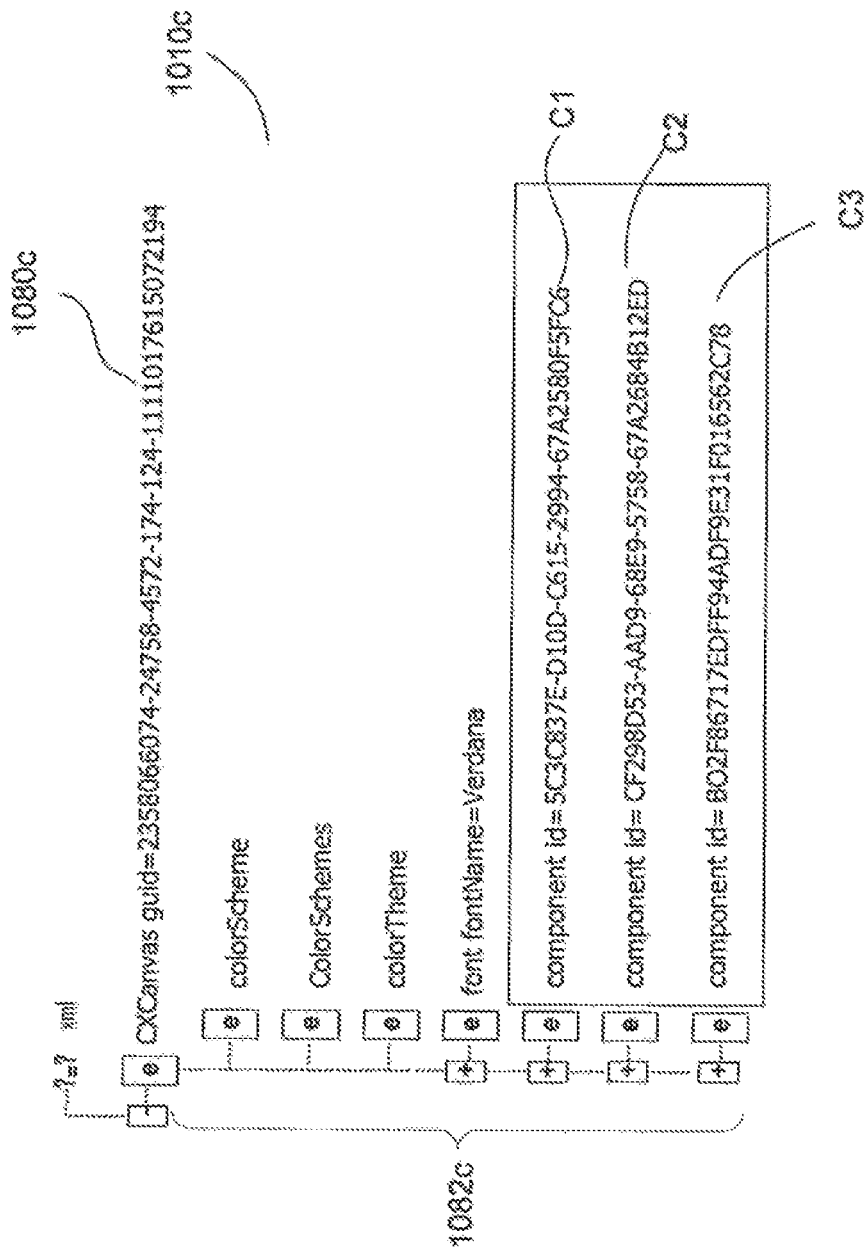

| | A | B | C | D | E | F | G |
|---|---|---|---|---|---|---|---|
| 1 | Sales by Branch: | | | | | | |
| 2 | | | | | | | |
| 3 | | FY02 | FY03 | FY04 | FY05 | FY06 | |
| 4 | Atherton | $ 19.70 | $ 17.10 | $ 18.30 | $ 14.80 | $ 19.80 | |
| 5 | Berkeley | $ 14.40 | $ 18.00 | $ 16.40 | $ 16.70 | $ 19.30 | |
| 6 | Carmel | $ 18.80 | $ 13.50 | $ 18.70 | $ 13.90 | $ 15.70 | |
| 7 | Cupertino | $ 12.00 | $ 16.20 | $ 17.50 | $ 17.80 | $ 13.80 | |
| 8 | Freemont | $ 19.20 | $ 15.60 | $ 19.60 | $ 15.90 | $ 14.40 | |
| 9 | Irvine | $ 18.90 | $ 14.60 | $ 16.70 | $ 12.10 | $ 13.90 | |
| 10 | Milpitas | $ 18.70 | $ 17.80 | $ 14.00 | $ 18.50 | $ 13.70 | |
| 11 | Orange County | $ 17.00 | $ 19.40 | $ 17.10 | $ 17.30 | $ 17.30 | |
| 12 | San Francisco | $ 14.40 | $ 14.00 | $ 13.90 | $ 15.40 | $ 18.30 | |
| 13 | | $ - | $ - | $ - | $ - | $ - | |
| 14 | Insert In Row: | | | | | | |
| 15 | | | | | | | |

Fig. 11b

| | A | B | C | D | E | F |
|---|---|---|---|---|---|---|
| 1 | Revenues by Product | | | | | |
| 2 | | | | | | |
| 3 | | Q1 | Q2 | Q3 | Q4 | |
| 4 | Product 1 | $ 27.0 | $ 34.6 | $ 48.7 | $ 54.8 | |
| 5 | Product 2 | $ 43.3 | $ 52.5 | $ 33.5 | $ 30.7 | |
| 6 | Product 3 | $ 46.8 | $ 22.1 | $ 41.8 | $ 50.9 | |
| 7 | Product 4 | $ 38.9 | $ 51.9 | $ 50.5 | $ 54.5 | |
| 8 | Product 5 | $ 23.8 | $ 34.0 | $ 32.8 | $ 50.7 | |
| 9 | Product 6 | $ 45.1 | $ 35.9 | $ 27.7 | $ 37.3 | |
| 10 | Product 7 | $ 39.0 | $ 28.3 | $ 25.3 | $ 49.0 | |
| 11 | Product 8 | $ 33.4 | $ 47.7 | $ 43.8 | $ 40.7 | |
| 12 | Product 9 | $ 23.4 | $ 24.3 | $ 23.3 | $ 47.3 | |
| 13 | Product 10 | $ 28.9 | $ 49.9 | $ 40.9 | $ 52.1 | |
| 14 | Product 11 | $ 53.9 | $ 35.3 | $ 26.7 | $ 51.8 | |
| 15 | Product 12 | $ 29.8 | $ 31.7 | $ 49.8 | $ 45.1 | |
| 16 | Product 13 | $ 28.3 | $ 27.5 | $ 45.8 | $ 45.8 | |
| 17 | Product 14 | $ 38.0 | $ 30.2 | $ 51.7 | $ 50.0 | |
| 18 | Product 15 | $ 24.7 | $ 24.0 | $ 32.6 | $ 36.9 | |
| 19 | Product 16 | $ 28.3 | $ 48.8 | $ 28.3 | $ 44.9 | |
| 20 | Product 17 | $ 55.0 | $ 25.3 | $ 51.5 | $ 43.3 | |
| 21 | Product 18 | $ 51.5 | $ 40.6 | $ 42.0 | $ 56.0 | |
| 22 | Product 19 | $ 48.7 | $ 55.2 | $ 51.0 | $ 28.1 | |
| 23 | Product 20 | $ 42.6 | $ 52.3 | $ 33.2 | $ 26.7 | |
| 24 | Product 21 | $ 37.6 | $ 52.5 | $ 44.3 | $ 29.8 | |
| 25 | Product 22 | $ 45.2 | $ 50.8 | $ 46.6 | $ 43.5 | |
| 26 | | $ - | $ - | $ - | $ - | |
| 27 | Insert In Rows: | | | | | |
| 28 | | | | | | |

|  | A | B | C | D | E | F |
|---|---|---|---|---|---|---|
| 1 | Sales by Branch: | | | | | |
| 2 | | | | | | |
| 3 | | FY02 | FY03 | FY04 | FY05 | FY06 |
| 4 | Atherton | $ 19.70 | $ 17.10 | $ 18.30 | $ 14.80 | $ 19.80 |
| 5 | Berkeley | $ 14.40 | $ 18.00 | $ 16.40 | $ 16.70 | $ 19.30 |
| 6 | Carmel | $ 18.80 | $ 13.50 | $ 18.70 | $ 13.90 | $ 15.70 |
| 7 | Cupertino | $ 12.00 | $ 18.20 | $ 17.50 | $ 17.80 | $ 13.80 |
| 8 | Freemont | $ 19.20 | $ 15.60 | $ 19.60 | $ 15.90 | $ 14.40 |
| 9 | Irvine | $ 18.90 | $ 14.60 | $ 16.70 | $ 12.10 | $ 13.90 |
| 10 | Milpitas | $ 18.70 | $ 17.80 | $ 14.00 | $ 18.50 | $ 13.70 |
| 11 | Orange County | $ 17.00 | $ 19.40 | $ 17.10 | $ 17.30 | $ 17.30 |
| 12 | San Francisco | $ 14.40 | $ 14.00 | $ 13.90 | $ 15.40 | $ 18.30 |
| 13 | | $ - | $ - | $ - | $ - | $ - |
| 14 | Insert in Row: | | | | | |
| 15 | | | | | | |

DASHBOARD COLLABORATOR

TECHNICAL FIELD

The present disclosure relates generally to intelligent tools. In particular, an intelligent tool includes a collaborator for merging dashboards used for visualizing data.

BACKGROUND

Dashboard tools are business intelligence tools which are used to create dashboards for visualizing data based on defined metrics and key performance indicators (KPIs). Depending on the application, the dashboard designs can be complex, involving numerous types of components and data. Complex designs may require multiple designers with each designing a different component of the dashboard.

Conventional collaborative process of designing dashboards is inefficient due to its sequential nature. For example, once a designer finishes designing a component of the dashboard, it is then passed to another designer for designing another dashboard component. This leads to long dashboard development time.

It is therefore desirable to provide tools which improve collaboration in the designing of dashboards.

SUMMARY

A computer-implemented technology for designing a dashboard is described herein. In some implementations, first and second dashboards are provided. Conflict analysis on the first and second dashboard is performed. The conflicts are resolved if any conflicts are detected. The first and second dashboards are merged to form a merged dashboard if no conflicts are detected or after resolving the conflicts.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIGS. 7a-f show dialog boxes of the DM application;

FIGS. 8a-i show embodiments of a first dashboard having first metadata and data files, a second dashboard having second metadata and data files, and a merged dashboard having merged metadata and data files, respectively;

FIGS. 9a-l show another embodiments of a first dashboard having first metadata and data files, a second dashboard having second metadata and data files, a manual data conflict resolution scenario, and an automatic data conflict resolution scenario, respectively;

FIGS. 10a-i show another embodiments of a first dashboard having first metadata and files, a second dashboard having second metadata and data files, and a merged dashboard having merged metadata and data files, respectively;

FIGS. 11a-i show yet another embodiments of a first dashboard having first metadata and data files, a second dashboard having second metadata and data files, and a merged dashboard having merged metadata and date files, respectively; and FIGS. 12a-i show yet another embodiments of a first dashboard having first metadata and data files, a second dashboard having second metadata and data files, and a merged dashboard having merged metadata and data files respectively.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for displaying data is described herein. The display framework may be used, for example, to display business information to enhance the decision making process. In one implementation, the framework may be used to design dashboards for displaying information. The framework may be employed to merge dashboards together effectively to improve workflow related to designing dashboards. For example, the framework facilitates collaboration for designing dashboards, reducing dashboard development time.

Figure 1:
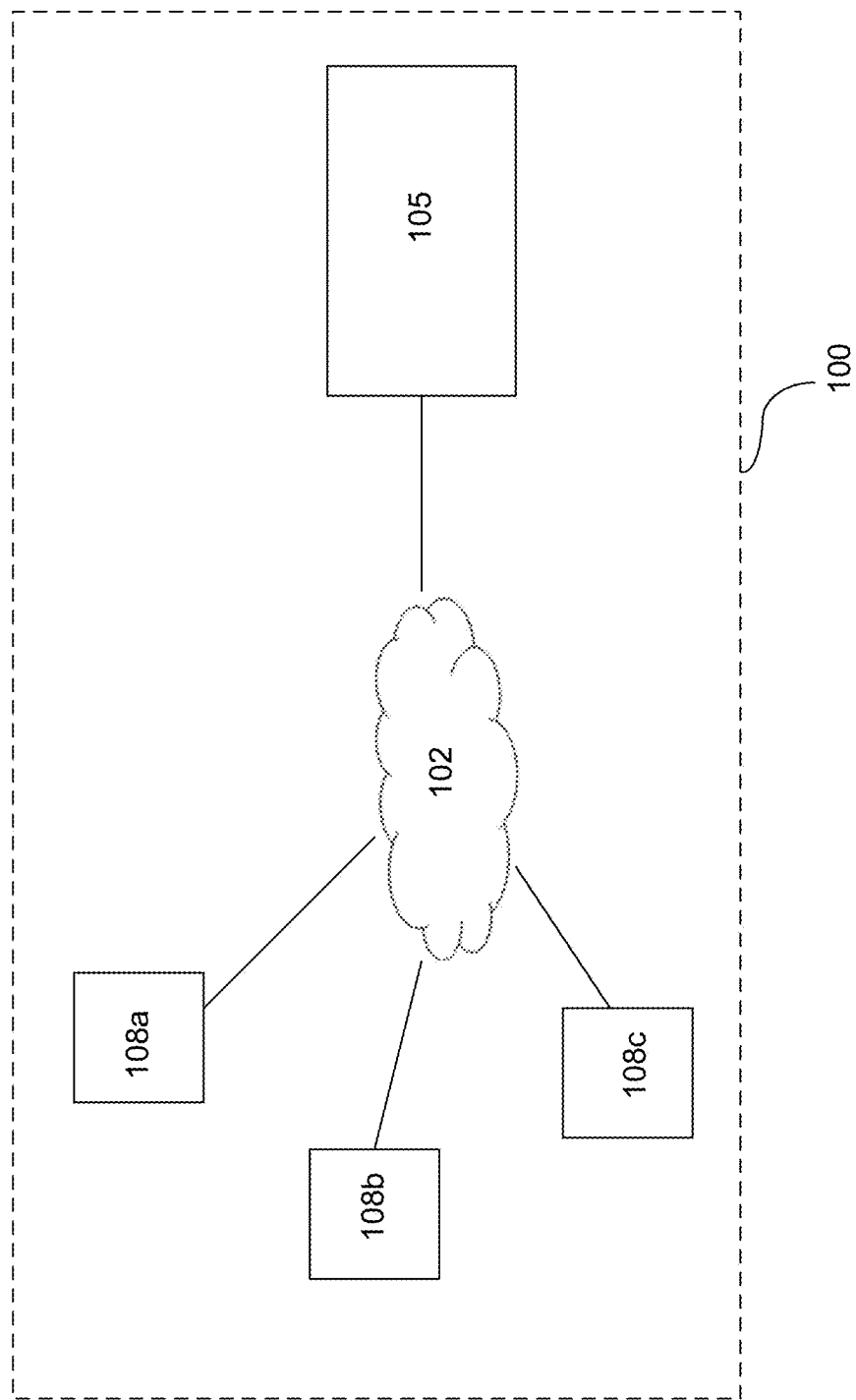
FIG. 1 shows an embodiment of an environment.

FIG. 1 shows a block diagram of an exemplary environment 100. The environment, for example, facilitates data visualization. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any non-transitory memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interface with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2:
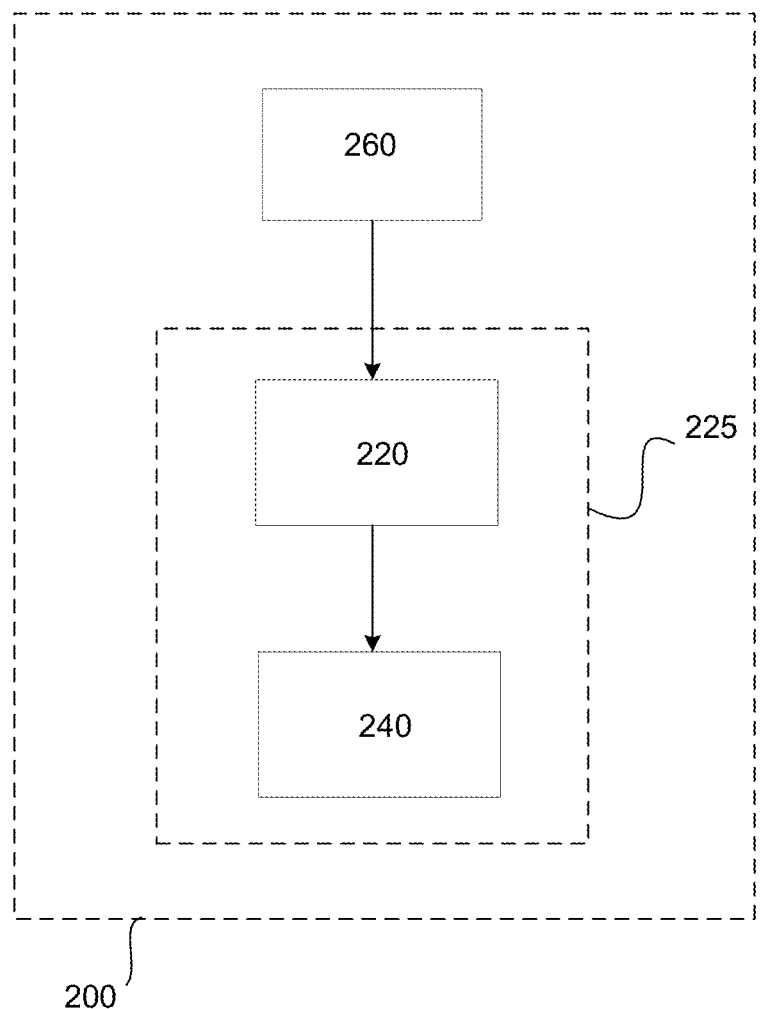
FIG. 2 shows an embodiment of a software environment.

FIG. 2 shows an embodiment of a software environment 200. As shown, the software environment includes a data source 260. The data source, for example, may include data files. Any type of files may also be contained in the data source. The files, for example, may be reports, spreadsheets, XML files, flat files, web service files or other types of files. The data files may be generated from one or more software applications, such as database or other types of software applications. For example, data may be personal data or business data, such as data of a company. Business data can include employee data, sales data, as well as other types of data related to a company.

The software application may include various types of functions, such as report generation and functions related to data analytics. The software application may have a C/S architecture. For example, data, reports and other information may be stored in a server. In other embodiments, the software application may be locally installed in a client or a standalone computer. In such cases, the data, reports and other information are locally stored.

In one embodiment, the software application comprises a business application. Various types of business applications may be used. The business application, for example, maintains data of a business and creates business reports relating to the data. Such business applications may include, for example, SAP Crystal Solutions, including Xcelsius, Crystal Reports, Web Intelligence from SAP AG. Other types of business applications or suites of business applications may also be useful.

In one embodiment, the data source includes files of dashboards. These files, for example, are used to display dashboards. These files, for example, may be generated by a dashboard design application 220. A dashboard may include different elements to present aggregated views of data using, for example, appropriate KPIs, metrics, trends, data visualizations and interactions.

For example, a dashboard includes a user interface (UI) or dashboard panel. Within the panel there may be one or more dashboard components to facilitate data visualization. Providing other types of components or elements may also be useful. The dashboard may also be provided with different features or functions. For example, components or elements, such as drop down menus, sliders and command buttons for performing "what if" analyses and dynamic visualization of data may be provided to enable interactions by a user at runtime. Dashboards, for example, enable quick understanding of the data to facilitate better and more efficient decision making.

In one embodiment, the dashboard design application is SAP®BusinessObjects™Xcelsius®Enterprise. Other types of dashboard design applications may also be useful. For example, the dashboard design application may be SAP® Visual Composer.

Figure 3A:
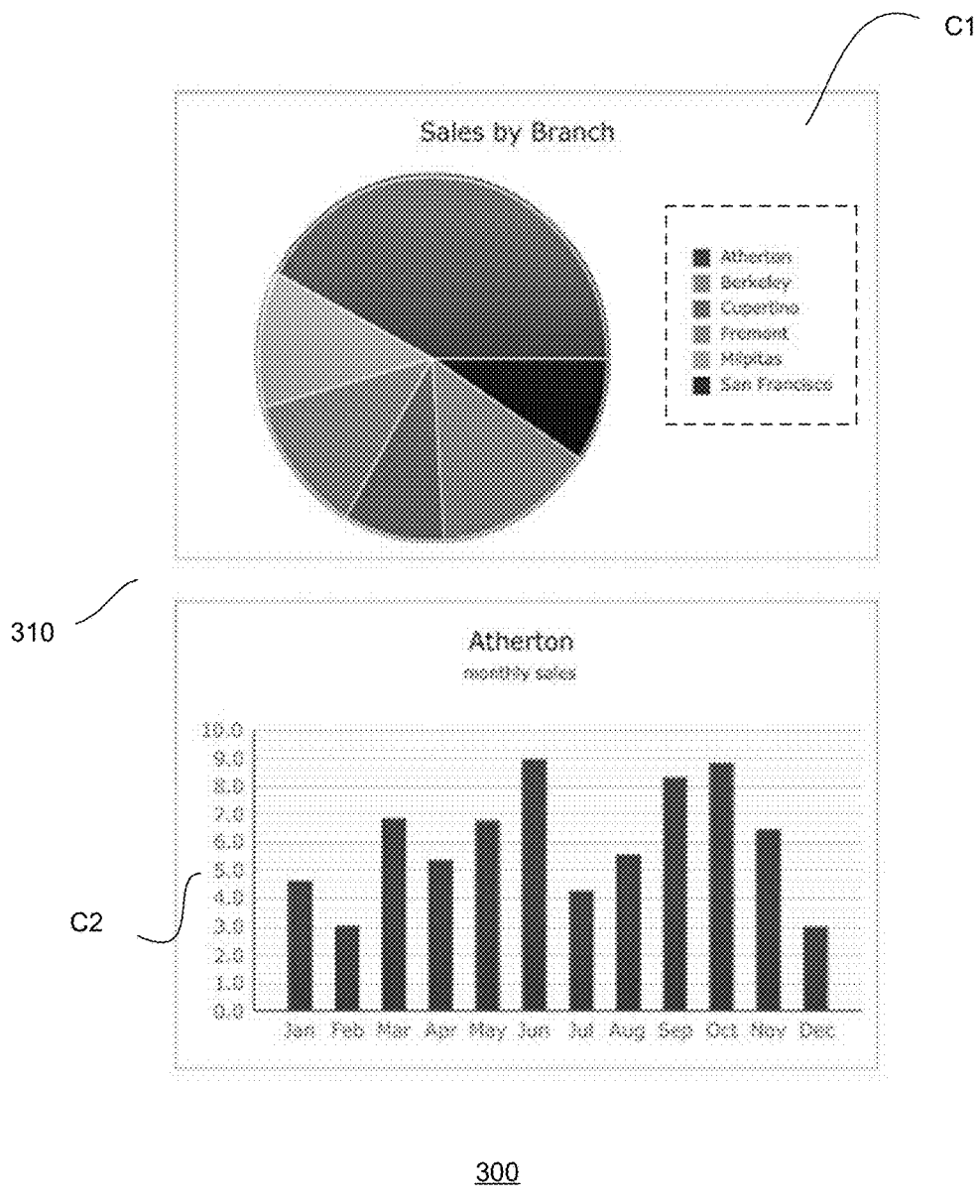
FIGS. 3a-c show exemplary embodiments of a dashboard, metadata file and data file, respectively.

FIG. 3a shows an exemplary embodiment of a dashboard 300. As shown, the dashboard includes a dashboard panel 310. The dashboard panel may be a part of a dashboard UI. For example, the dashboard panel may be a canvas of the dashboard UI. The dashboard UI may be part of a dashboard design tool. The dashboard UI may include menu bar and command buttons to, for example, facilitate designing dashboards or other dashboard functions. The canvas may include a dashboard label to describe the dashboard. The dashboard label may be disposed at about an edge of the dashboard. For example, the dashboard label is disposed in an upper left corner of the dashboard. Disposing the dashboard label at other locations may also be useful.

Within the canvas there may be one or more dashboard components. As shown, the canvas includes first and second components C1 and C2. Providing other number of components may also be useful. The dashboard components may be charts for viewing data. For example, the first component is a pie chart and the second component is a bar chart. Other types of components may also be useful. For example, other types of dashboard components may include graphs, gauges, selectors, filters, maps and skins. The components may be employed to visualize data or segments of data, such as by filtering.

Illustratively, the dashboard provides views of data for a chain of stores or branches. For example, the chain includes branches in Atherton, Berkeley, Cupertino, Fremont, Milpitas and San Francisco. In this context, KPIs, trends and important information related to sales of the branches are provided. For example, the pie chart in the first viewing zone depicts the relative percentage of sales of each branch for a specified year while the second viewing zone depicts the sales of a selected branch month by month. For example, in this case, the bar chart depicts the monthly sales of the Atherton branch for a specified year. The components of the dashboard, as illustrated, are contained in a single page. Providing dashboards having multiple pages may also be useful.

As described, a dashboard includes a canvas with one or more components. Information related to the canvas is contained in a dashboard file. In one embodiment, information related to the canvas of a dashboard is provided as metadata. Canvas information may include, for example, information of the canvas and its components, such as location, size, color as well as font type. Additional canvas information may also be provided. Data is associated with the components.

The information of a dashboard is stored in a dashboard file. In one embodiment, the dashboard file is a x.xlf file, where x is the name of the dashboard. The x.xlf file, in one embodiment, includes first and second files. The first file contains the metadata and the second file contains the data. For example, the metadata and data of a dashboard are contained in separate files. The metadata is contained in, for example, a markup file. The markup file, for example, may be a document.xml file. As for the data file, it may be a spread sheet file. For example, the data file may be an excel spread sheet. The data file may be stored as xldoc. Storing the information of a dashboard in other types of documents or formats as well as in other number of files may also be useful.

Figure 3B:
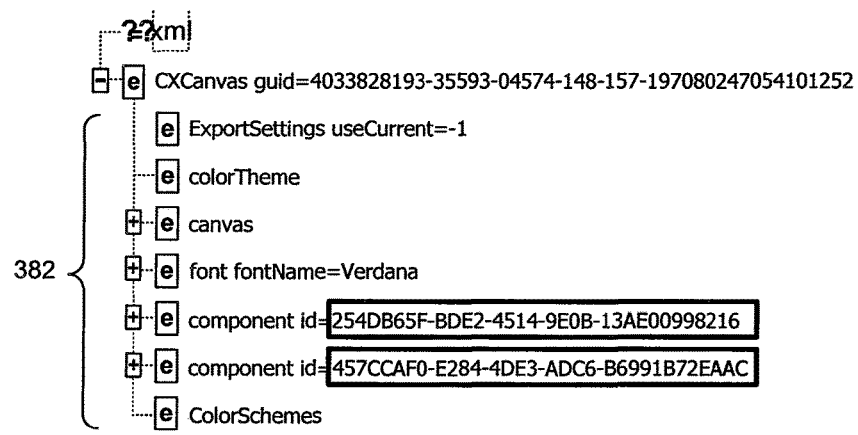

FIG. 3b shows exemplary embodiments of metadata file 310. The metadata file, for example, is a xml file. The metadata file may be named as document.xml. Other types of metadata files may also be useful. The metadata file, for example, is the metadata file of the dashboard of FIG. 3a. The metadata file includes different entry items 382. The entry items correspond to the dashboard and various component ids, such as C1 and C2, as well as format information. In one embodiment, entry items may have one of the following formats:
 a) label=value; or
 b) label,
where label is the name which describes the item and value is the value corresponding to the label. In the case of the second format, the label indicates a set format. As shown, entry items include canvas id, settings, color theme, canvas, font type, component id and color scheme. Other entry items may be included in the metadata file.

Figure 3C:
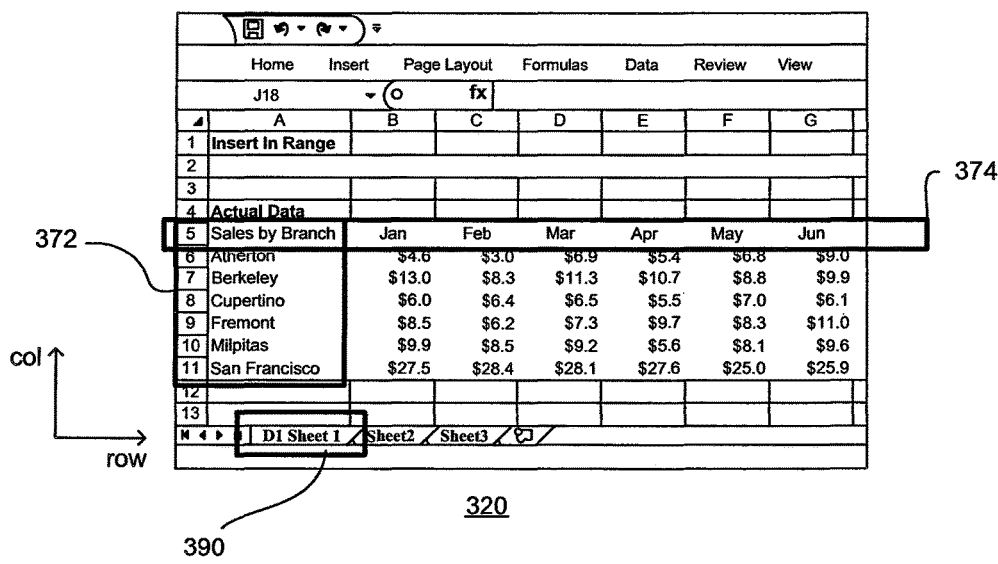

FIG. 3c shows exemplary embodiment of data file 320. The data file, for example, is a spread sheet, such as an excel file. The data file may be named xldoc. Other types of data files may also be useful. The data file, for example, is the data file of the dashboard of FIG. 3a. The data file includes rows and columns of data. The data may have row headings 372 and column headings 374. As shown, rows correspond to branches and columns correspond to months. The data reflects monthly revenues. The data may be contained in a data sheet 390 of the data file. As shown, the data of the data sheet is bound to both components C1 and C2 of the dashboard. Other configurations of data and components may also be useful. For example, multiple data sheets may be provided to contain the data of the dashboards.

Referring back to FIG. 2, the software environment includes a dashboard merger (DM) application 240. The DM application is used to merge dashboards together. The DM application improves the collaborative workflow related to designing dashboards, leading to reduced development time. The DM application, for example, may be integrated into the dashboard design application, as indicated by a dashed line 225. In other embodiments, the DM application may be a separate application which interacts with the dashboard design application. Other configurations of dashboard design and DM applications may also be useful.

The software environment may include additional applications which interact with the data source, dashboard design and DM applications. For example, the applications may be used to generate reports and perform data analytics. Other types of tools or applications, such as Microsoft Office, Adobe and/or a web portal, may also be provided in the software environment.

Figure 4:
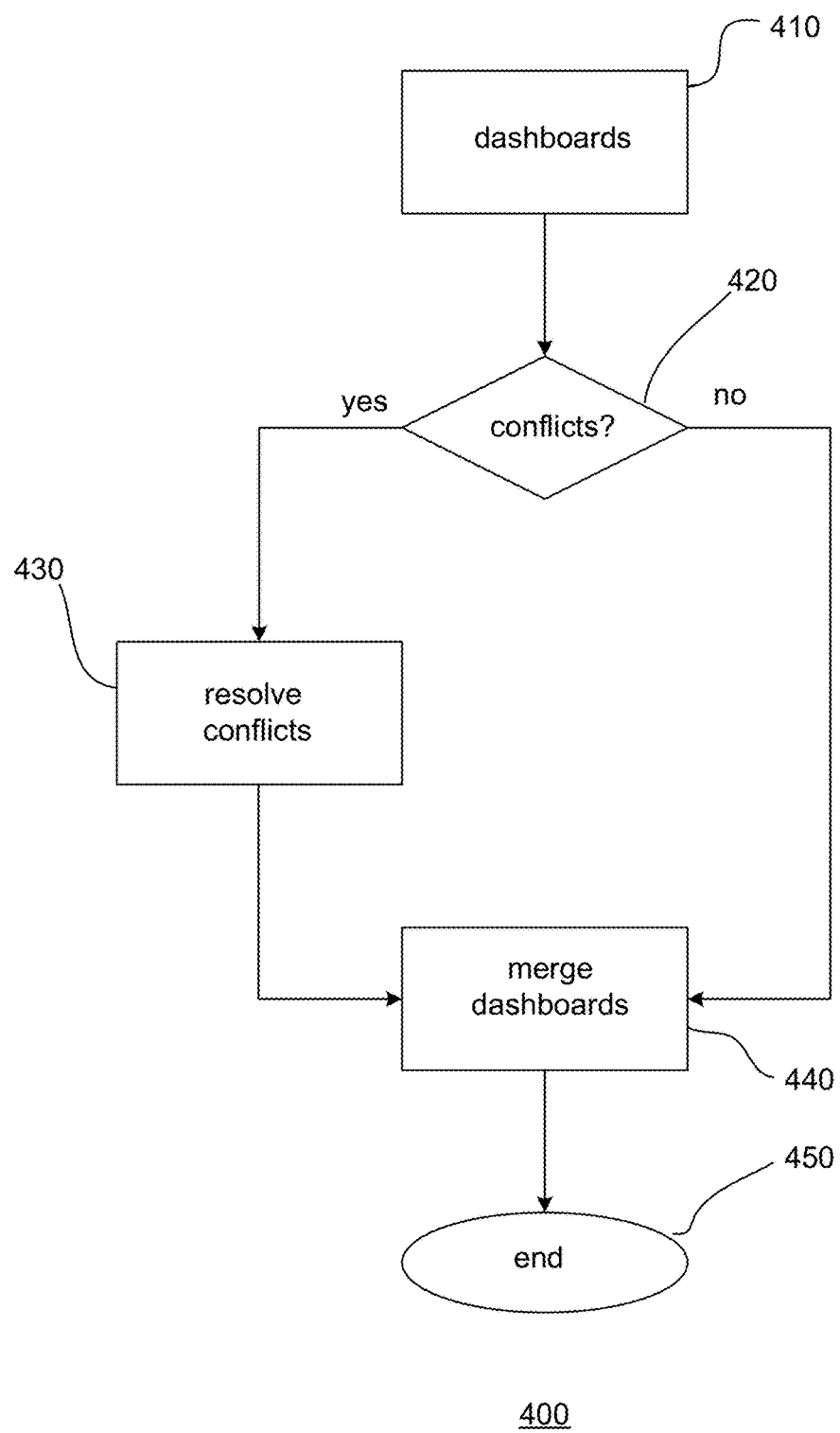
FIG. 4 shows an embodiment of a process for merging dashboards by the DM application.

FIG. 4 shows a general embodiment of a process 400 for merging dashboards by the DM application. At step 410, dashboards which are to be merged are provided. For example, a user selects dashboards which are to be merged. In one embodiment, first and second dashboards are selected for merging. The selected dashboards serve as source dashboards. The DM application, at step 420, analyzes the source dashboards to determine if there are any conflicts with the dashboards. If no conflicts are detected, the process continues to step 440 where the dashboards are merged and the process ends at step 450.

Conflicts may include metadata and/or data conflicts. For example, user 1 creates a dashboard D1 and it contains C1. Subsequently User 2 opens D1 and changes color of C1 and adds a new component C2. The changes form D2. Merging D1 and D2 would result in a metadata conflict, which is different color for C1. Assume that user 2 also changes the data which is bound to C1. This would result in a data conflict since the bound data to C1 are different. Other types of dashboard conflicts may also be useful.

In the case where conflict or conflicts are detected, the process continues to step 430 to resolve the conflicts. Resolution of conflicts may be automatically performed by the DM application, involve input from the user or a combination thereof. In the case of user input, for example, the user may select a base dashboard from one of the two dashboards to be merged. The base dashboard, for example, may serve as the base dashboard of the merged dashboard. The user may be requested to provide input where the source dashboards cannot be merged automatically or, in some cases, the DM application provides the user the option even though the source dashboards can be merged automatically. In one embodiment, where more than one conflict is detected, conflicts are resolved sequentially. For example, conflicts are resolved one at a time in sequence. Other configurations of conflict resolutions may also be useful. Once conflict or conflicts are resolved, the process continues to step 440 where the dashboards are merged. The merged dashboards may be displayed for previewing. After previewing the dashboards, it may be saved as a new dashboard and the process ends at step 450. The source dashboards remain unchanged.

As described, the DM application merges two dashboards. The process may be expanded to merge n number of dashboards. For example, after two dashboards are merged to form a first merged dashboard, the first merged dashboard may be merged with another source dashboard to form a second merged dashboard. This process can be repeated to merge additional dashboards, as desired.

Figure 5:
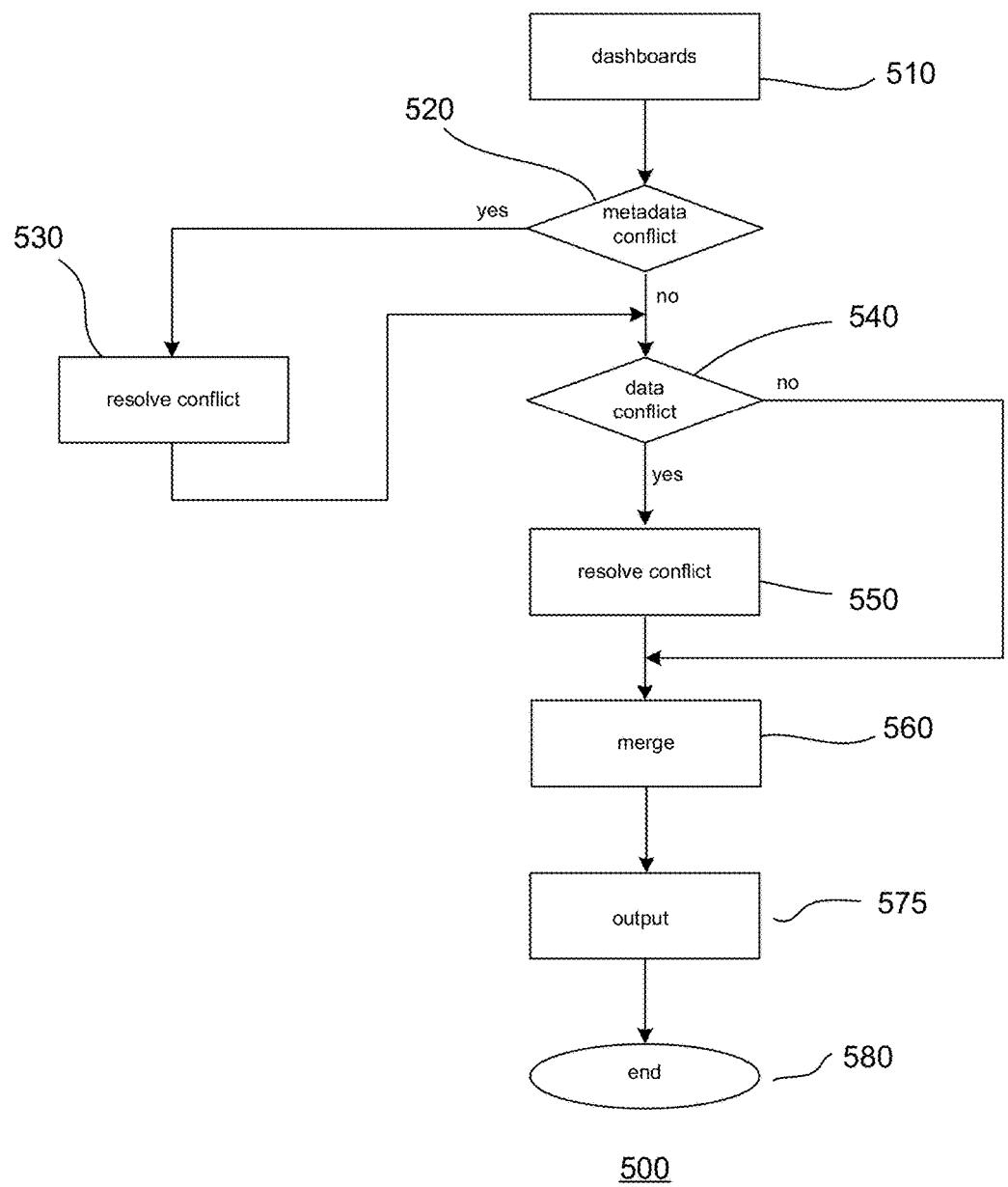
FIG. 5 shows another embodiment of a process for merging dashboards by the DM application.

FIG. 5 shows another embodiment of a process 500 for merging dashboards by the DM application. In one embodiment, the DM application merges dashboards contained in first and second dashboard files. For example, a dashboard has its information contained in metadata and data files, such as document.xml and xldoc files, as described in FIGS. 3*b-c*. At step 510, dashboards which are to be merged are provided. For example, a user selects dashboards which are to be merged. In one embodiment, first and second dashboards D1 and D2 are selected for merging.

The DM application, at step 520, analyzes the metadata files of the selected dashboards to determine if there are any metadata conflicts with the dashboards. For example, document.xml of D1 and document.xml of D2 are analyzed. Metadata conflicts, for example, may include canvas guids, component ids, formats or a combination thereof. Metadata conflicts may include other types of metadata conflicts. For example, any differences in the document.xml files constitute metadata conflicts. If no metadata conflicts are detected, the process proceeds to step 540.

On the other hand, if metadata conflicts are detected, the process continues to step 530 to resolve the conflicts. Resolution of conflicts may be automatically performed by the DM application, involve user interaction or a combination thereof. How a conflict is resolved may, for example, depend on the conflict type. In one embodiment, conflicts are resolved sequentially. Other configurations of conflict resolution may also be useful. Once metadata conflict or conflicts are resolved, the process continues to step 540.

At step 540, the process determines if there are data conflicts. For example, the data files of the selected dashboards are analyzed to determine if there are any data conflicts. In one embodiment, xldoc of D1 and xldoc of D2 are analyzed for conflicts. Data conflicts, for example, may include conflicts with row headings, column headings, sheet names or a combination thereof. Data conflicts may include other types of data conflicts. If no data conflicts are detected, the process continues to step 560.

In the case data conflicts are found, the process continues to step 550. At step 550, the data conflicts are resolved. Resolution of the data conflicts may be automatically performed by the DM application, involve user interaction or a combination thereof. In one embodiment, conflicts are resolved sequentially. For example, conflicts are resolved one at a time in sequence. Other configurations of conflict resolution may also be useful. Once data conflict or conflicts are resolved, the process continues to step 560.

At step 560, the files of the dashboards are merged together to form files of a merged dashboard D12. For example, the contents of the metadata files and data files are merged together to form document.xml and xldoc of D12. The merged dashboard D12, which includes components and data of D1 and D2, is output at step 575. For example, D12 is displayed for the user to preview. After previewing, the user may save the merged dashboard D12. For example, the metadata and data files of D12 are saved. The user may have a choice of name and location at which the merged dashboard is saved. Thereafter, the process of the DM application is terminated at step 580.

Figure 6A:
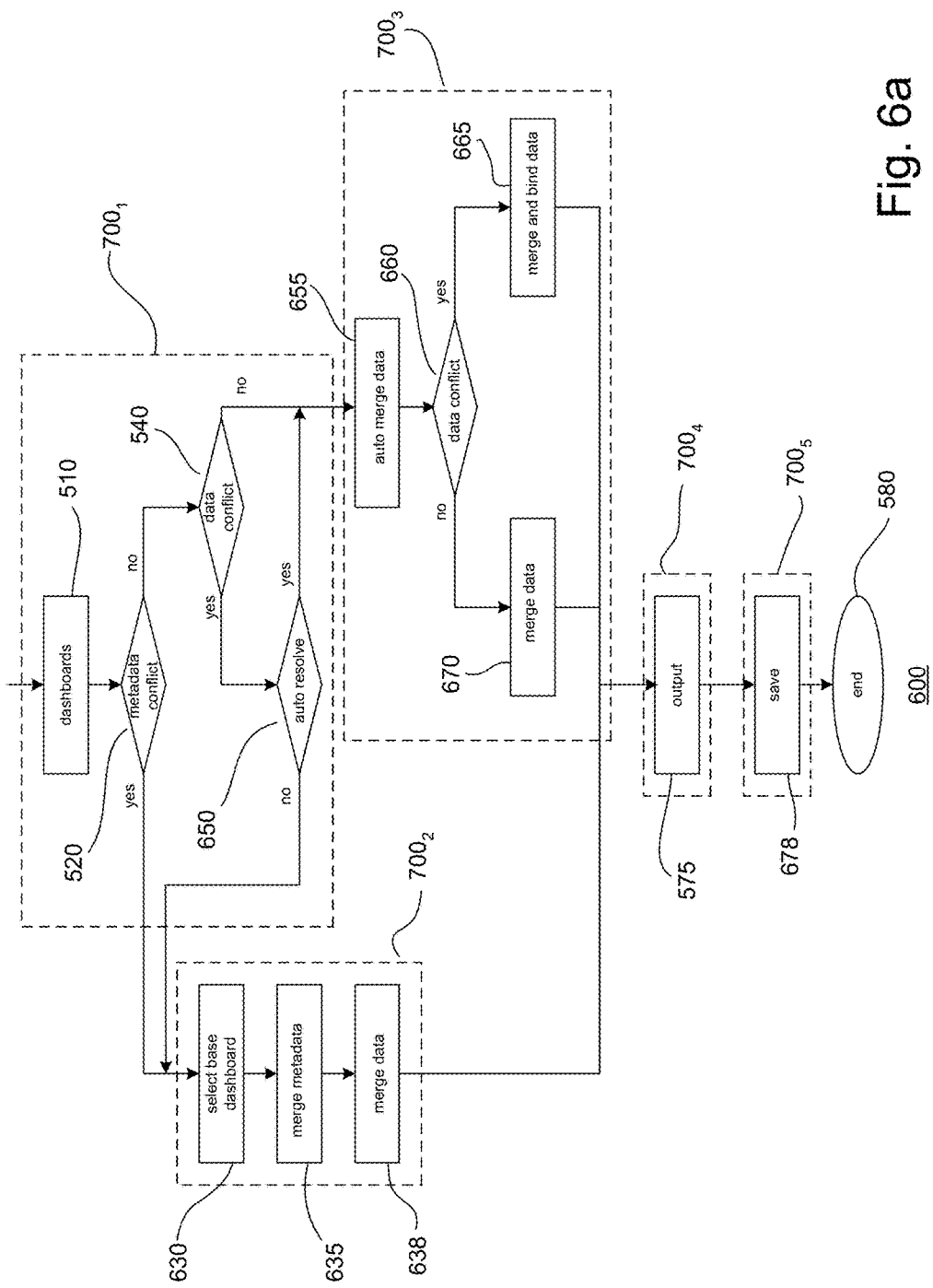
FIGS. 6a-c show other embodiments of processes for merging dashboards, merging data files of dashboards and merging data files of dashboards by the DM application, respectively.

FIG. 6*a* shows another embodiment of a process 600 for merging dashboards by the DM application. The process may be facilitated by, for example, a merge wizard having different dialog boxes. As shown, the wizard employs five dialog boxes $700_{1-5}$ for the process of merging the dashboards. Providing a wizard with other number of dialog boxes or other wizard configurations may also be useful.

In one embodiment, the DM application merges dashboards contained in first and second dashboard files. For example, a dashboard has its information contained in metadata and data files, such as document.xml and xldoc files. The process is similar to that described in FIG. 5. Common elements may not be described or described in detail.

At step 510, dashboards which are to be merged are provided. For example, a user selects first and second dashboards D1 and D2 for merging. The selected dashboards, for example, serve as source dashboards. In one embodiment, the user may select how data conflicts, if any, are resolved. For example, the user may select that data conflicts, if any, are automatically resolved by the DM application. The user may alternatively select manual resolution of data conflicts. Manual resolution of data conflicts requires input from the user, such as selecting which source dashboard will serve as the base dashboard.

The DM application, at step 520, analyzes the metadata files of D1 and D2 to determine if there are any metadata conflicts. For example, document.xml of D1 and document.xml of D2 are analyzed to determine if there are metadata conflicts between them. If no metadata conflicts are detected, the DM application proceeds to step 540.

On the other hand, if a metadata conflict is detected, the DM application continues to step 630 to resolve the metadata conflict. Metadata conflicts, in one embodiment, are performed manually, such as requiring user input. For example, the DM application requests the user to select a base dashboard DB from D1 and D2 at step 630. The user selects either D1 or D2 as the base dashboard. The metadata file of the non-base dashboard is merged with the metadata file of base dashboard at step 635. For example, in the case that D1 is selected as base dashboard, document.xml of D2 is merged into document.xml of D1, forming document.xml of D12. Alternatively, in the case D2 is selected as the base dashboard, document.xml of D1 is merged into document.xml of D2, forming document.xml of D12. For metadata elements that are in conflict, the base dashboard metadata elements are used in the merged document.xml of D12 while the non-base dashboard metadata elements are ignored. As for metadata elements which are not in conflict, they are both included in the merged document.xml of D12.

After resolving metadata conflicts, the process continues to step 638. At step 638, data of the data files of D1 and D2 are merged to form a merged data file of D12. Data conflicts are resolved. Data conflicts are effectively resolved under the manual mode, even if the user has chosen the automatic mode. This is because the user has already selected a base dashboard at step 630. After the data of the data files of D1 and D2 are merged, the process proceeds to step 575.

At step 540, after a determination that no metadata conflicts exists, the DM application analyzes the data files of D1 and D2 to determine if there are data conflicts. For example, the DM application analyzes xldoc of D1 and xldoc of D2 to determine if there are conflicts between them. If no data conflicts are found, the process continues to step 655. If at step 540 conflicts are detected, the DM application proceeds to step 650 to determine conflict resolution mode for data conflicts. For example, the DM application determines if the user has selected automatic mode for resolution of data conflicts or not. If the user has not selected the automatic mode for resolution of data conflicts, the process continues to step 630 to commence manual mode for resolving data conflicts. On the other hand, the process proceeds to step 655 if the user selected the automatic mode for resolving data conflicts.

At step 655, the automatic mode for data conflict resolution commences. The DM application determines if there are data conflicts at step 660. If there are data conflicts, the DM application proceeds to step 665. At step 665, the data files of D1 and D2 are merged and data binding is updated. The process continues to step 575. In the case of no data conflicts, the DM application proceeds to step 670 to merge the data files of D1 and D2. Unlike the case of data conflicts, there is no need to update the binding of the data. After the data files are merged, the process proceeds to step 575.

Figure 6B:
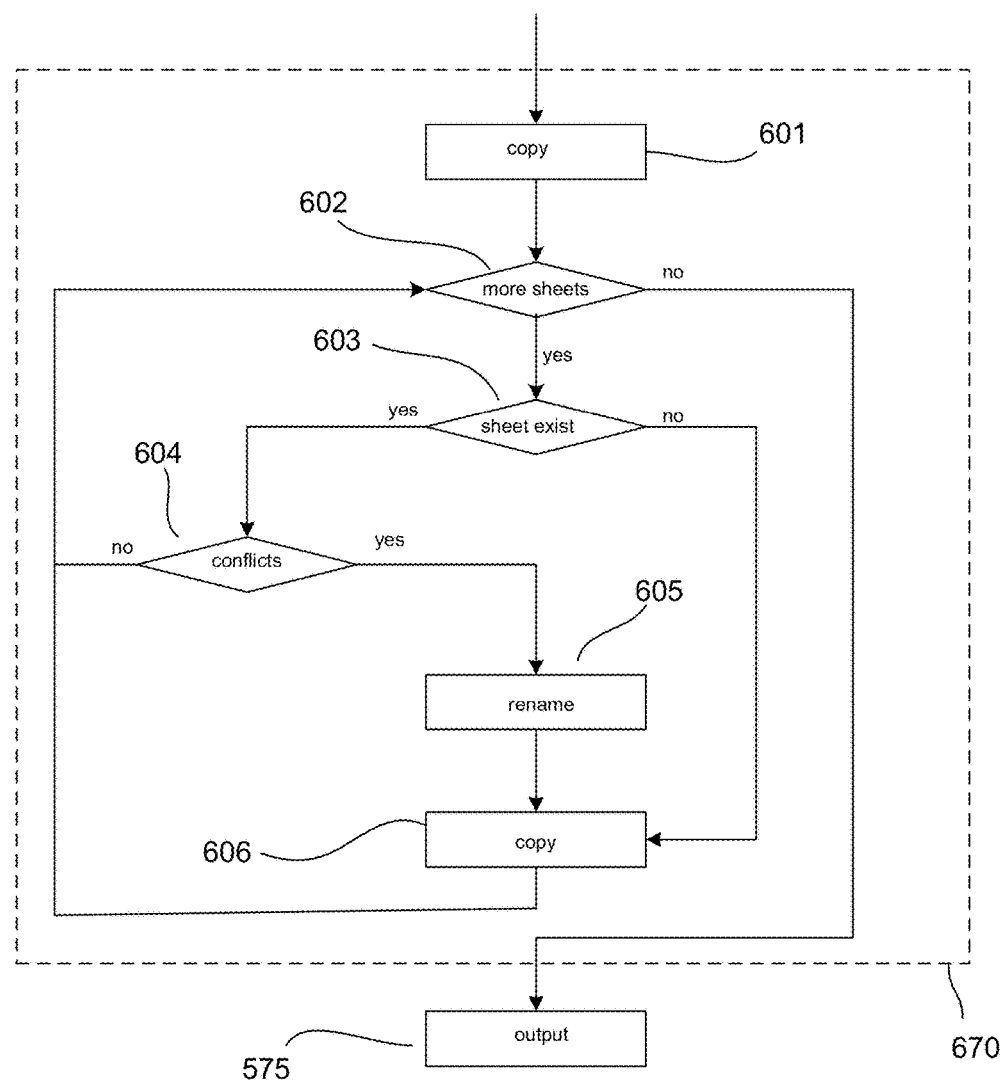

At step 575, the DM application displays the merged dashboard D12, which includes metadata and data of D1 and D2. For example, D12 is displayed for the user for previewing. After previewing, the user can save the dashboard files at step 678. The user may have a choice of name and location at which the dashboard files are saved. Thereafter, the process of the DM application may be terminated at step 580. The process may be repeated to merge additional dashboards. FIG. 6b shows a process 638 for merging data files of the source dashboards D1 and D2. The process is related to manual mode of resolving data files of the D1 and D2. For example, the process depicts the process of merging data files at step 638 of FIG. 6a.

The process of merging the data files of D1 and D2 commences at step 601. For example, the contents of xldoc of D1 are merged with the contents of xldoc of D2. At step 601, the data sheets of the base dashboard data file are copied into the merged dashboard data file. The process then proceeds to merge the data sheets of the non-base dashboard data file into the merged dashboard data file. For example, at step 602, the DM application determines if there are data sheets from the non-base dashboard data file which are to be merged into the merged dashboard data file. In one embodiment, the data sheets of the non-base dashboard are merged one at a time. The data sheets of the non-base dashboard data file may be merged into the merged dashboard data file one at a time, for example, from the first to last. Other configurations of merging the data sheet of the non-base dashboard data file may also be useful.

If there are data sheets from the non-base dashboard to be merged, the process proceeds to step 603. At step 603, the DM application determines if the data sheet to be merged already exist in the data file of the merged dashboard. For example, the DM application determines if the data sheet to be merged already exist in xldoc of D12. If the data sheet which is to be merged does not exist in merged dashboard data file, the DM application proceeds to step 606.

On the other hand, if the data sheet which is to be merged does exist in merged dashboard data file, the DM application proceeds to step 604. At step 604, the process analyzes the two data sheets, the one to be merged and the one in the merged dashboard data file, to determine whether there are data conflicts. If there are no data conflicts between the two data sheets, the process returns to step 602 to see if there are more data sheets to be merged into the merged dashboard data file. There is no need to copy the data sheet since it is already in the merged dashboard data file.

In the case of a conflict with the data sheets, the data sheet of the non-base dashboard data file is renamed at step 605. The process continues to step 606. At step 606, the data sheet from the non-base dashboard date file is copied into the merged dashboard data file. The process returns back to step 602 to determine if there are more data sheets to be merged. If there are no more data sheets to be merged, the process proceeds to step 575 to display the merged dashboard D12.

Figure 6C:
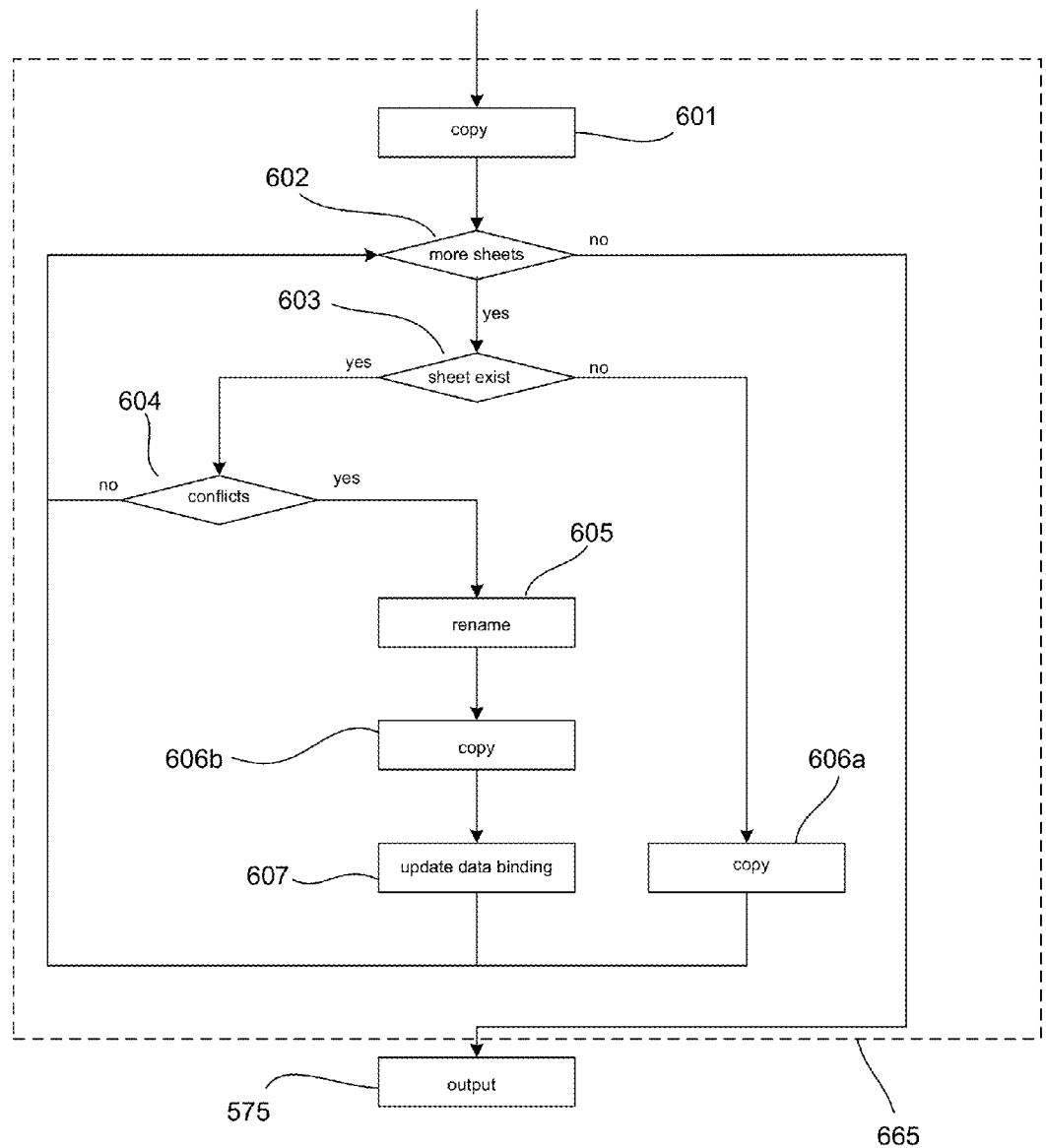

FIG. 6c shows a process 655 for merging data files of the source dashboards D1 and D2. The process is related to automatic mode of resolving data files of the D1 and D2. For example, the process depicts the process of merging data files at steps 655, 660, 665 and 670 of FIG. 6a. The process is similar to the process described in FIG. 6b. Common process steps may not be described or described in detail.

The process of automatic merging the data files of D1 and D2 commences at step 601. The data sheets of the base dashboard data file are copied into the merged dashboard data file. The process then proceeds to merge the data sheets of the non-base dashboard data file into the merged dashboard data file. For example, at step 602, the DM application determines if there are data sheets from the non-base dashboard data file which are to be merged into the merged dashboard data file. The data sheets of the non-base dashboard data file, in one embodiment, is merged into the merged dashboard data file one at a time, for example, from the first to last. Other configurations of merging the non-base data sheets may also be useful.

If there are data sheets from the non-base dashboard to be merged, the DM application proceeds to step 603. At step 603, the DM application determines if the data sheet to be merged already exist in the data file of the merged dashboard. If the data sheet which is to be merged does not exist in merged dashboard data file, the DM application proceeds to step 606a. At step 606a, the data sheet from the non-base dashboard is copied into the merged dashboard data file. Thereafter, the process returns to step 602.

On the other hand, if the data sheet which is to be merged does exist in merged dashboard data file, the DM application proceeds to step 604 to analyze the two data sheets, the one to be merged and the one in the merged dashboard data file, to determine whether there are data conflicts. If there are no data conflicts between the two data sheets, the process returns to step 602 to see if there are more data sheets to be merged into the merged dashboard data file.

In the case of a conflict with the data sheets, the data sheet of the non-base dashboard data file is renamed at step 605. The process continues to step 606b. At step 606b, the data sheet from the non-base dashboard is copied into the merged dashboard data file. The process continues to step 607 for updating data binding of the data sheets and dashboard components. Thereafter, the process returns back to step 602 to determine if there are more data sheets to be merged. If there are no more data sheets to be merged, the process proceeds to step 575 to display the merged dashboard D12.

As described, the DM application may be a wizard-based application. For example, a UI presents a user with a sequence of dialog boxes that lead the user through the process of merging dashboards. Other types of DM applications may also be useful.

Figure 7A:
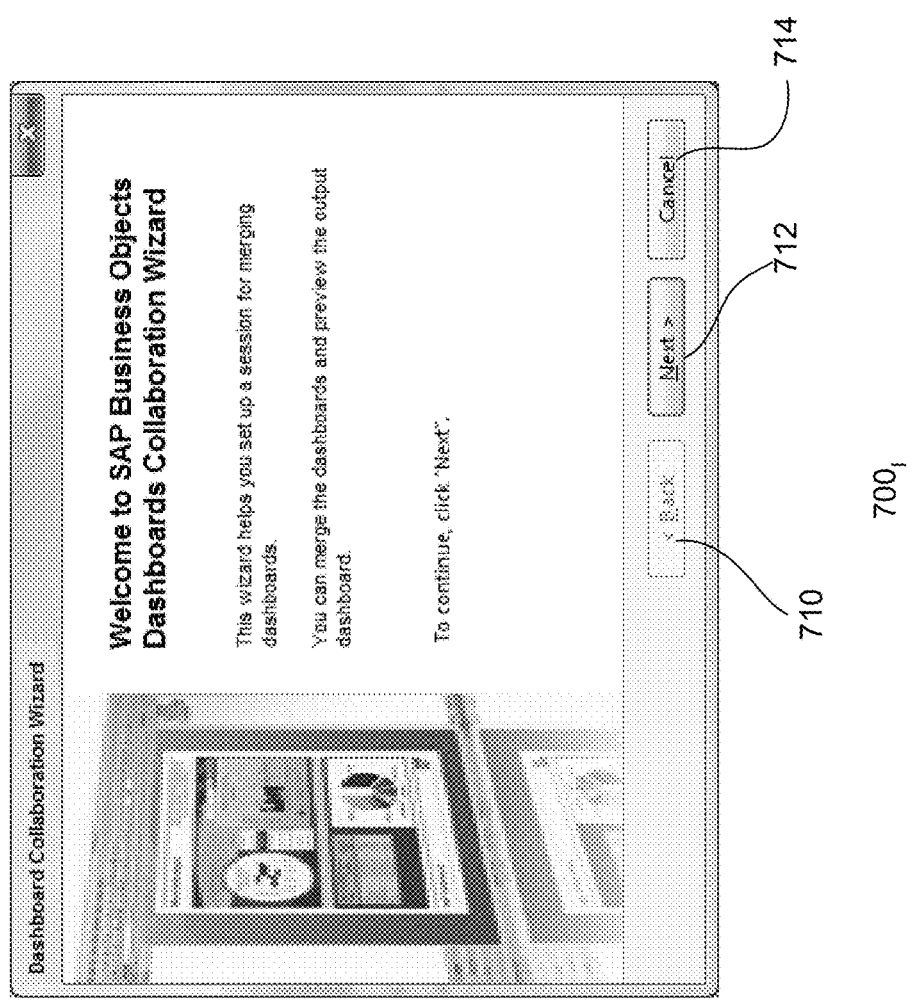

FIGS. 7a-f show various dialog boxes of a DM application. Referring to FIG. 7a, a first dialog box $700_1$ of a sequence of dialog boxes of the DM application is shown. The first dialog box, for example, is the dialog box displayed when the DM application is initiated. The sequence of dialog boxes, for example, may correspond to the process described in FIGS. 6a-c. As shown, the dialog box includes a description of the DM application and some instructions as to how to proceed. A dialog box includes command buttons for navigating through the process of the DM application. For example, a dialog box includes a back command button 710, a next command button 712 and a cancel command button 714. Available commands are highlighted while unavailable commands are lightened. In the case of first dialog box, the back command is not available.

Figure 7B:
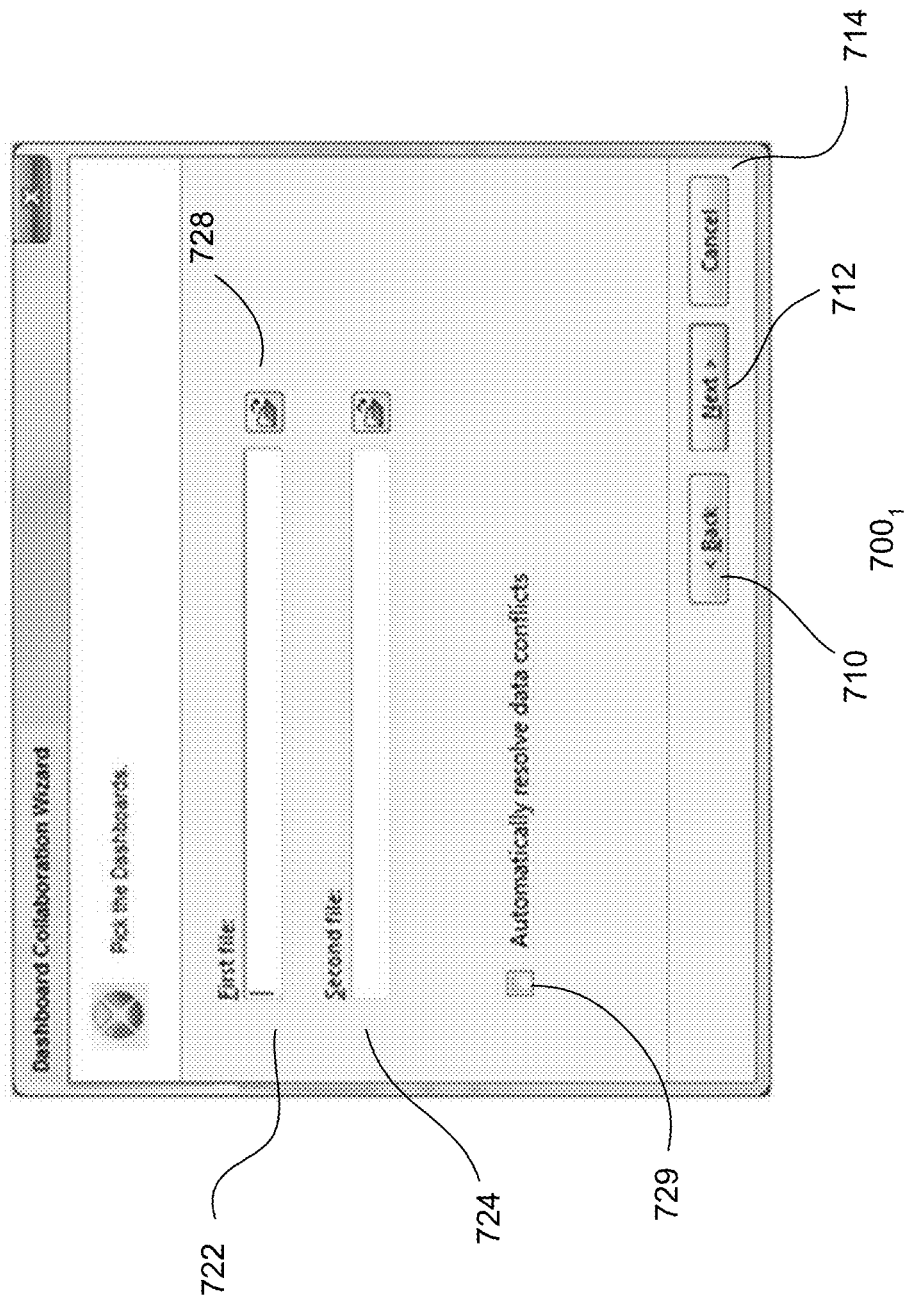

FIG. 7b shows a dashboard selection dialog box $700_1$ for the DM application. The dashboard selection dialog box, for example, is the second in the sequence of dialog boxes for the DM application. The dashboard selection dialog box, for example, corresponds to step 510 of the FIG. 6a. In one embodiment, the dashboard selection dialog box includes first and second inputs 722 and 724 for selecting first and second databases D1 and D2 for merging. A directory search button 728 may be provided for an input box to navigate to the location of the source databases.

In one embodiment, the dashboard selection dialog box includes an option 729 for the user to select whether data conflicts are automatically resolved. For example, when the user checks or selects this option, the DM application exercises the automatic mode of conflict resolution for data conflicts. Other configurations of selecting how data conflicts are resolved may also be useful.

Figure 7C:
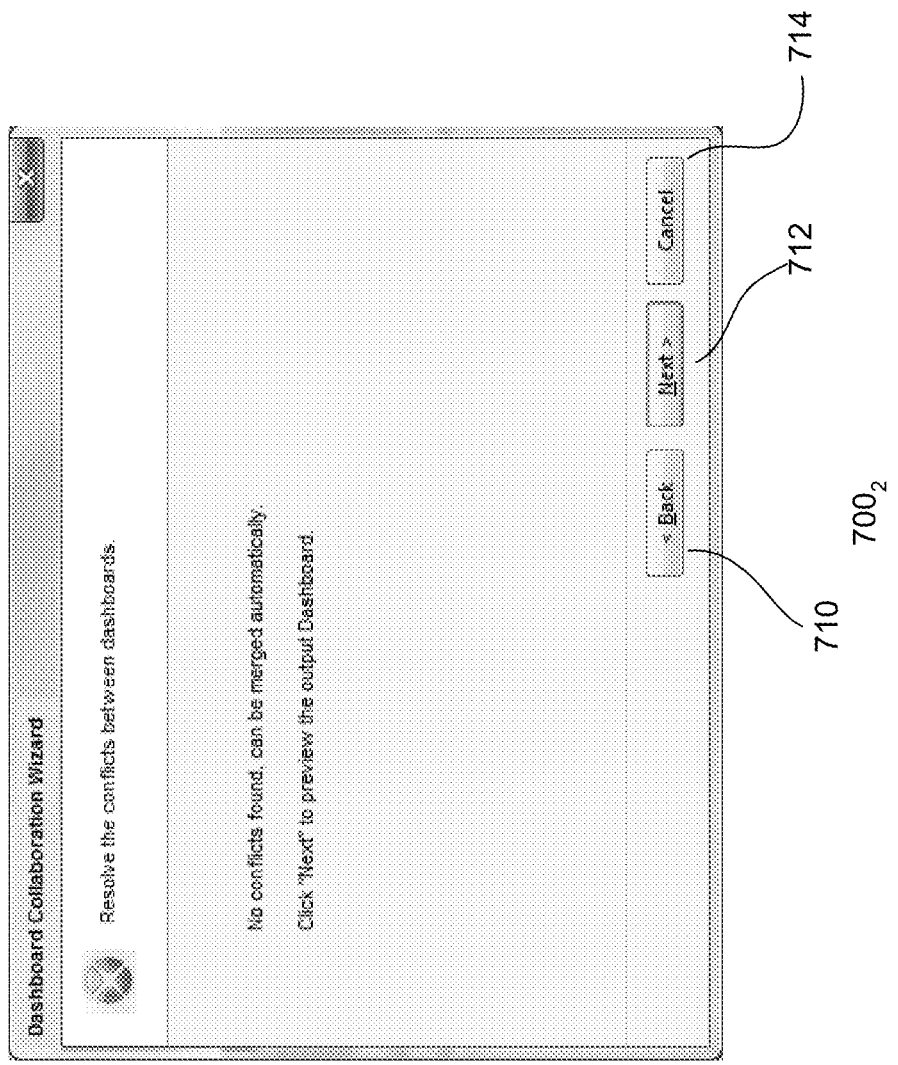

In FIG. 7c, a no conflict dialog box $700_2$ is shown. The DM application displays the no conflict dialog box when no conflicts are found in the source dashboards D1 and D2. For example, after step 540, the no conflict dialog box is displayed when there are no conflicts between the source dashboards D1 and D2. The user may click on the next command button to merge the source dashboards and to display the merged dashboards for previewing.

Figure 7D:
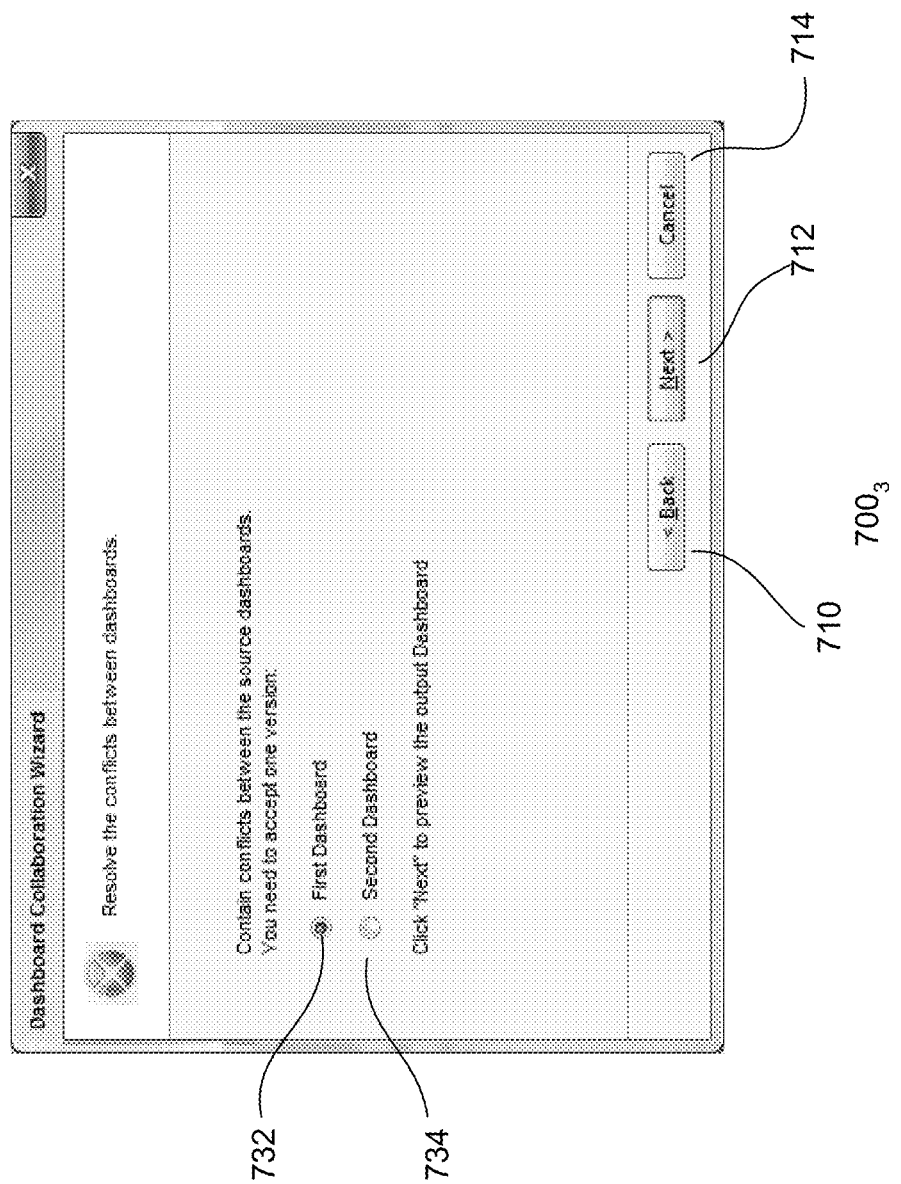

FIG. 7d shows a conflict dialog box $700_3$. As shown, the conflict dialog box includes first and second selectors 732 and 734 for selecting one of the source dashboards as the base dashboard. For example, a user clicks on either the first or second selector for selecting the first dashboard D1 or the second dashboard D2 as the base dashboard. This, for example, corresponds to step 630.

Once the base dashboard is selected, the user may click the next command button. Clicking next command button causes the DM application to merge the information of the non-base dashboard into the base dashboard file. In one embodiment, the DM application merges the metadata of the non-base dashboard into the base dashboard. This, for example, corresponds to step 635. The merged dashboard is displayed for the user to preview, corresponding to step 575.

Figure 7E:
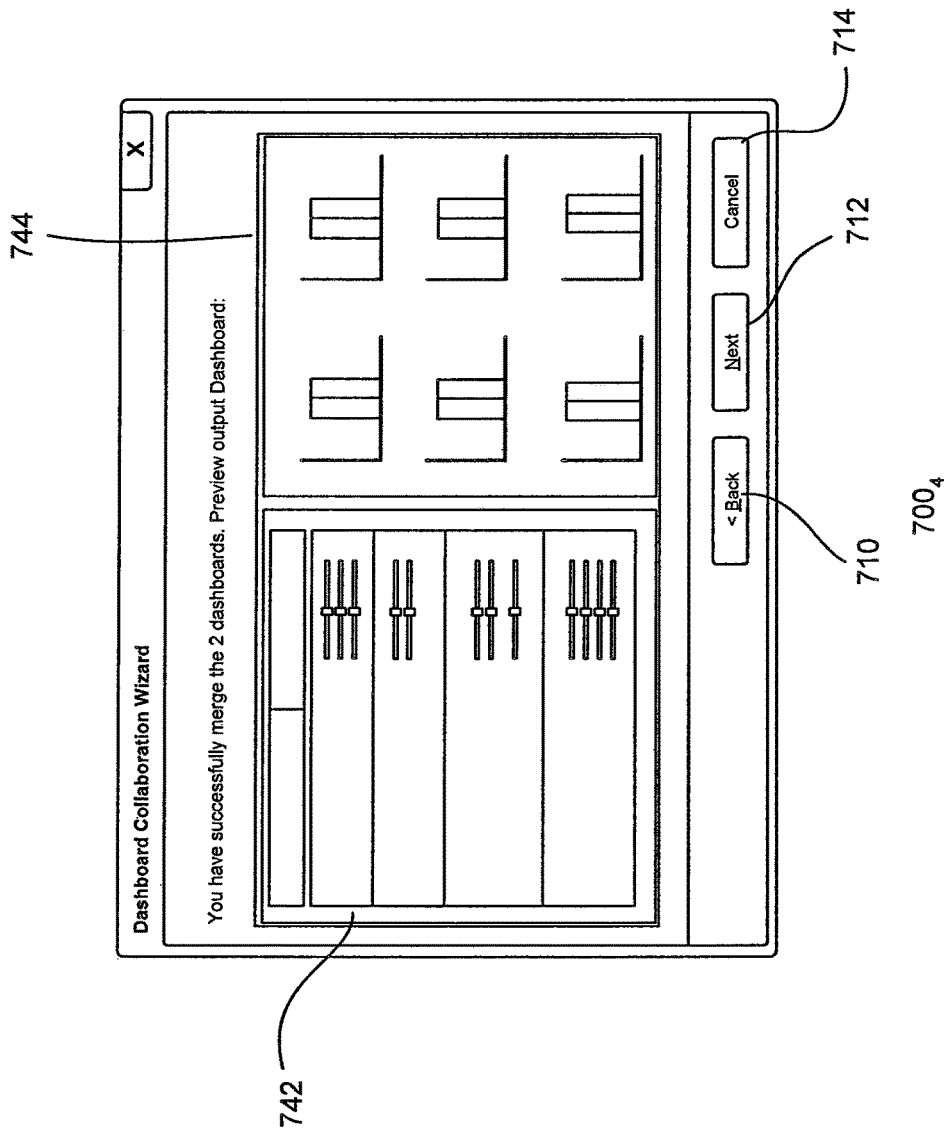

FIG. 7e shows a preview dialog box $700_4$. The preview dialog box includes a display of the merged dashboard, including the dashboard files. As shown, the output includes the components of the merged dashboard, merged metadata file and merged data file. The preview dialog box is presented after merging of the two source dashboards. For example, the preview dialog box corresponds to step 575. The user may proceed to the next dialog box by clicking the next command button.

Referring to FIG. 7f, a save dialog box $700_5$ is shown. The save dialog box is presented after a user has previewed the merged dashboard and clicked the next command button. The save dialog box includes an input box 780 for inputting the desired name for the merged dashboard and location where it is saved. A browse command button 782 may be provided to view the available locations to which the merged dashboard is saved. Once the desired name and location are provided, the user may complete the save process by clicking on the finish command button 716. The save dialog box, for example, is the last dialog box of the sequence.

Figure 8C:
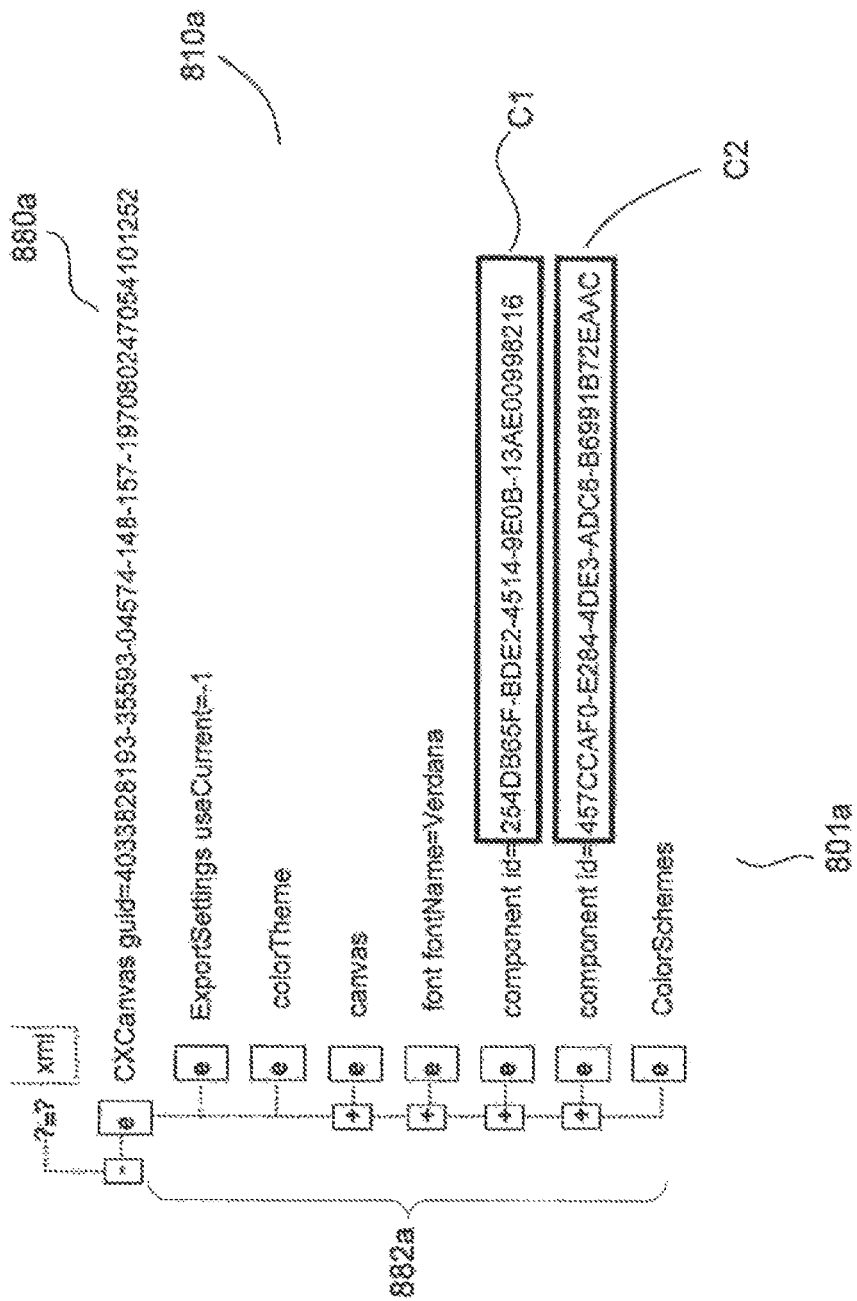

FIGS. 8a-i illustrate an example of a process of merging first and second dashboards. A first dashboard 800a and its corresponding first metadata and data files 810a and 820a are shown in FIGS. 8a-c. The first dashboard includes first and second components C1 and C2. The first component is a pie chart and the second component is a bar chart. The metadata file includes a canvas guide 880a for the first dashboard and entry items 882a. The entry items include format information of the dashboard and components C1 and C2. The data file includes header information 872a and 874a for rows and columns. The data of the first dashboard is provided in a sheet 890a of the first data, file.

Figure 8D:
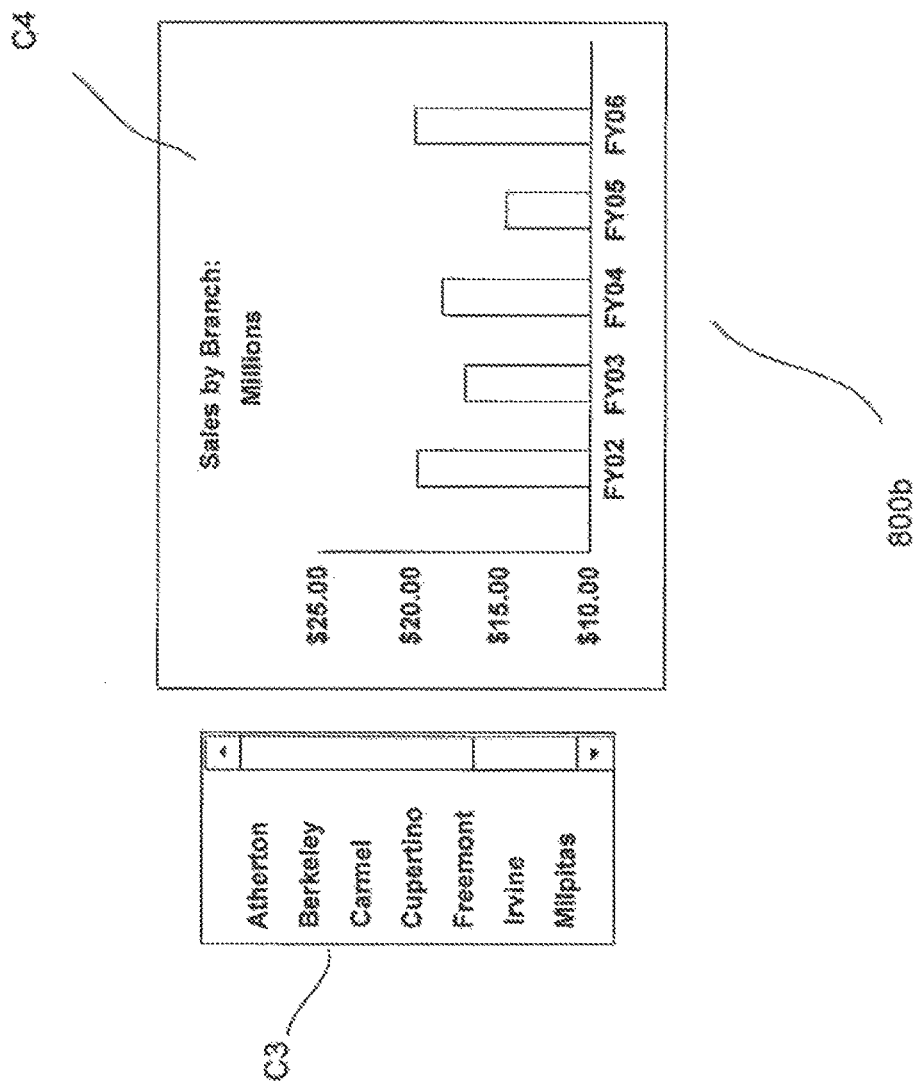
Figure 8F:
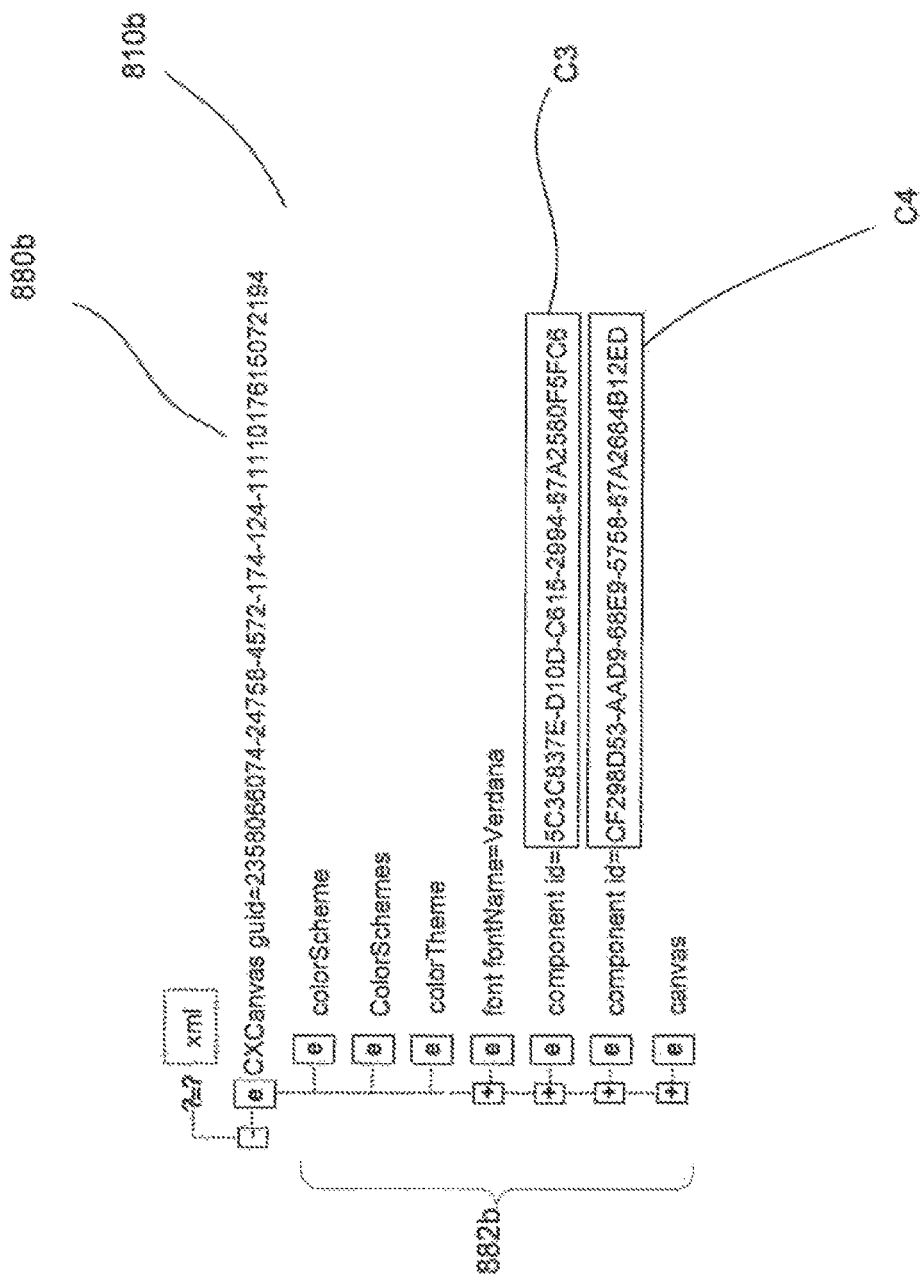

As for FIGS. 8d-f, a second dashboard 800b and its second metadata and data files 810b and 820b are shown. The second dashboard includes third and fourth components C3 and C4. The third component is a selector component and the fourth component is a bar chart. The metadata file includes a canvas guide 880b for the second dashboard and entry items 882b. The entry items include format information of the dashboard and components C3 and C4. The data file includes header information 872b and 874b for rows and columns. The data of the second dashboard is provided in a sheet 890b of the second data file.

As illustrated, there are no conflicts between the dashboards. The metadata and data files of the first and second dashboards do not have any conflicts. For example, there are no conflicts between the component ids, entry items and sheet names and cell values of the first and second metadata and data files, as illustrated in Table 1 below:

TABLE 1

Figure 8G:
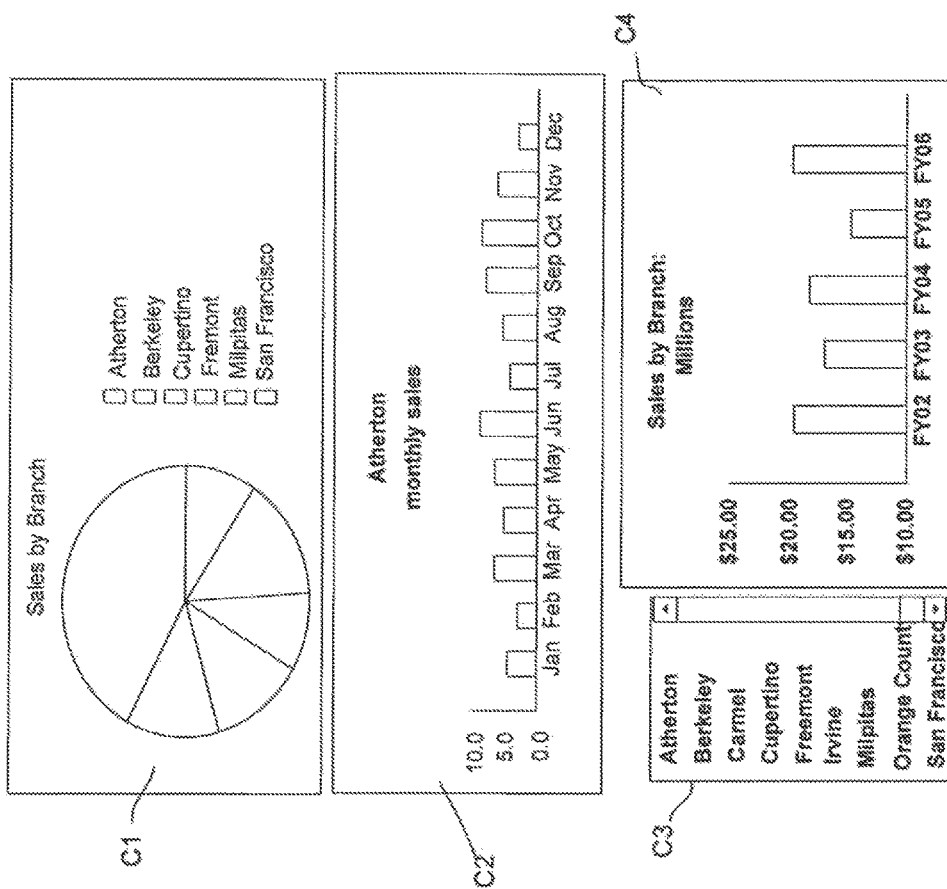
Figure 8H:
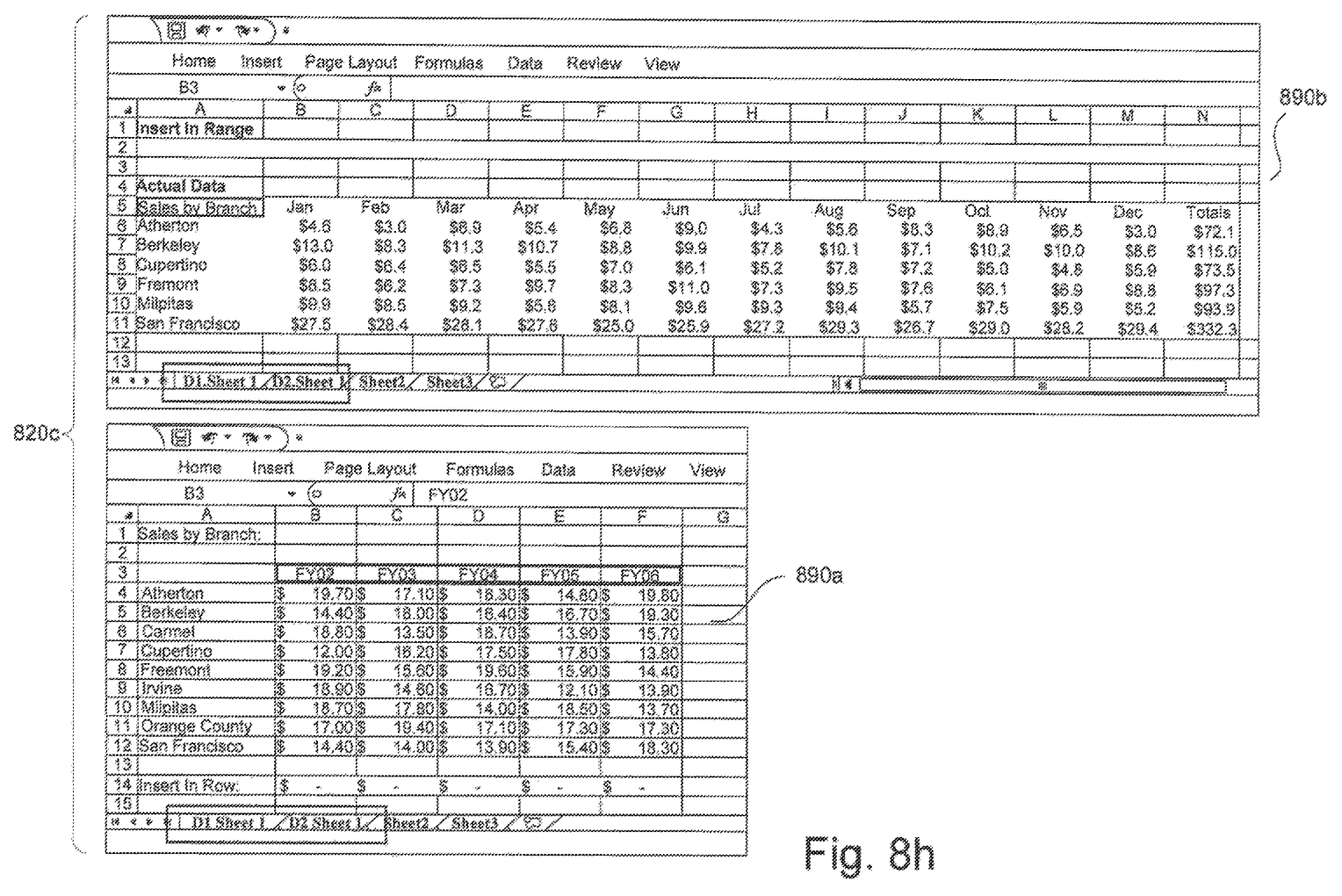
Figure 8I:
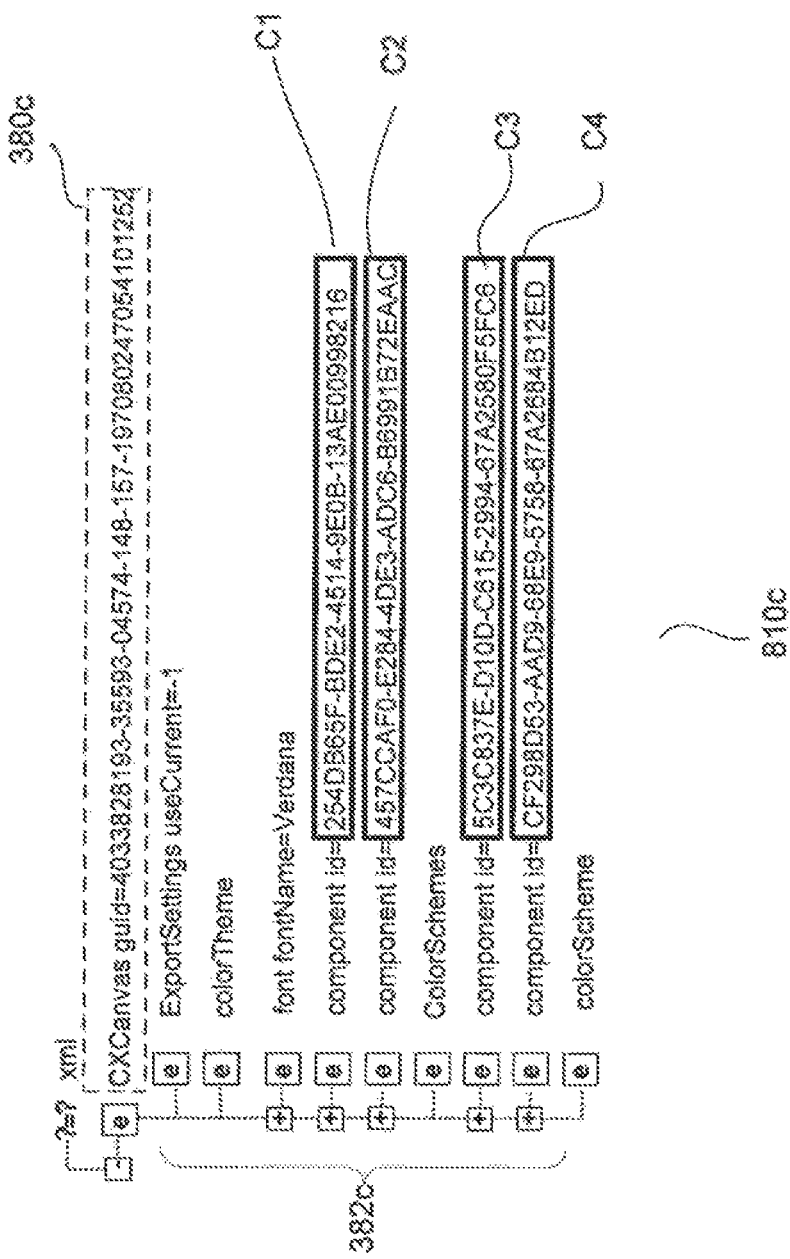

| Item | Conflict |
| --- | --- |
| Component id | No |
| Metadata | No |
| Data | No | in this scenario, the DM application will automatically merge the first and second dashboards. FIGS. 8g-i show the resulting merged dashboard 800c and its corresponding merged metadata and data files 810c and 820c. The merged dashboard includes components C1, C2, C3 and C4. The metadata file includes the component ids of C1, C2, C3 and C4. The data file includes data for C1, C2, C3 and C4. For example, the data file includes first and second data sheets 890a-b corresponding to the first and second dashboards.

Figure 9C:
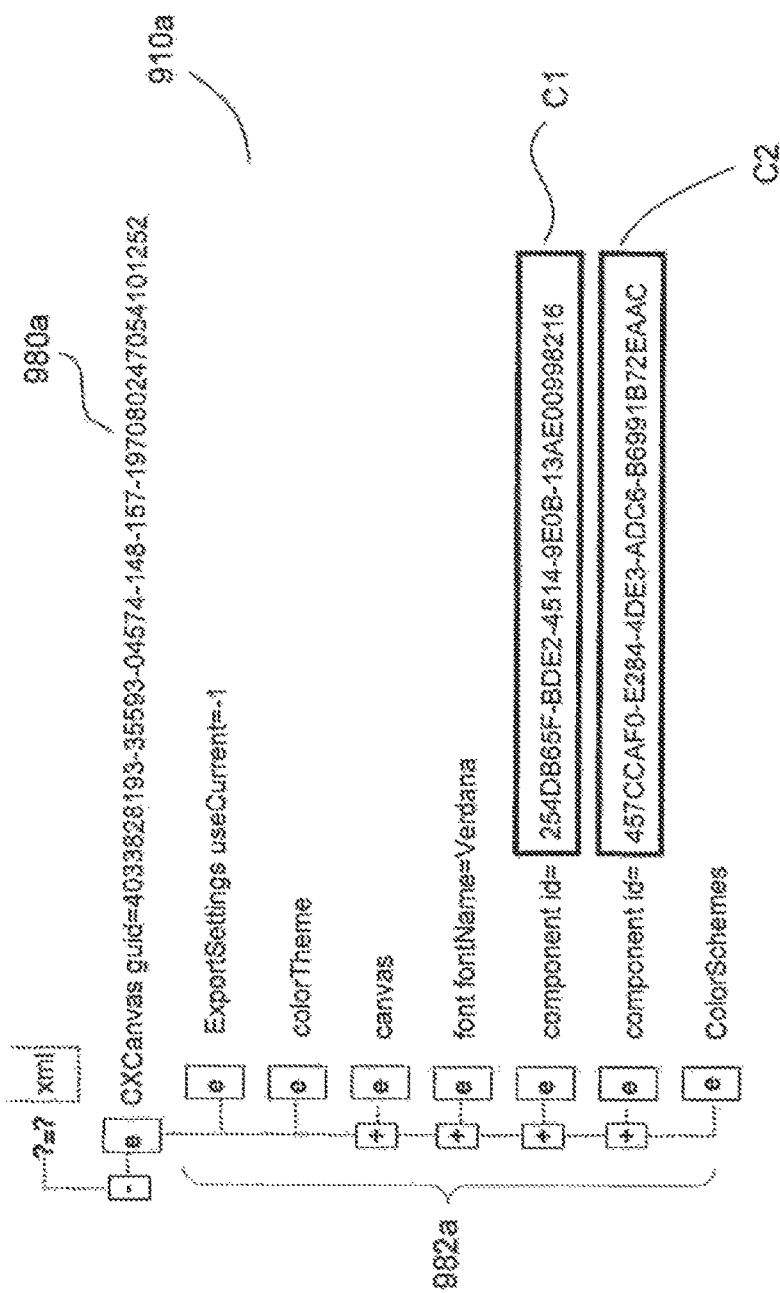

FIGS. 9a-l show another example of a process of merging first and second dashboards. A first dashboard 900a and its corresponding first metadata and data files 910a and 920a are shown in FIGS. 9a-c. The first dashboard includes first and second components C1 and C2. The first component is a pie chart and the second component is a bar chart. The metadata file includes a canvas guide 980a for the first dashboard and entry items 982a. The entry items include format information of the dashboard and components C1 and C2. The data file includes header information 972a and 974a for rows and columns. The data of the first dashboard is provided in a sheet 990a of the first data file.

Figure 9D:
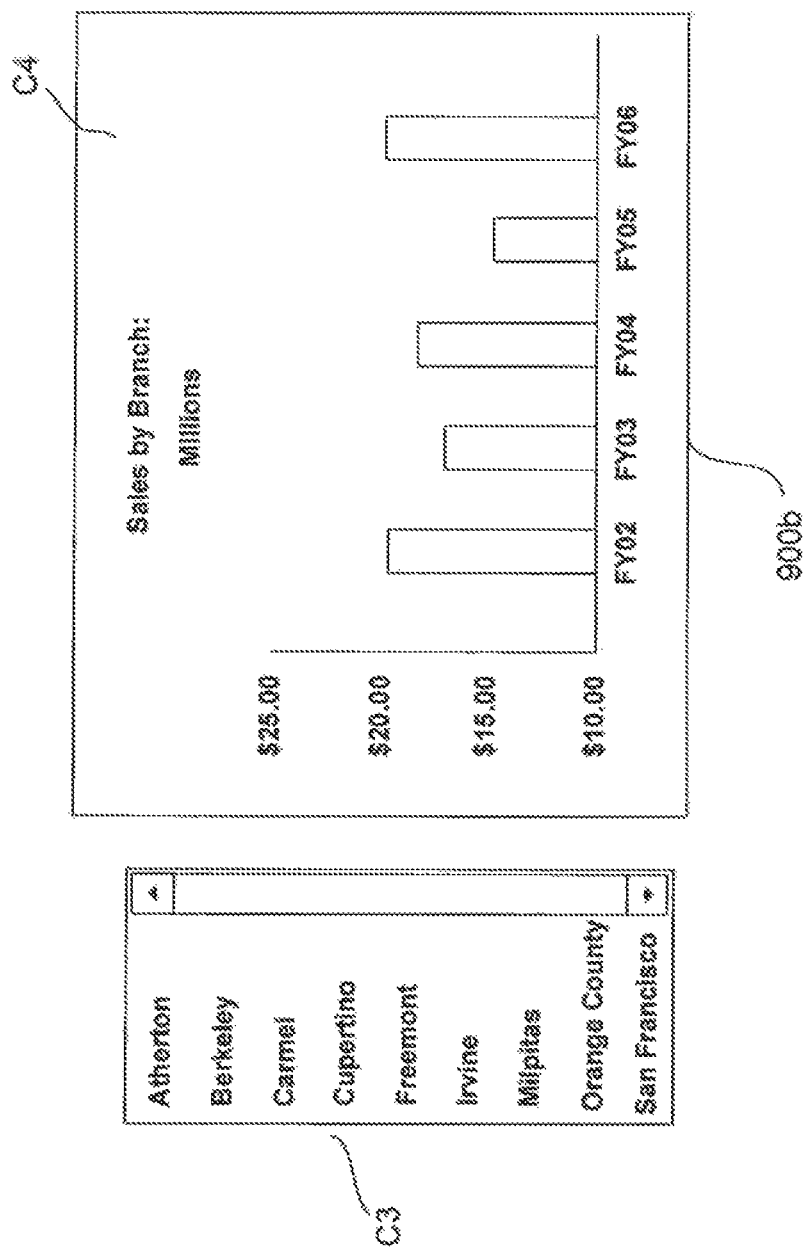
Figure 9E:
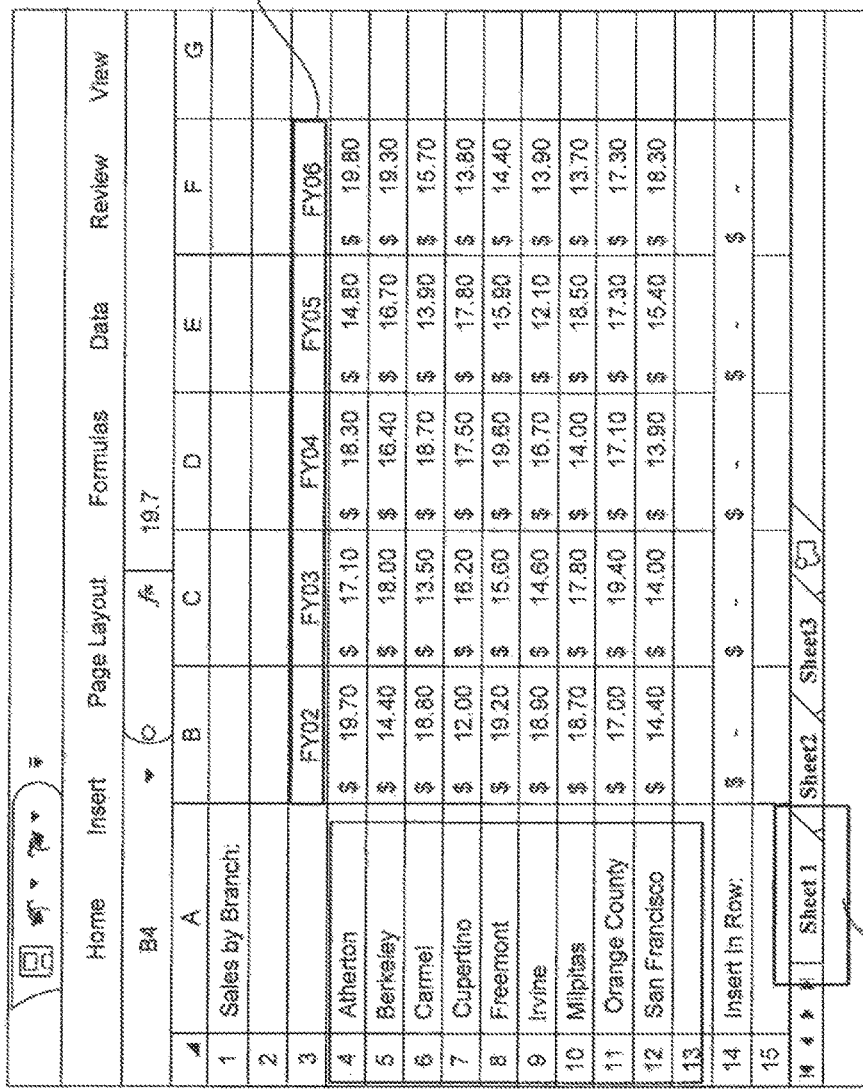
Figure 9F:
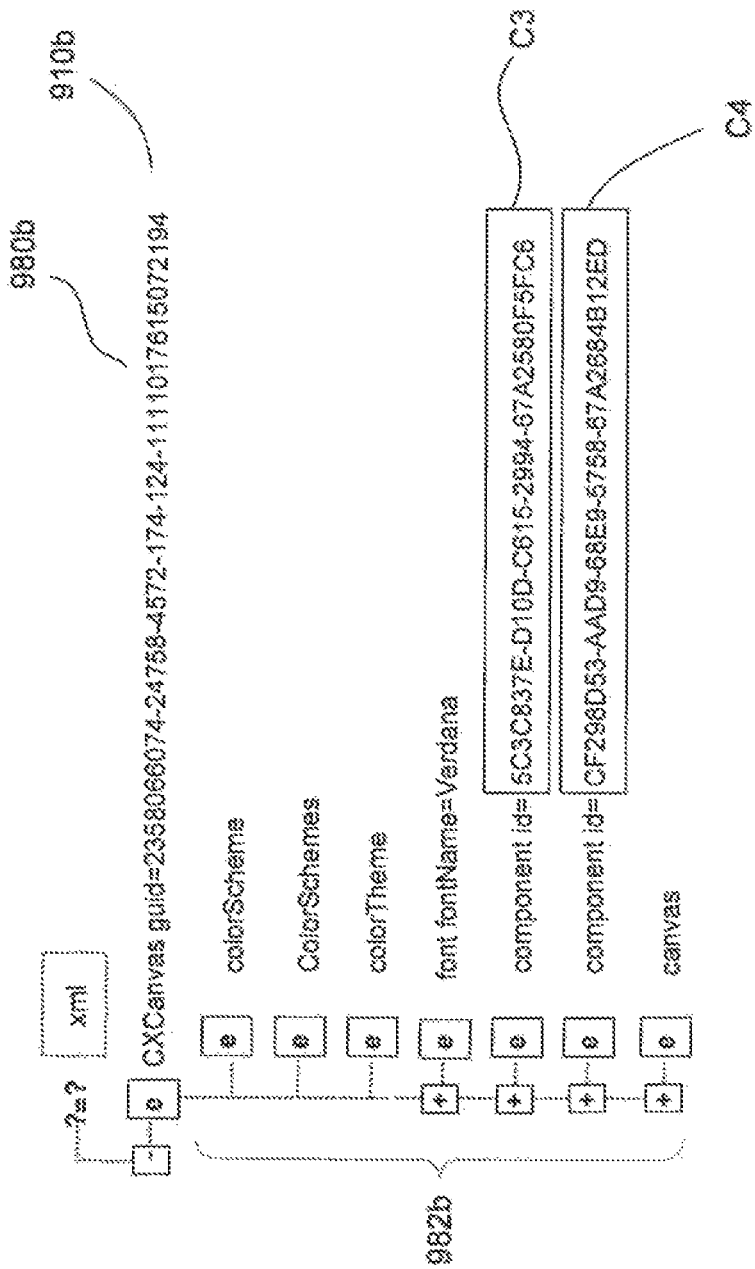

As for FIGS. 9d-f, a second dashboard 900b and its second metadata and data files 910b and 920b are shown. The second dashboard includes third and fourth components C3 and C4. The third component is a selector component and the fourth component is a bar chart. The metadata file includes a canvas quid 980b for the second dashboard and entry items 982b. The entry items include format information of the dashboard and components C3 and C4. The data file includes header information 972b and 974b for rows and columns. The data of the second dashboard is provided in a sheet 990b of the second data file.

As illustrated, there is a conflict between the dashboards. The conflict exists in the data files of the dashboards. As shown, data files have a conflict in the binding data. In this case, the sheet names are the same but the cell values are different. For example, both sheets for C2 and C4 have the same name, Sheet 1. However, the cell values for C2 are monthly sales values while the cell values for C4 are annual sales values. When the data files have the same sheet names but different cell values, there is a binding data conflict. As such, the first and second dashboards have a conflict in the binding data, as reflected in Table 2 below:

TABLE 2

| Item | Conflict |
| --- | --- |
| Component id | No |
| Metadata | No |
| Data | Yes |

In the event a data conflict is detected, the DM application provides the user two options for conflict resolution. The two options are manual conflict resolution or automatic conflict resolution. If the manual mode is selected, the user may select one of the source dashboards as the base dashboard. On the other hand, if automatic mode is selected, the DM application automatically merges the two dashboards.

Figure 9G:
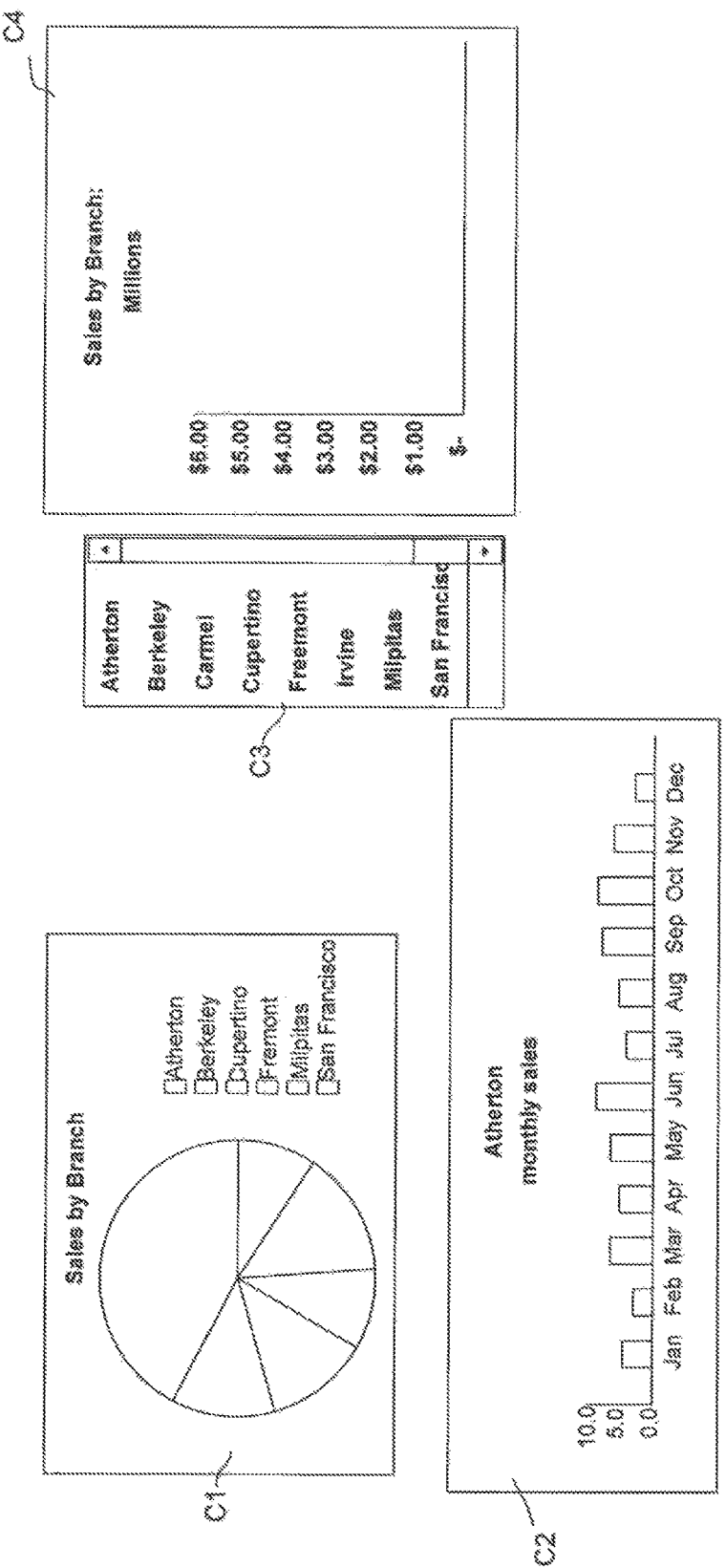
Figure 9H:
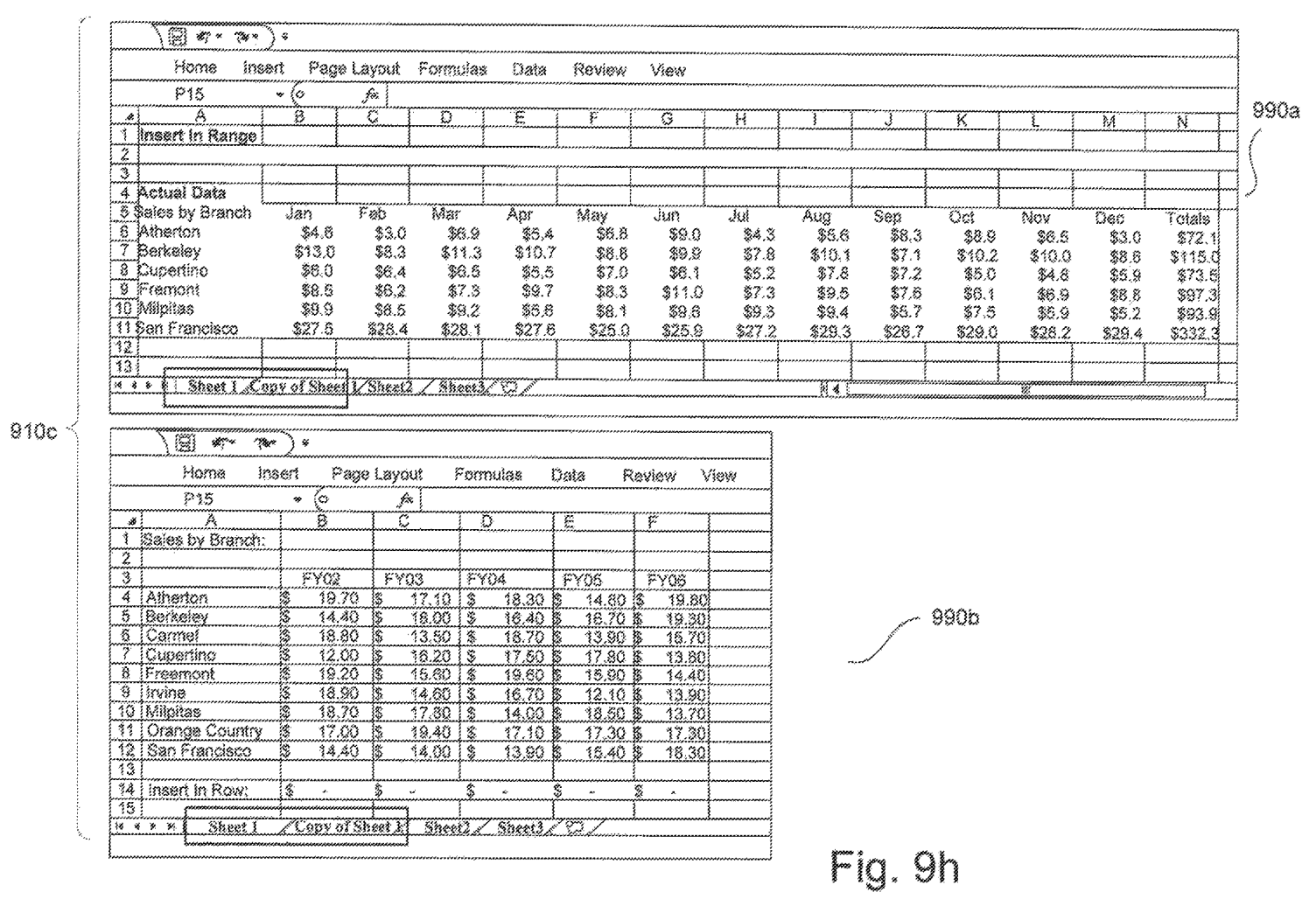
Figure 9I:
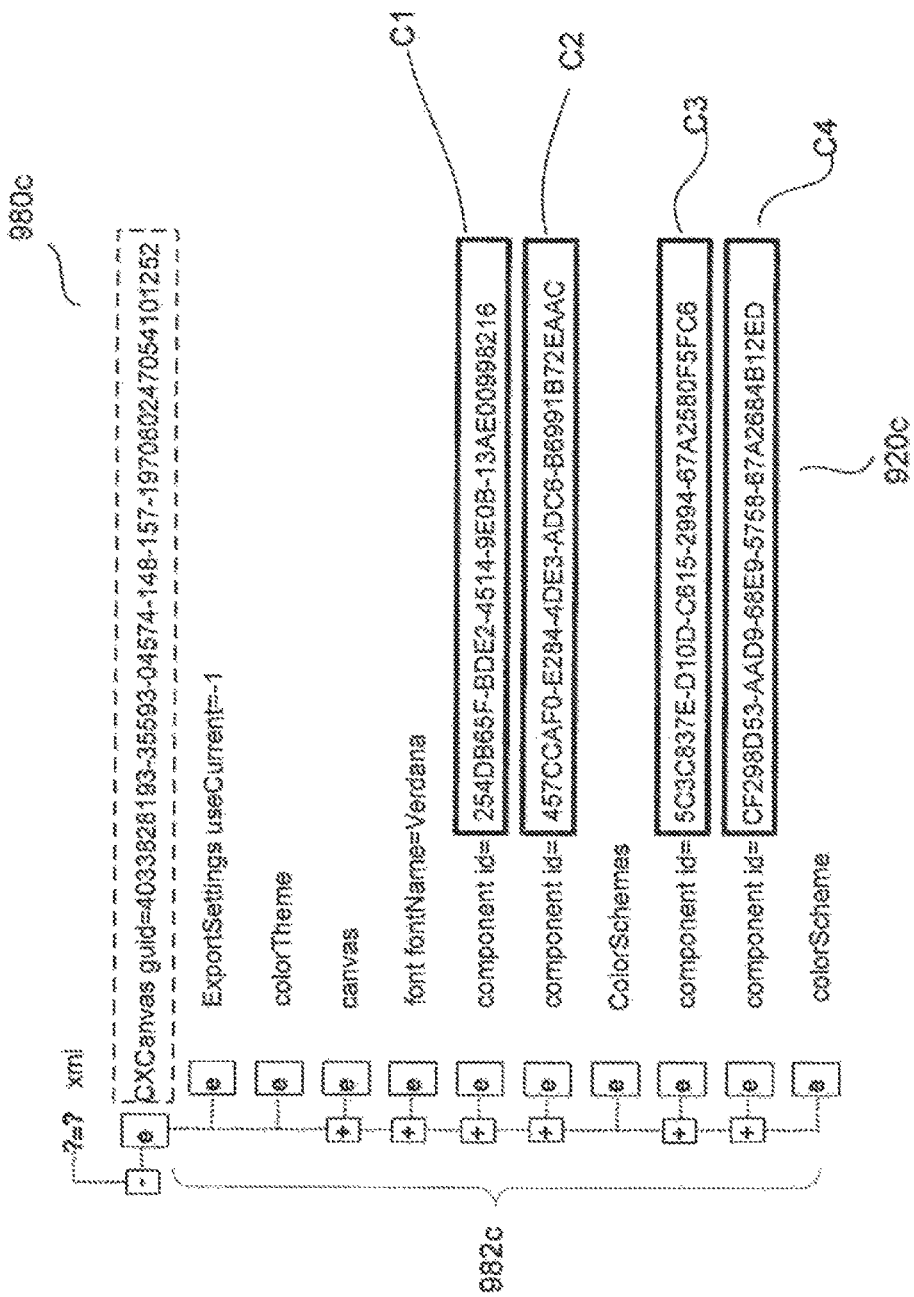

FIGS. 9g-i show the case of manual data conflict resolution where the user selects the first dashboard as the base dashboard. The resulting merged dashboard 900c and its corresponding merged metadata and data files 910c and 920c are shown. The merged dashboard includes components C1 C2, C3 and C4. The metadata file includes the component ids of C1, C2, C3 and C4. The data file includes the data sheet of the first (base) dashboard and a copy of the data sheet from the second (non-base) database. As shown, both data sheet of the first and second dashboards have the same name, which is Sheet 1, Since there is a conflict in sheet name between the dashboards, the data sheet of the non-base dashboard is renamed. For example, as shown, the name of the non-base datasheet is renamed to Copy of Sheet 1. Although the data sheet from the second data file is copied, it is not bound to C4, For example, the data of the non-base dashboard is not applied to C4.

Figure 9J:
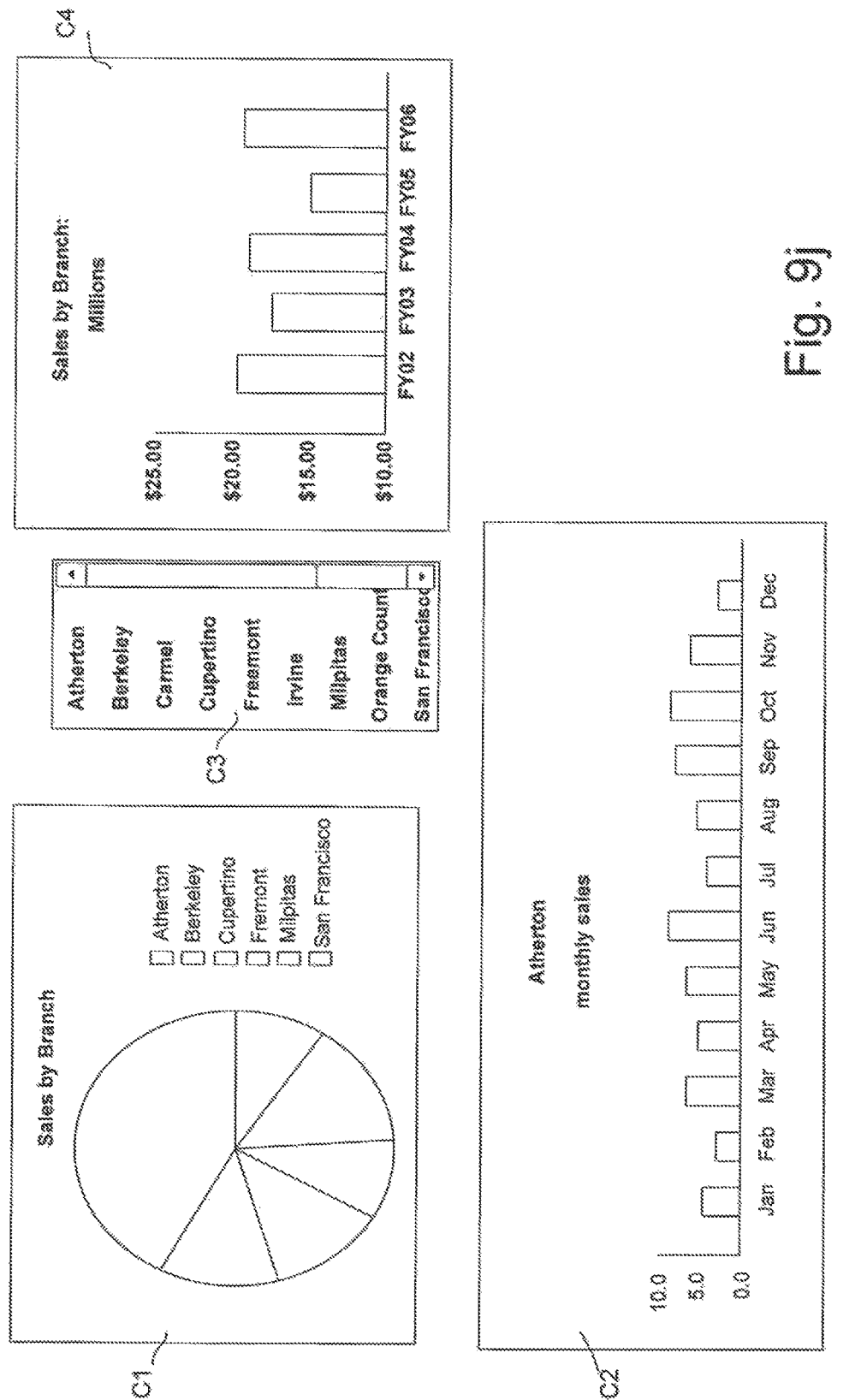
Figure 9K:
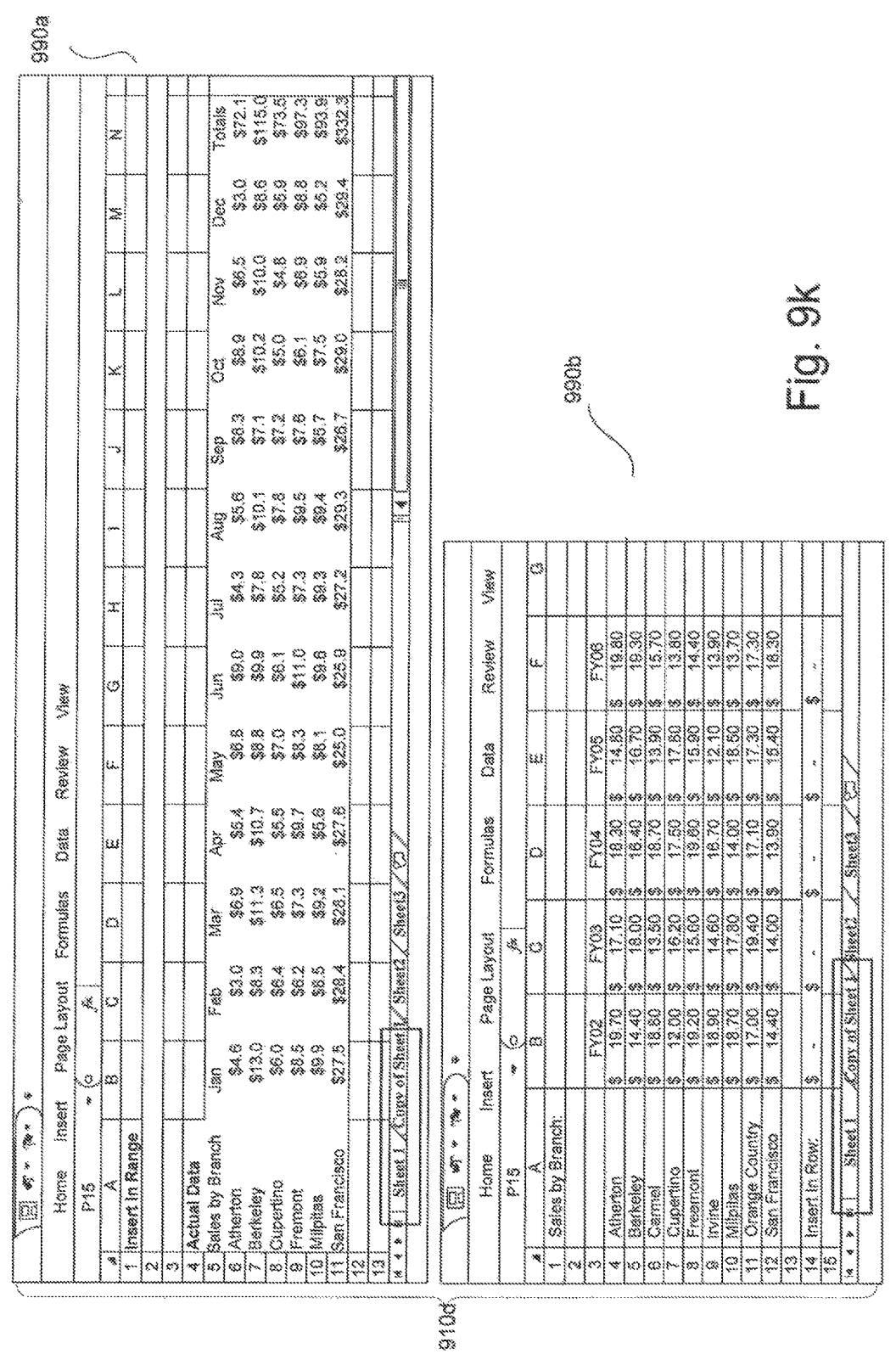
Figure 9I:
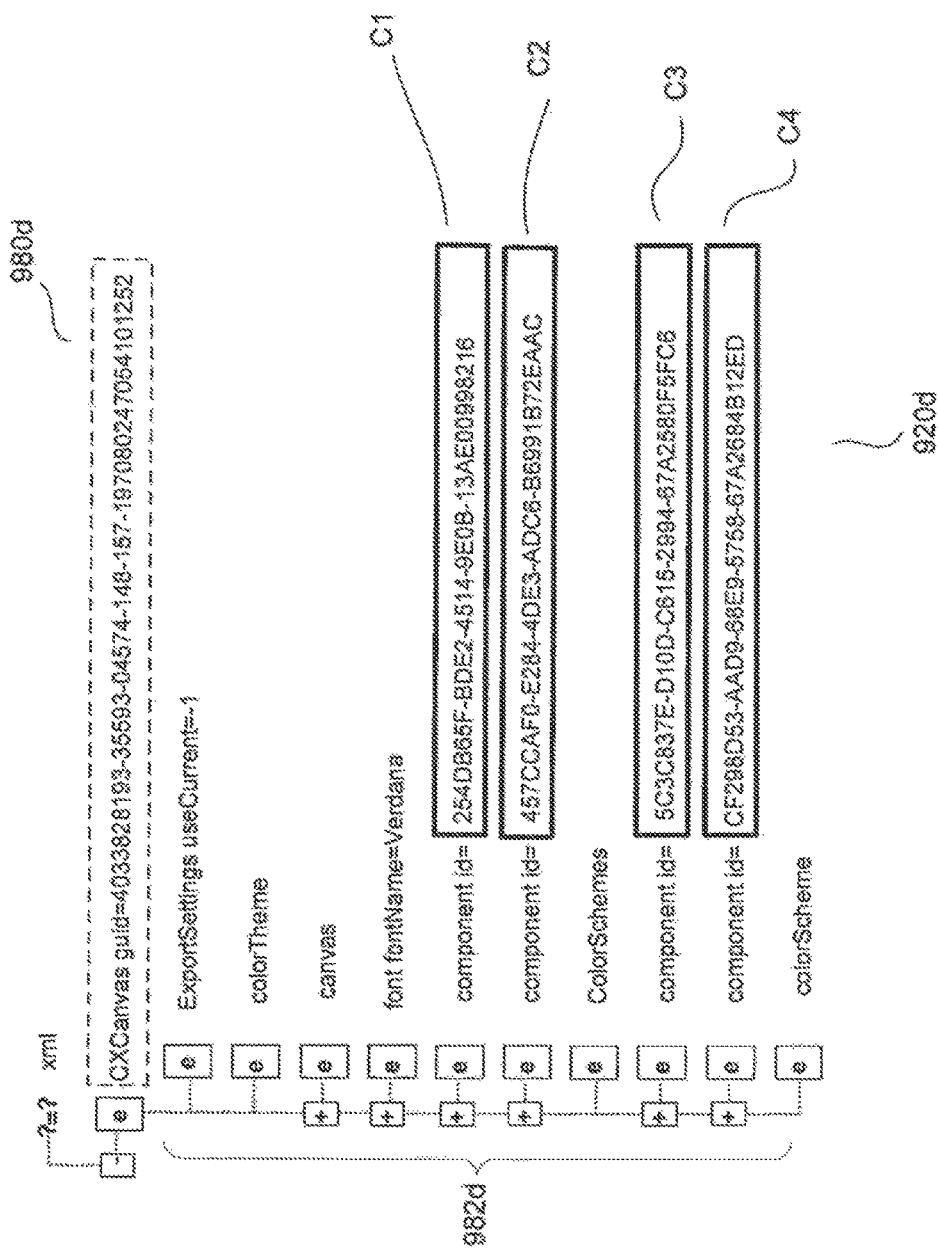

FIGS. 9j-l show the automatic data conflict resolution by the DM application. The resulting merged dashboard 900d and its corresponding merged metadata and data files 910d and 920d are shown. The merged metadata and data files are similar to that for manual conflict resolution. For example, the merged dashboard includes components C1, C2, C3 and C4. The metadata file includes the component ids of C1, C2, C3 and C4. The data file includes the data sheet of the first and second dashboards. Unlike the manual mode, the data binding is updated. As such, the data for C4 is kept.

Figure 10A:
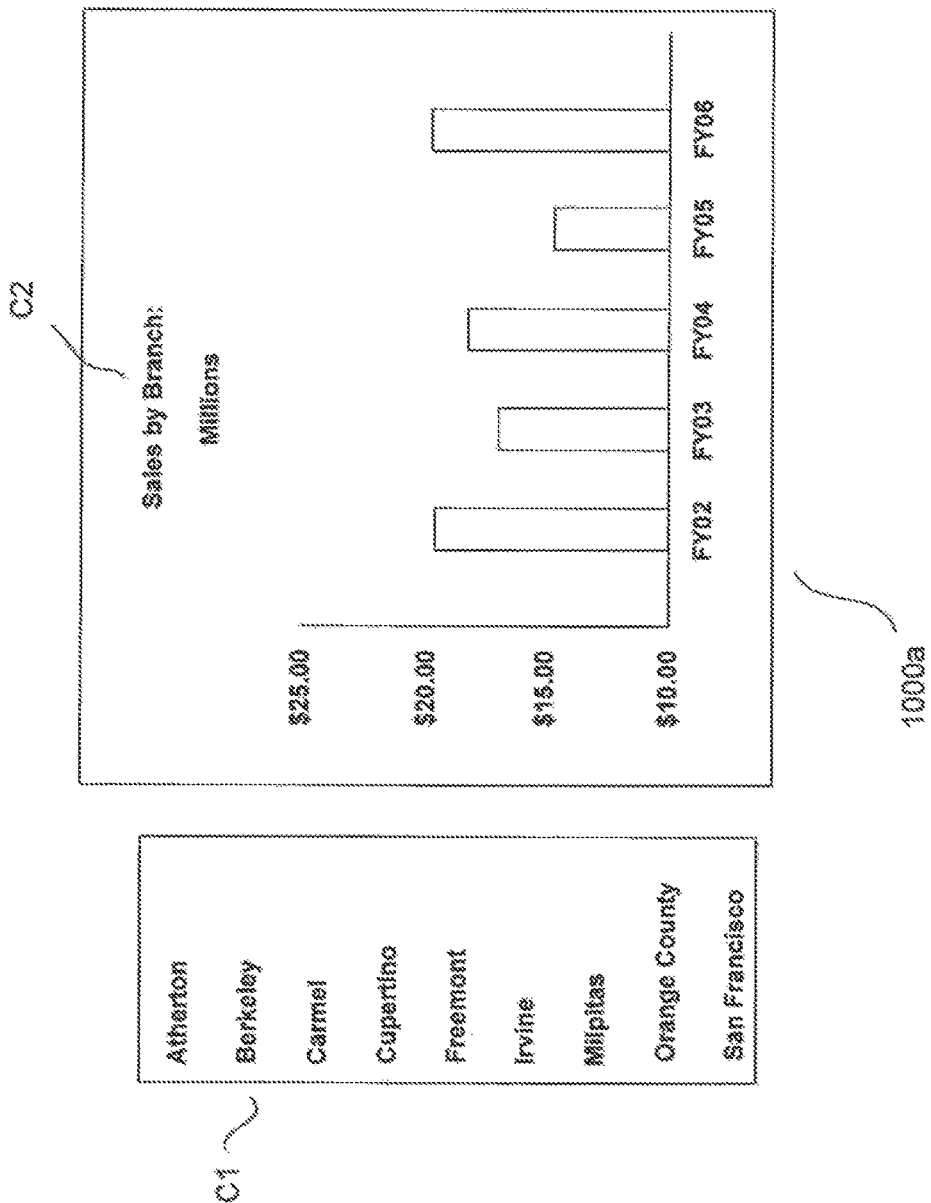
Figure 10C:
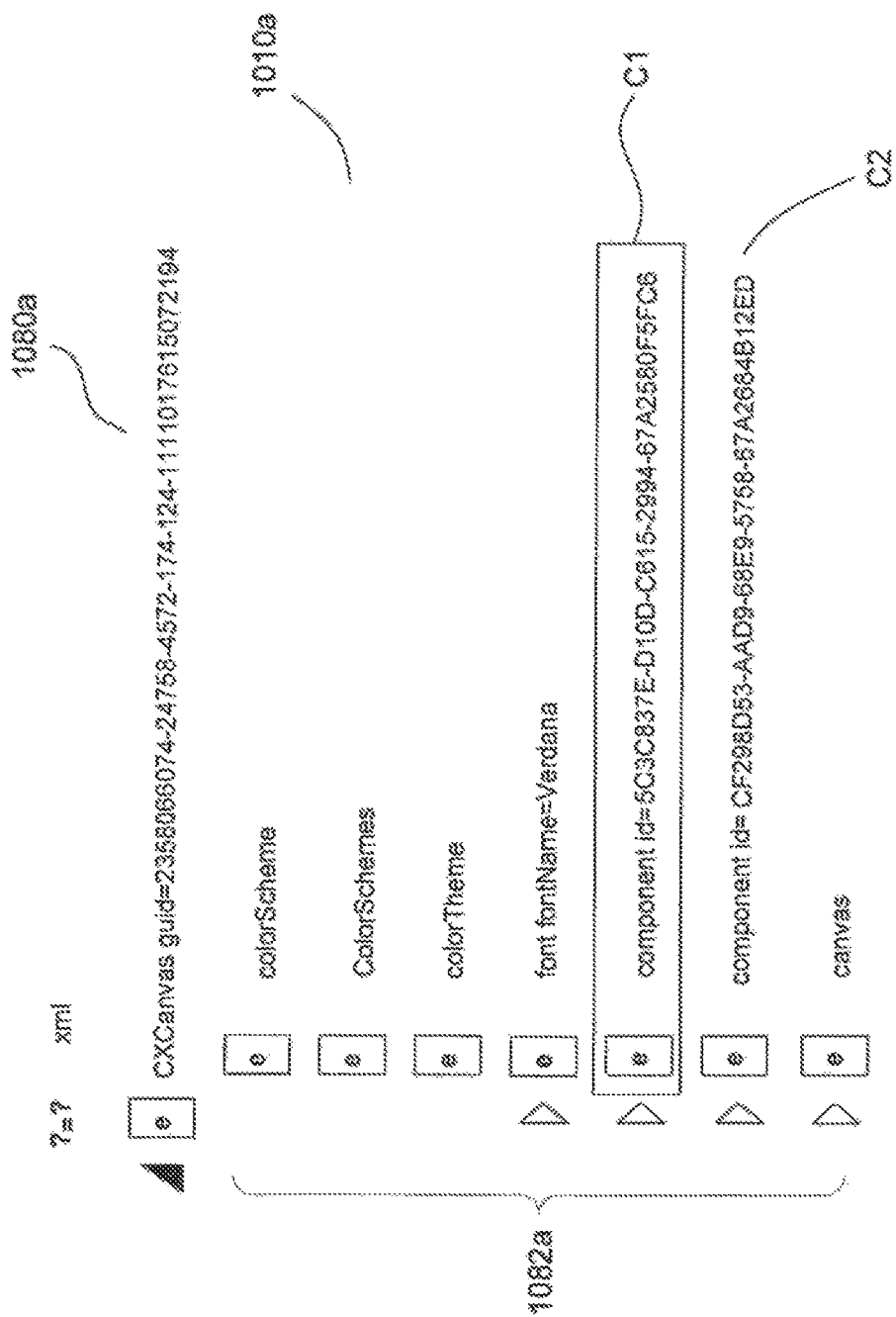

FIGS. 10a-i show another example of a process of merging first and second dashboards. A first dashboard 1000a and its corresponding first metadata and data files 1010a and 1020a are shown in FIGS. 10a-c. The first dashboard includes first and second components C1 and C2. The first component is a selector and the second component is a bar chart. The metadata file includes a canvas guide 1080a for the first dashboard and entry items 1082a. The entry items include format information of the dashboard and components C1 and C2. The data file includes header information 1072a and 1074a for rows and columns. The data of the first dashboard is provided in a sheet 1090a of the first data file.

Figure 10D:
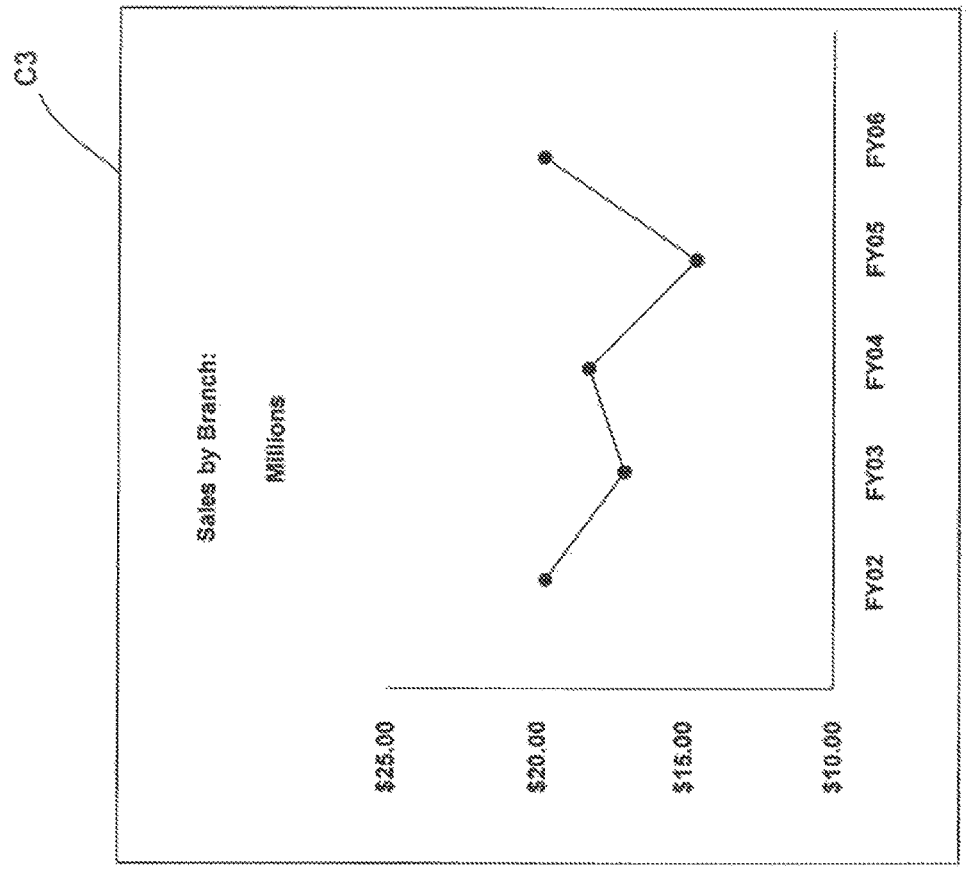
Figure 10F:
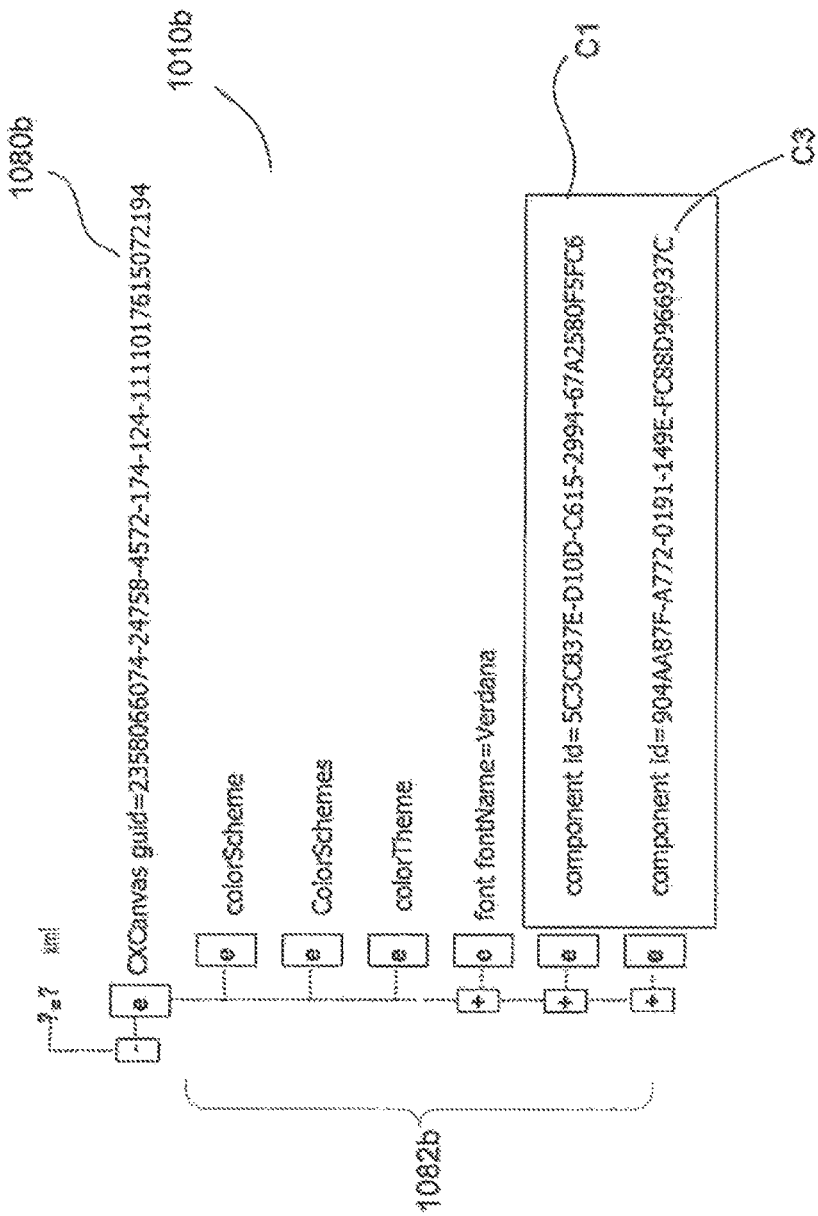

As for FIGS. 10d-f a second dashboard 1000b and its second metadata and data files 1010b and 1020b are shown. The second dashboard includes first and third components C1 and C3. The first component is a selector component and the third component is a line chart. The metadata file includes a canvas guide 1080b for the second dashboard and entry items 1082b. The entry items include format information of the dashboard and components C1 and C3. The data file includes header information 1072b and 1074b for rows and columns. The data of the second dashboard is provided in a sheet 1090b of the second data file. As illustrated, there is a conflict between the dashboards. The conflict exists in the component his of the dashboards. As shown, the first component id of the first dashboard and the first component id of the second dashboard are the same, presenting a conflict, as reflected in Table 3 below:

TABLE 3

| Item | Conflict |
| --- | --- |
| Component id | Yes |
| Metadata | No |
| Data | No |

Although there is a conflict between two components, such as the same component id, there is are no other conflicts, such as in the settings in the metadata files or data sheet names in the data files. In this scenario, the dashboards will be merged.

Figure 10G:
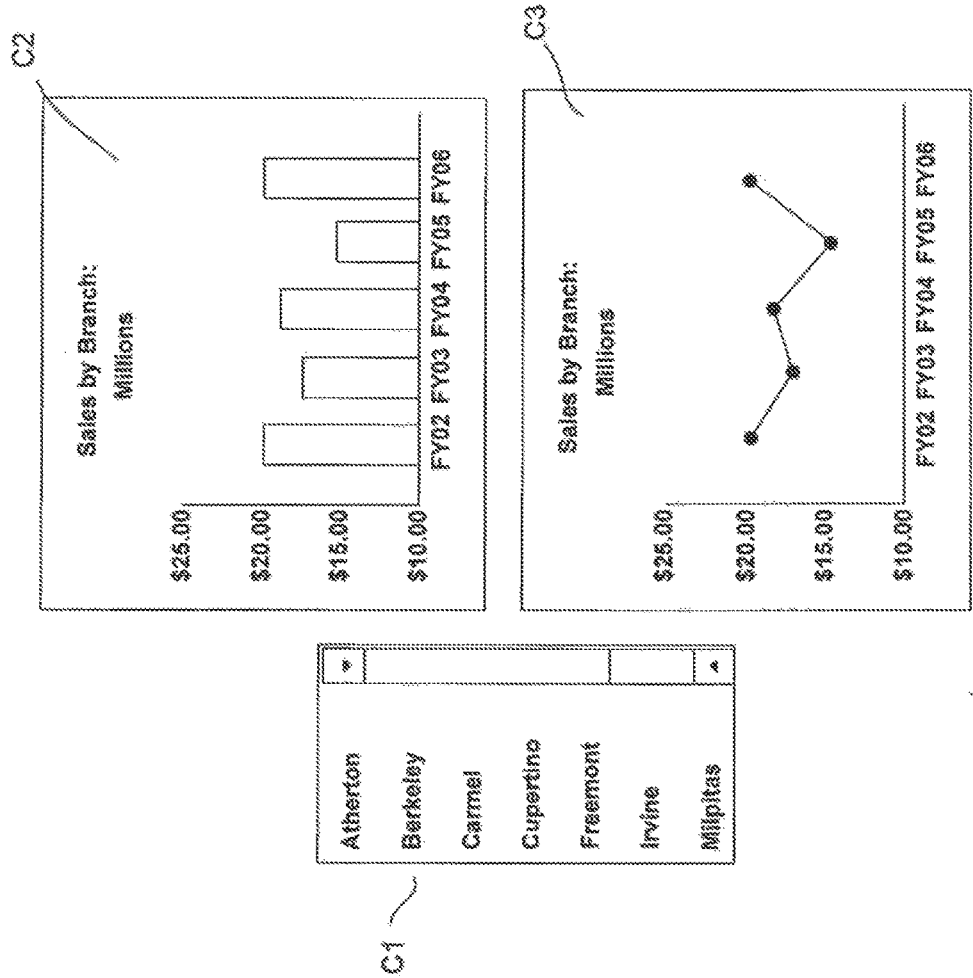

FIG. 10g-i show the resulting merged dashboard 1001c and its corresponding merged metadata and data files 1010c and 1020c. Since the first components of the first and second dashboards are the same as well as their data, only one C1 will be included in the merged dashboard. For example, the user may select one of the dashboards as the base dashboard. The metadata conflict, which in this case is component id of C1, of the non-base dashboard will be ignored or not included in the merged metadata dashboard file.

Figure 11A:
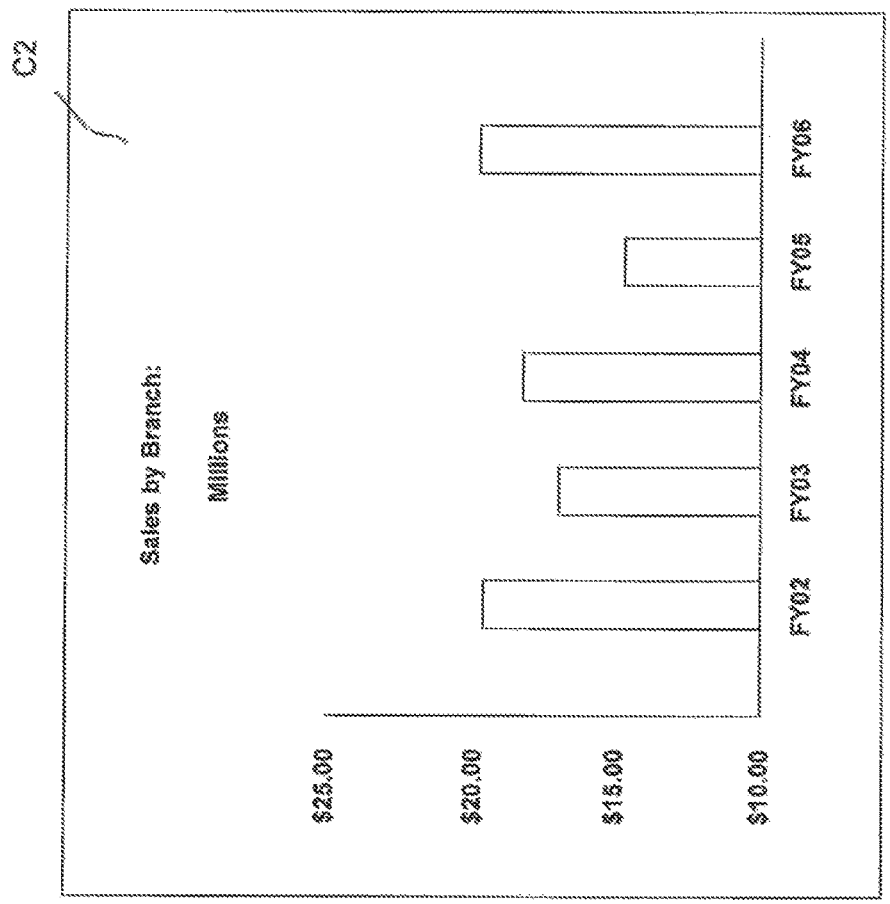
Figure 11A:
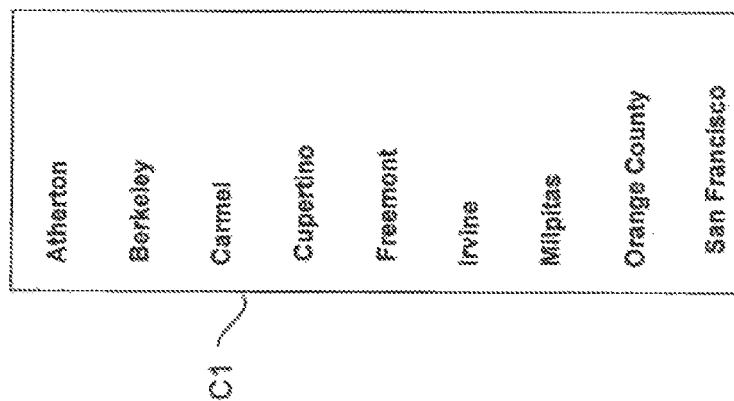
Figure 11C:
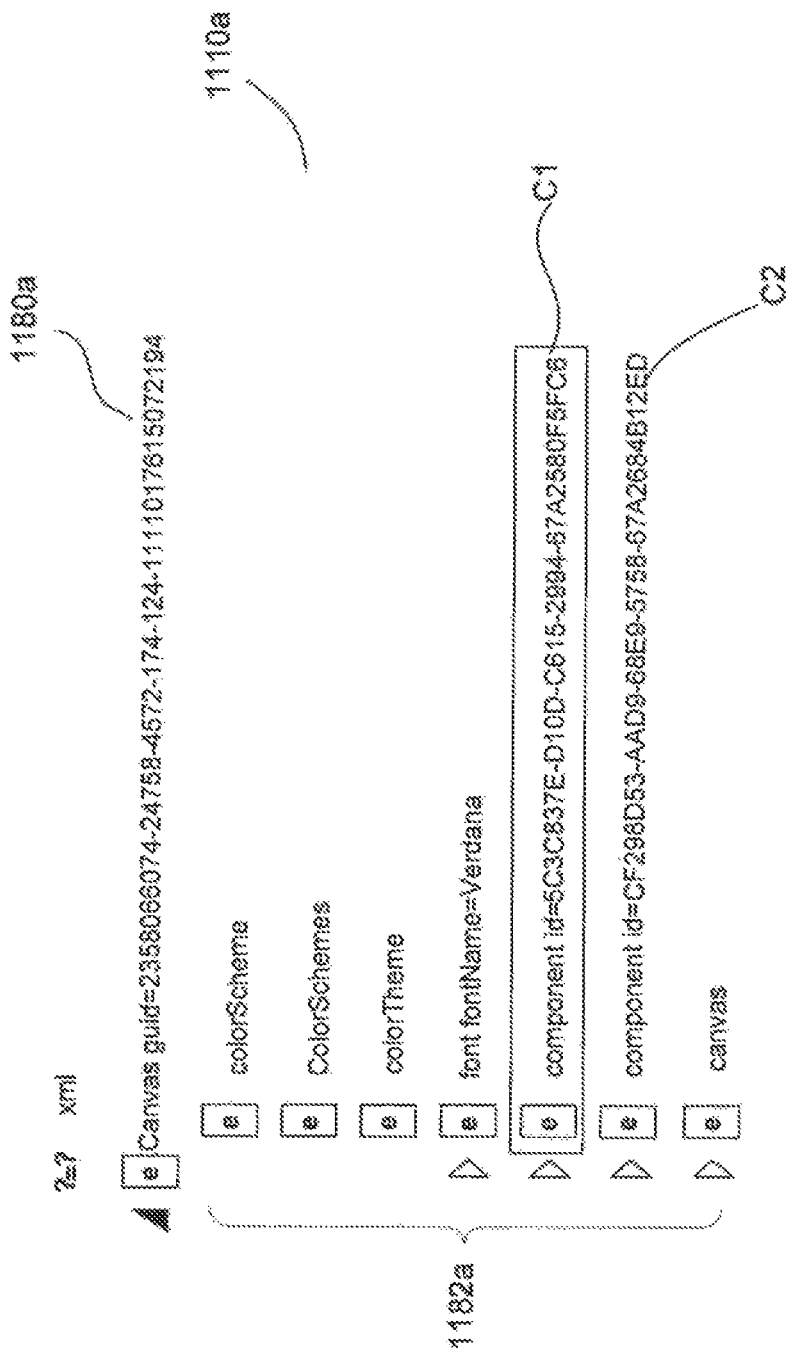

FIGS. 11a-i show another example of a process of merging first and second dashboards. A first dashboard 1100a and its corresponding first metadata and data files 1110a and 1120a are shown in FIGS. 11a-c. The first dashboard includes first and second components C1 and C2. The first component is a selector and the second component is a bar chart. The metadata file includes a canvas grid 1180a for the first dashboard and entry items 1182a. The entry items include format information of the dashboard and components C1 and C2. The data file includes header information 1172a and 1174a for rows and columns. The data of the first dashboard is provided in a sheet 1190a of the first data file.

Figure 11D:
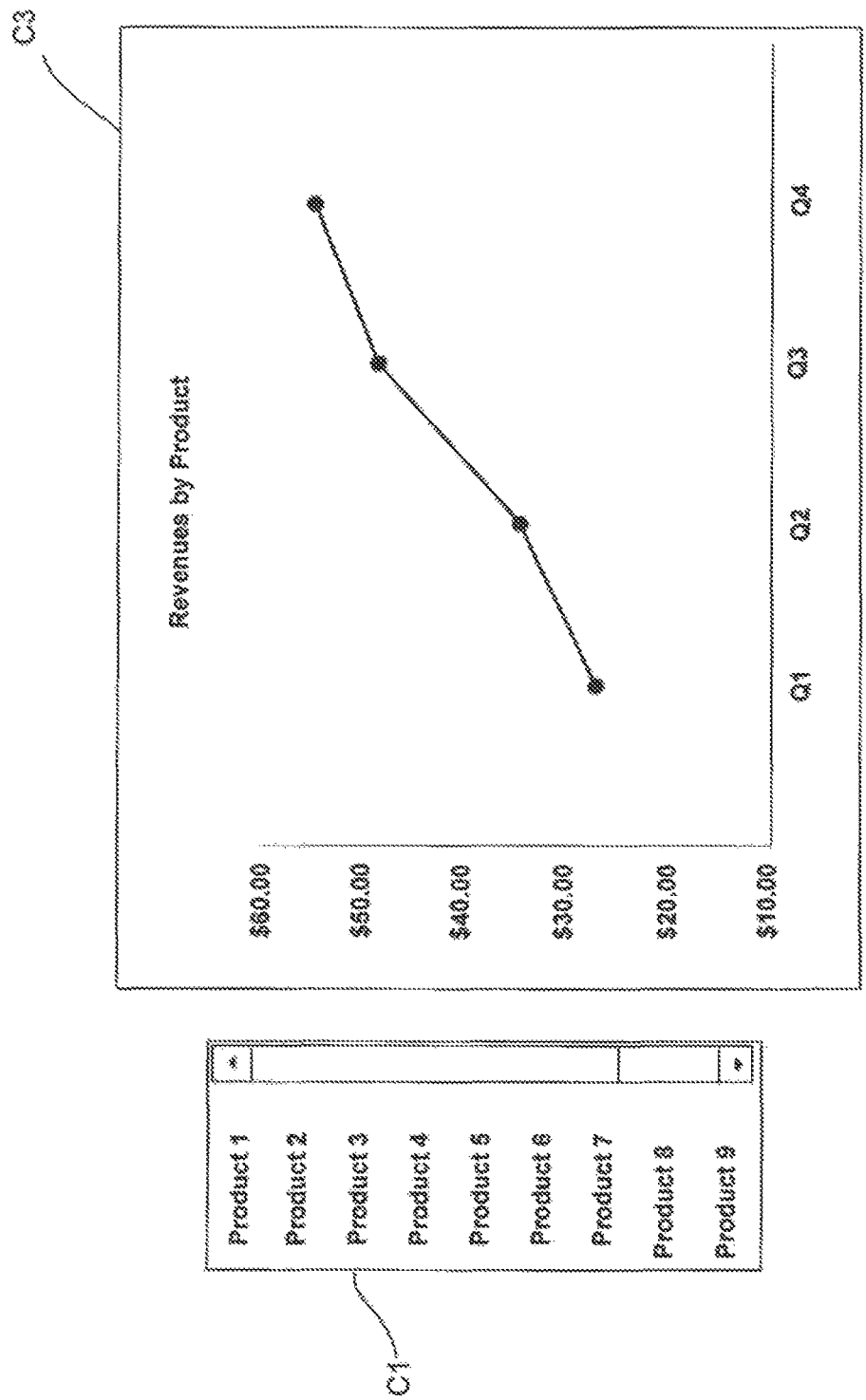
Figure 11F:
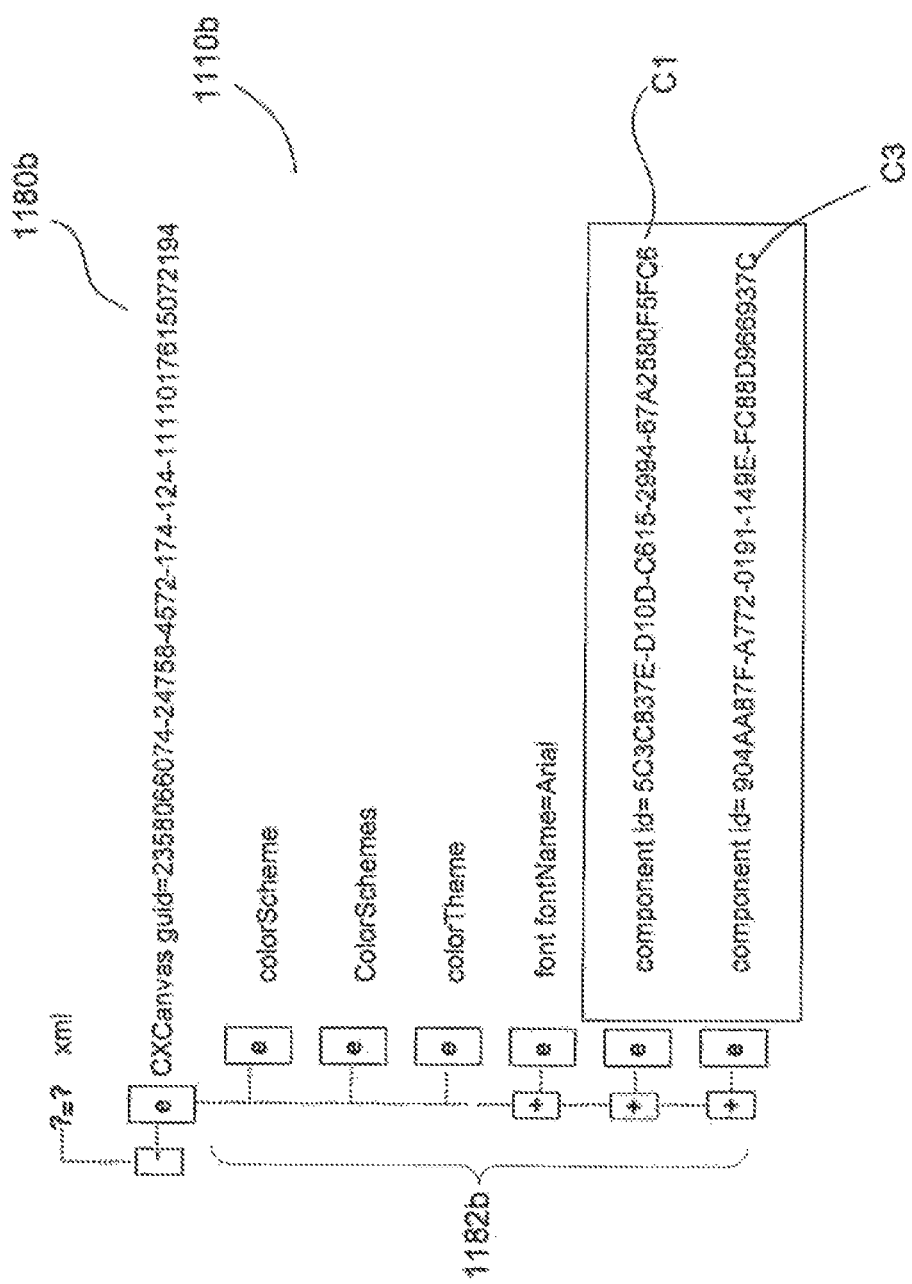

As for FIGS. 11d-f, a second dashboard 1100b and its second metadata and data files 1110b and 1120b are shown. The second dashboard includes first and third components C1 and C3. The first component is a selector component and the third component is a line chart. The metadata file includes a canvas guide 1180b for the second dashboard and entry items 1182b. The entry items include format information of the dashboard and components C1 and C3. The data file includes header information 1172b and 1174b for rows and columns. The data of the second dashboard is provided in a sheet 1190*b* of the second data file.

As illustrated, there is a conflict between the dashboards. The conflict exists in the component ids of the dashboards as well as the binding data in the data files. As shown, the first component id of the first dashboard and the first component id of the second dashboard are the same. However, the data for these components are different. In the case of C1 of the first dashboard, it relates to revenues of branches in Northern California while C1 of the second dashboard relates to revenues of products. As such, conflicts are present in the component id and data, as reflected in Table 4 below:

TABLE 4

| Item | conflict |
|---|---|
| Component id | Yes |
| Metadata | No |
| Data | Yes |

Figure 11G:
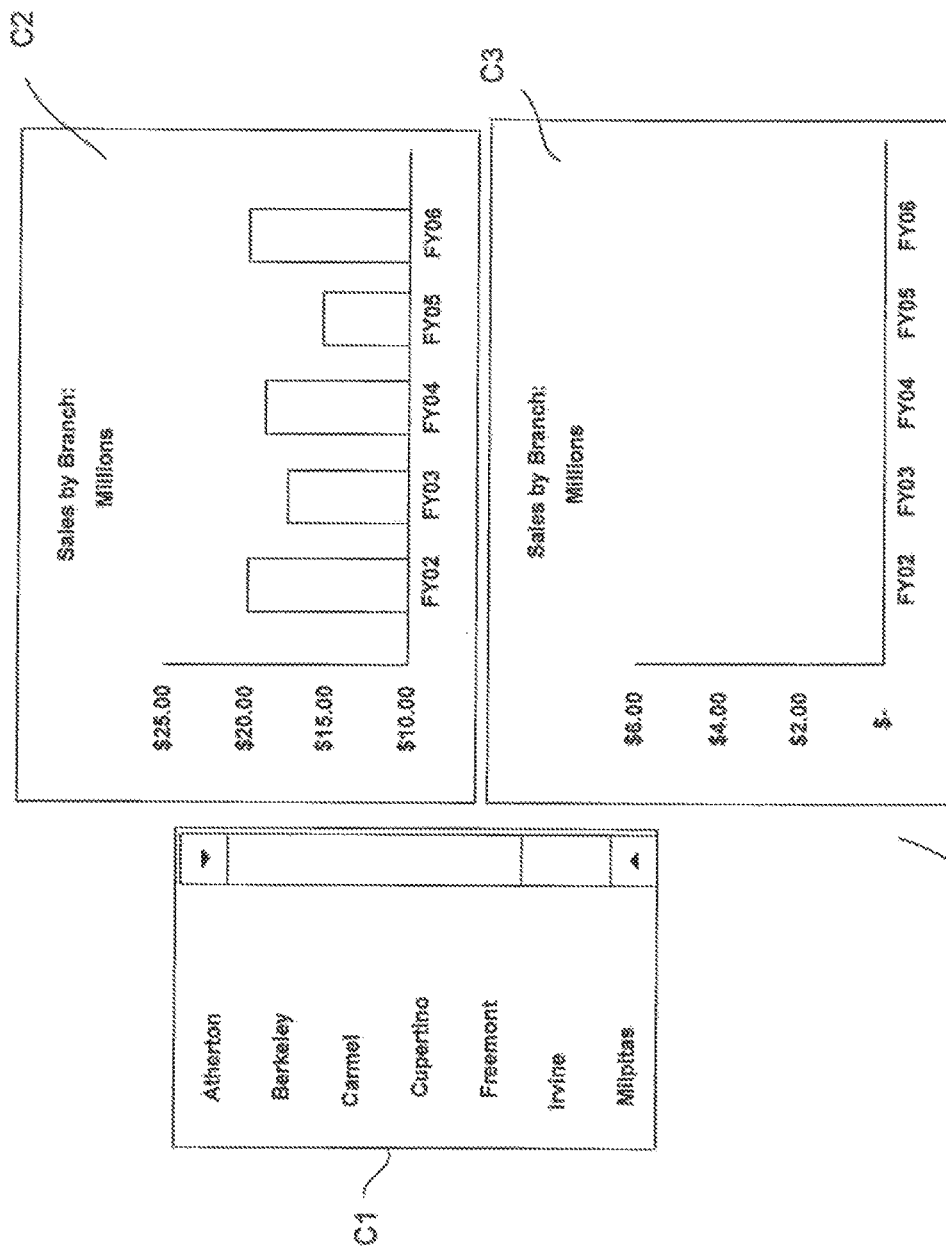
Figure 11H:
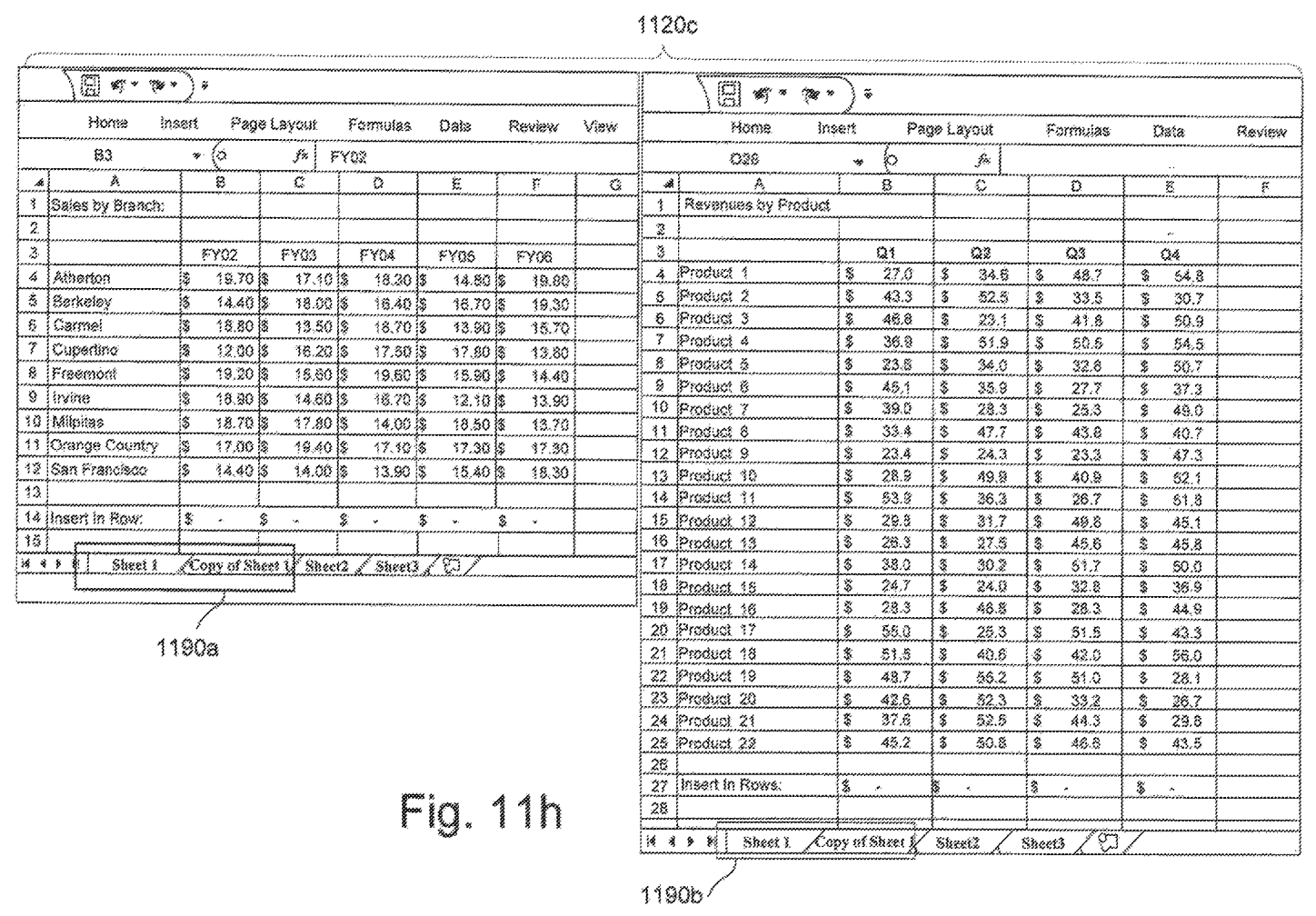
Figure 11I:
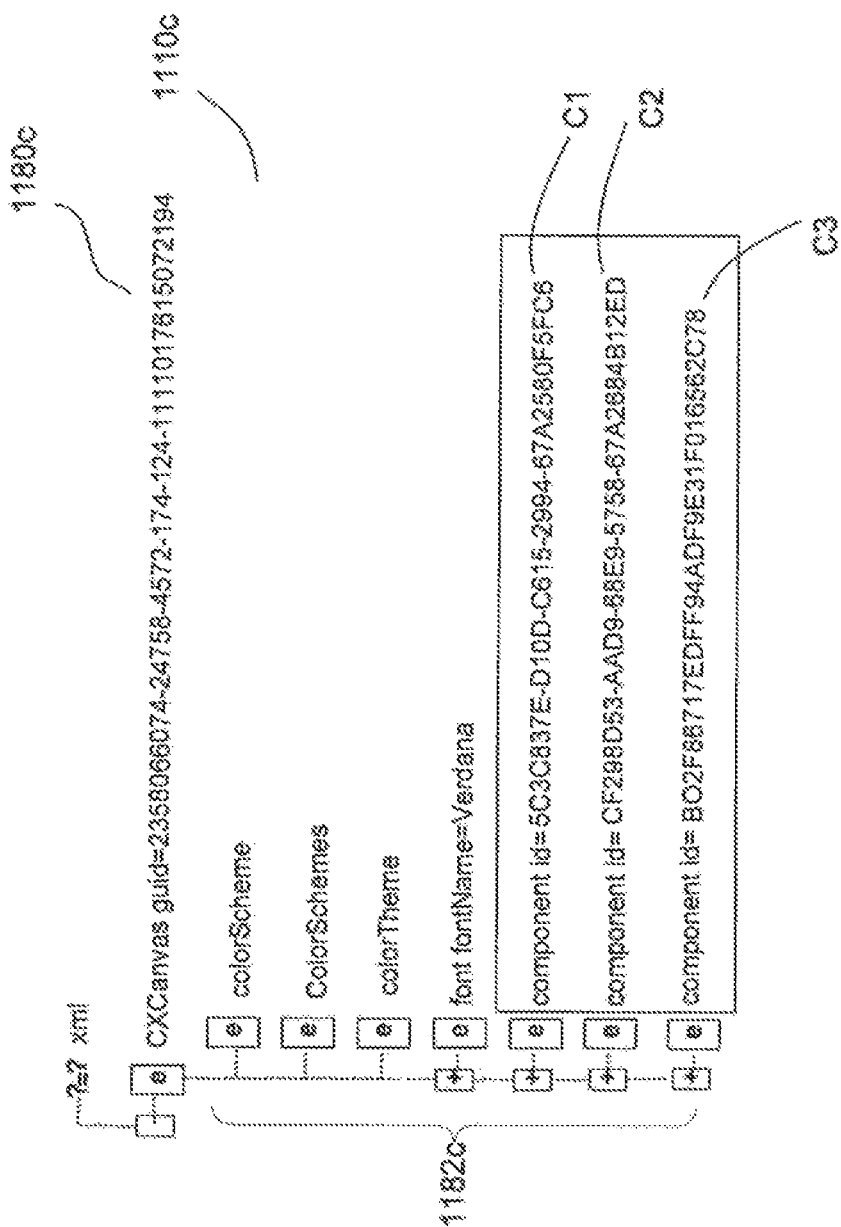

In this scenario, the metadata and data conflicts are resolved manually. For example, the DM application requests the user to select one of the dashboards as the base dashboard. FIGS. 11*g-i* show a merged dashboard 1100*c* with its corresponding metadata and data files 1110*c* and 1120*c*. The merged dashboard, as shown, reflects the first dashboard as the base dashboard. For example, the C1 of the non-base dashboard is not included in the merged metadata file. As for the data, the data of the non-based dashboard is only copied into the merged dashboard data file, but not bound. This results in C3 being displayed without its data.

FIGS. 12*a-i* show another example of a process of merging first and second dashboards. A first dashboard 1200*a* and its corresponding first metadata and data files 1210*a* and 1220*a* are shown in FIGS. 1.2*a-c*. The first dashboard includes first and second components C1 and C2. The first component is a selector and the second component is a bar chart. The metadata file includes a canvas guide 1280*a* for the first dashboard and entry items 1282*a*. The entry items include format information of the dashboard and the component C1. The data file includes header information 1274*a* and 1272*a* for rows and columns. The data of the first dashboard is provided in a sheet 1290*a* of the first data file.

Figure 12A:
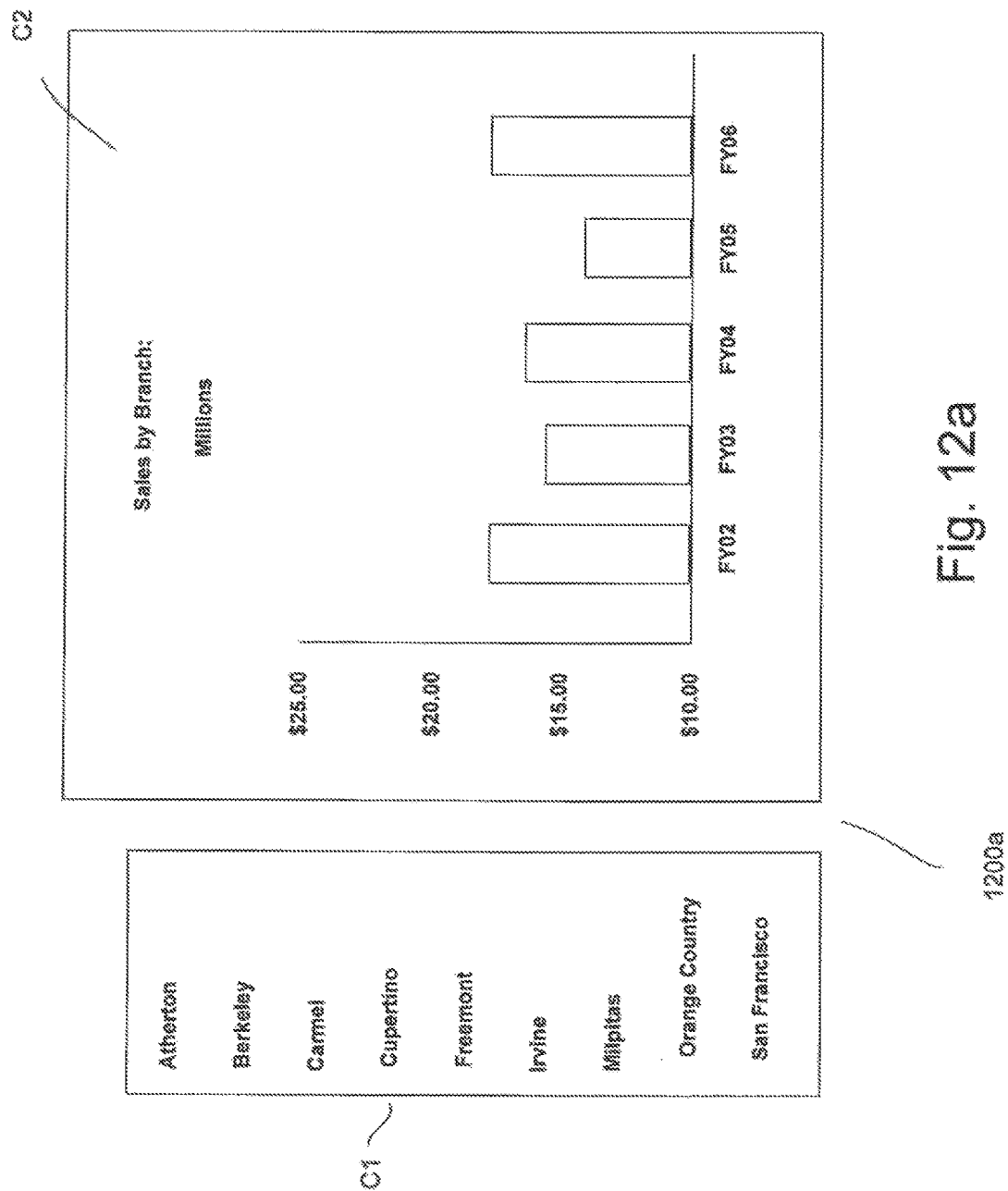
Figure 12C:
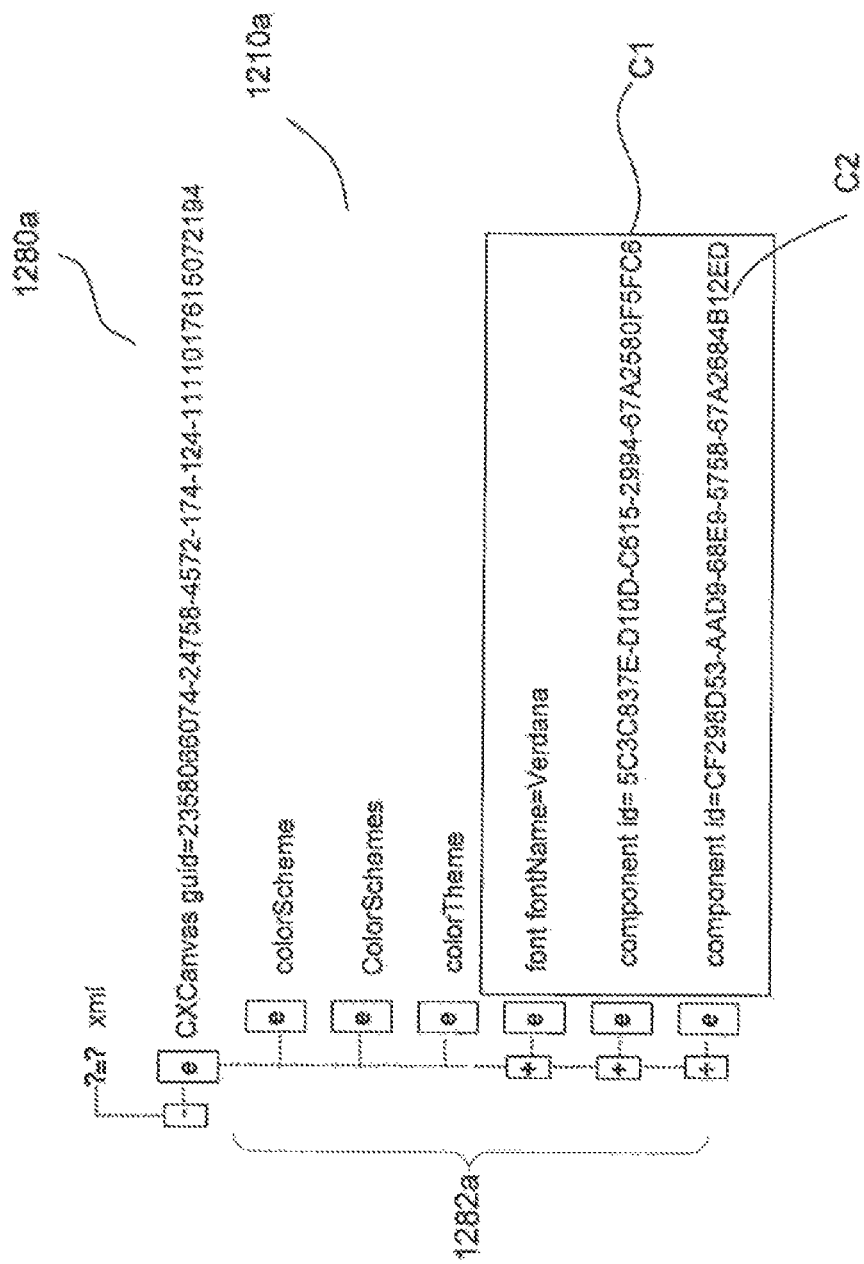
Figure 12D:
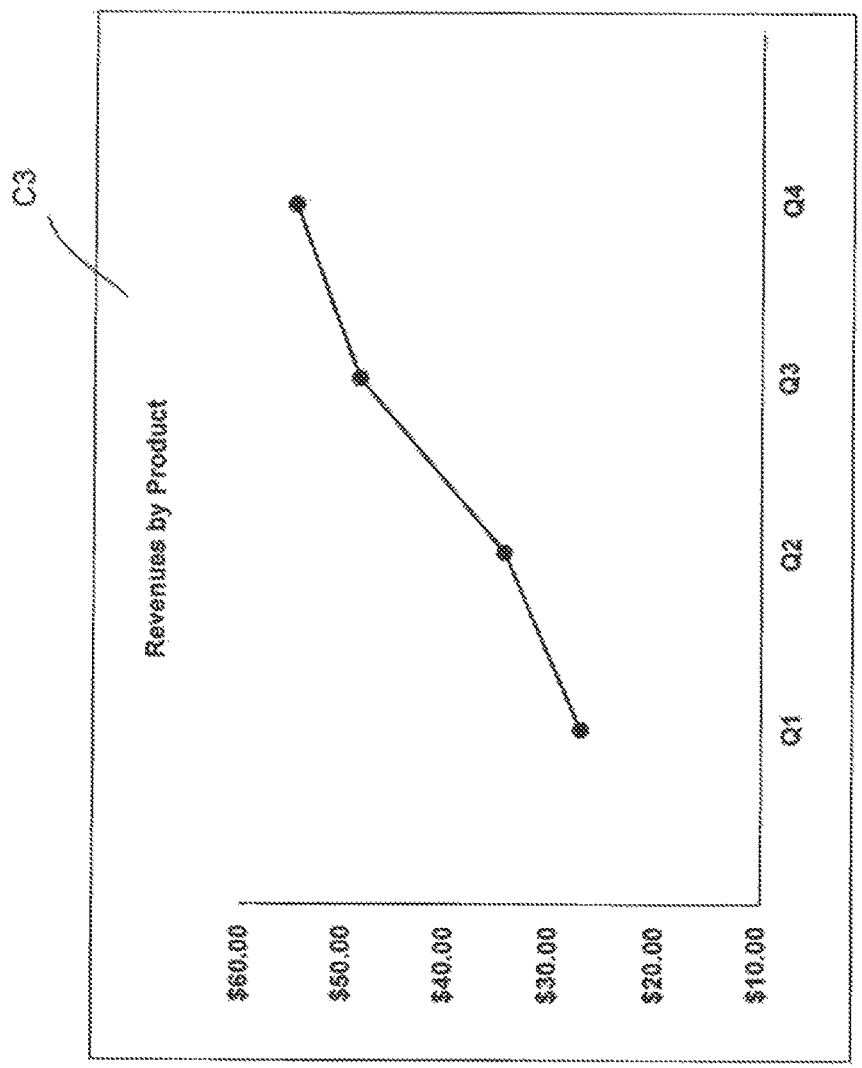
Figure 12E:
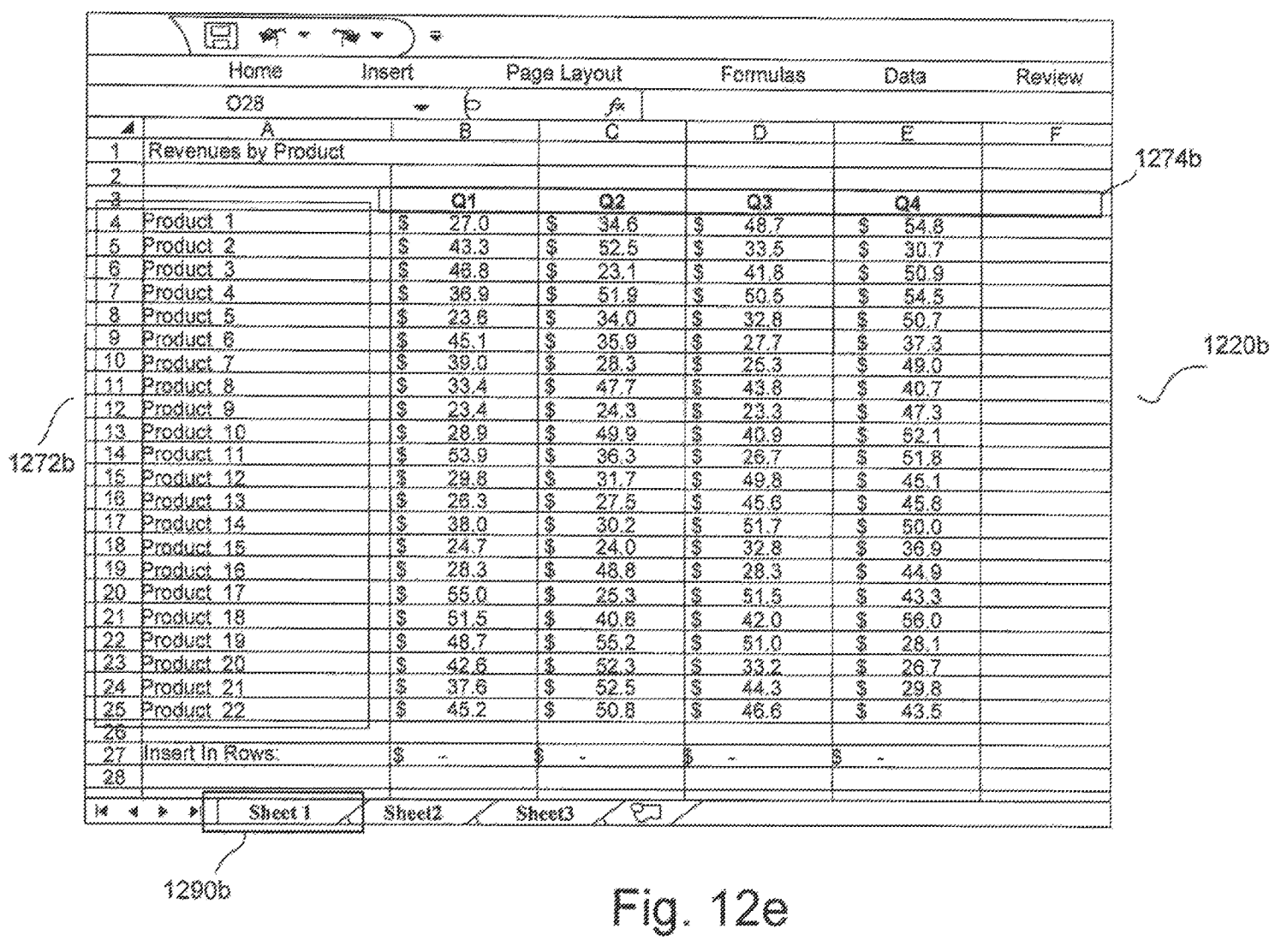
Figure 12F:
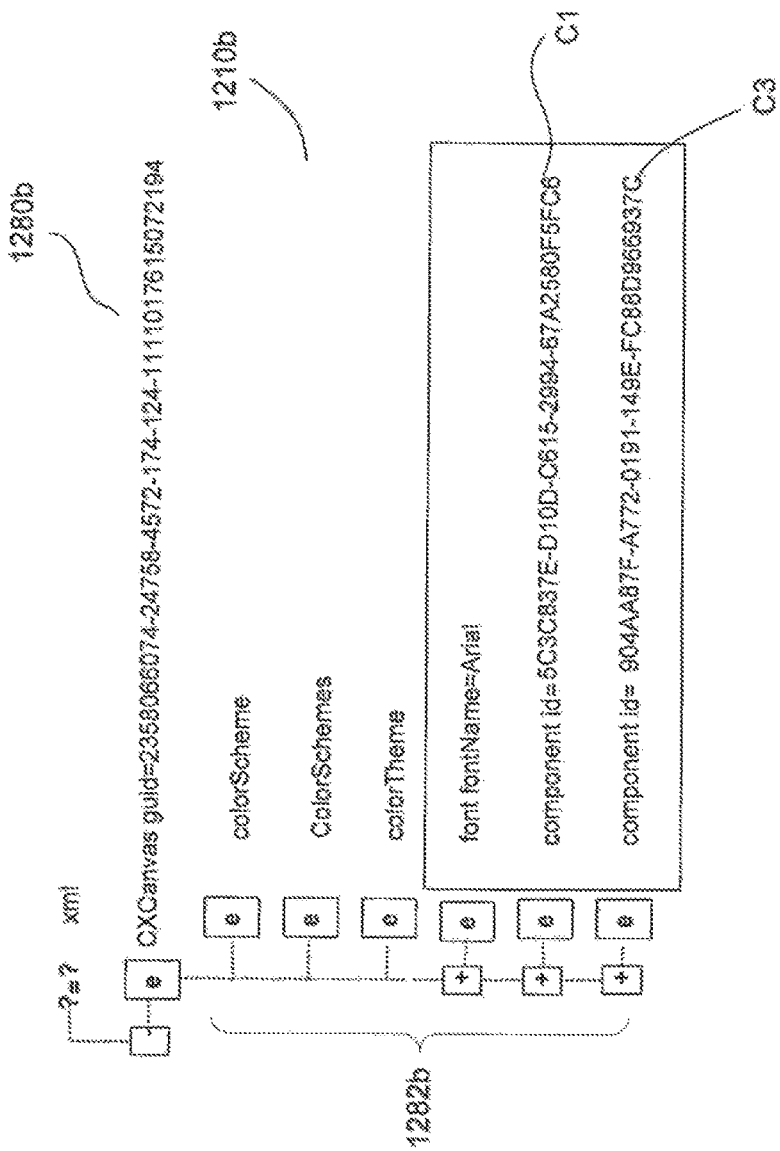

As for FIGS. 12*d-f*, a second dashboard 1200*b* and its second metadata and data files 1210*b* and 1220*b* are shown. The second dashboard includes first and third components C1 and C3. The first component is a selector and the third component is a line chart. The metadata file includes a canvas guide 1280*b* for the second dashboard and entry items 1282*b*. The entry items include format information of the dashboard and components C1 and C3. The data file includes header information 1272*b* and 1274*b* for rows and columns. The data of the first dashboard is provided in a sheet 1290*b* of the second data file.

As illustrated, there is a conflict between the dashboards. The conflict exists in the component ids of the dashboards, settings of the dashboards as well as data overlap and same data sheet names. As such, conflicts are present in the component id, metadata and data, as reflected in Table 5 below:

TABLE 5

| Item | Conflict |
|---|---|
| Component id | Yes |
| Metadata | Yes |
| Data | Yes |

Figure 12G:
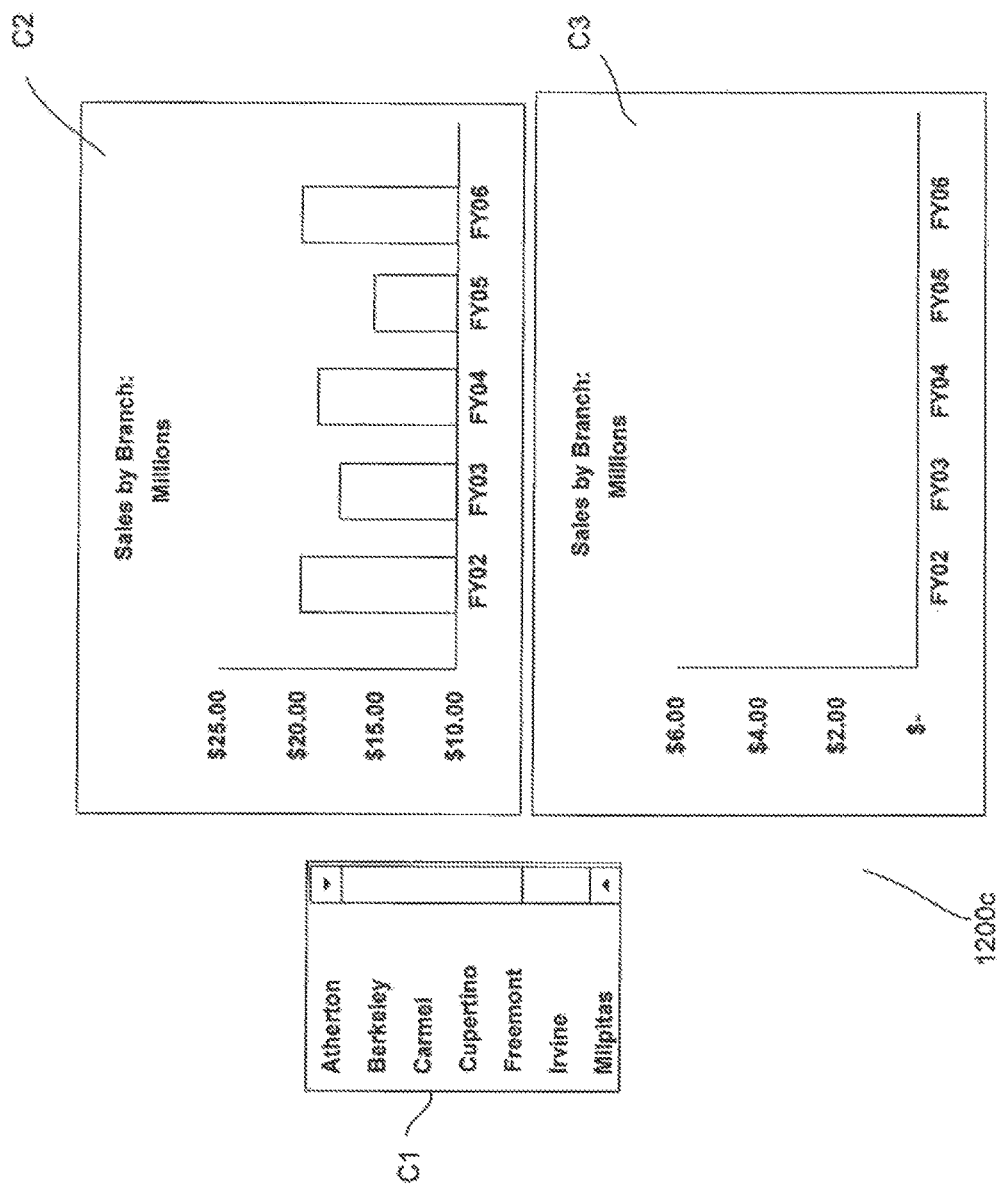
Figure 12H:
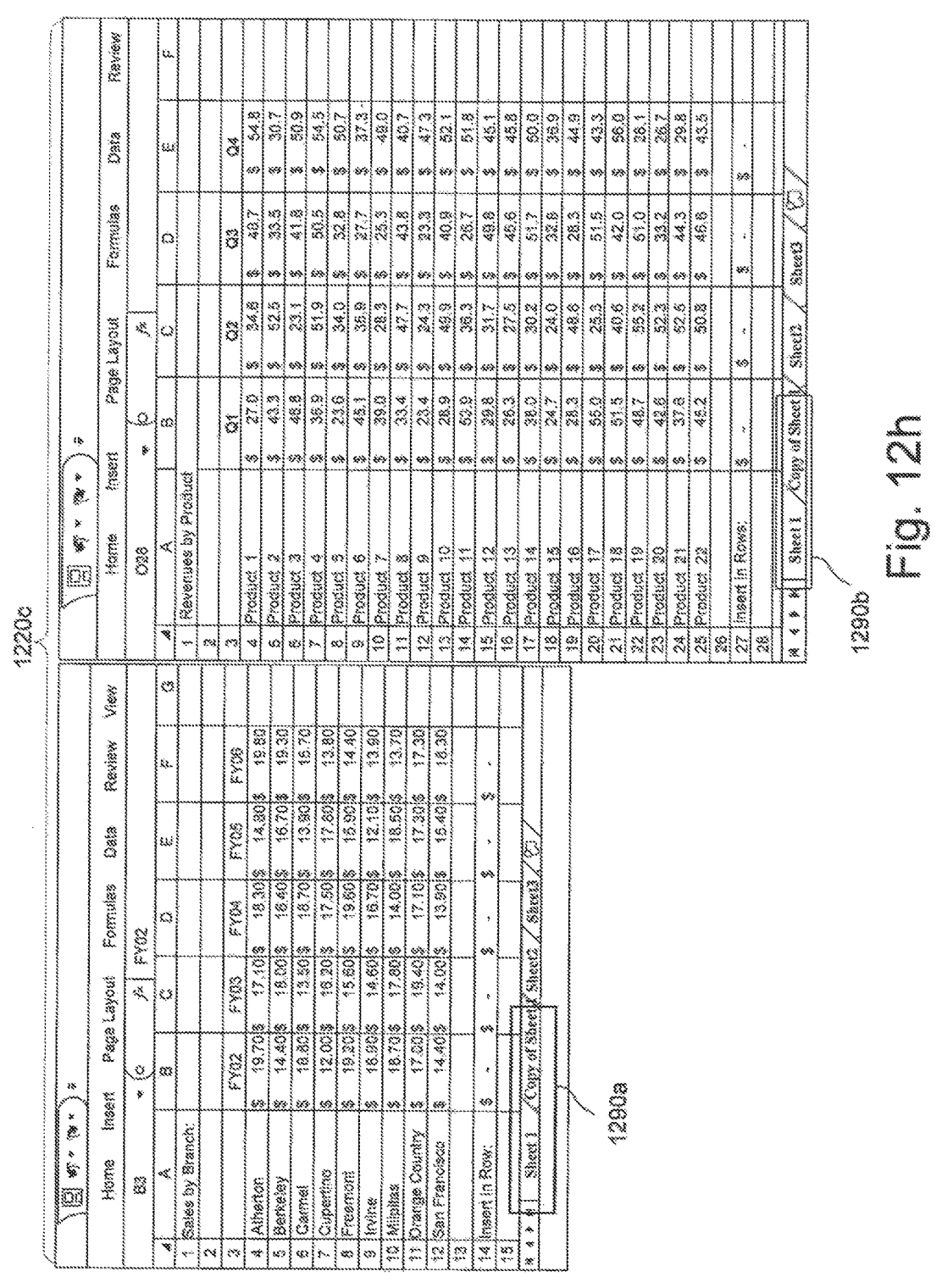
Figure 12I:
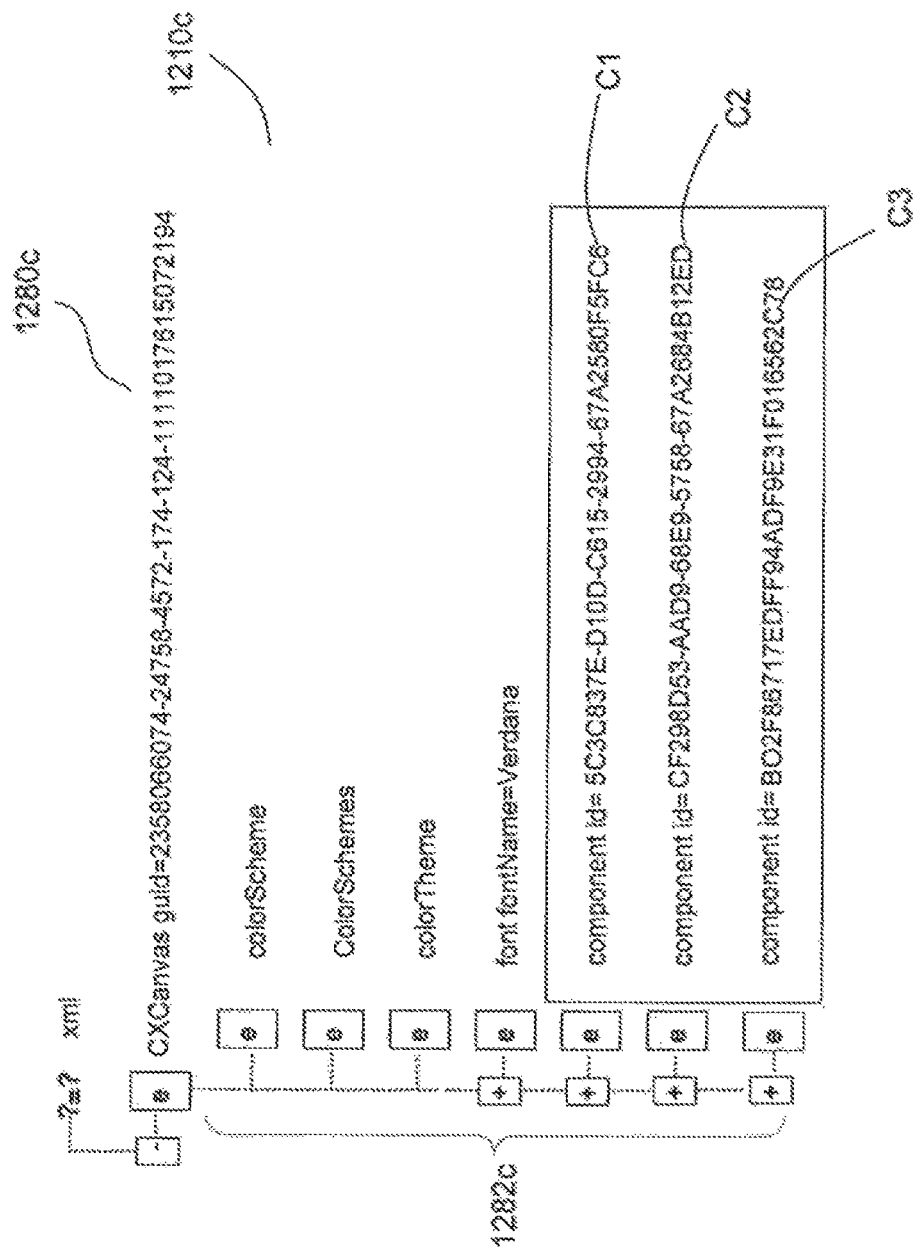

In this scenario, the metadata and data conflicts are resolved manually. For example, the DM application requests the user to select one of the dashboards as the base dashboard. FIGS. 12*g-i* show a merged dashboard 1200*c* with its corresponding metadata and data files 1210*c* and 1220*c*. The merged dashboard, as shown, reflects the first dashboard as the base dashboard. For example, the C1 of the non-base dashboard is not included in the merged metadata file. Also, the merged dashboard will use the format of the base dashboard. As for the data, the data of the non-based dashboard is only copied into the merged dashboard data file, but not bound. This results in C3 being displayed without its data.

The DM application may be embodied as an application. For example, the DM application may be embodied as a software application. The application may be integrated into an existing software application, such as a dashboard design application, as an add-on or plug-in to an existing application, or as a separate application. The existing software application may be a suite of software applications. The source code of the DM application system may be compiled to create an executable code. The codes of the DM application, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer implemented method of non-sequential collaboration in designing a dashboard by different designers comprising:
    providing, to a dashboard merger,
        a first dashboard file of a first dashboard from a first designer, the first dashboard file containing first components of the first dashboard, the first dashboard displays the first components for visualizing first data, the first dashboard file includes a first dashboard metadata file and a first dashboard data file, wherein
            the first dashboard metadata file comprises first metadata, the first metadata includes information of the first components of the first dashboard, and
            the first dashboard data file comprises the first data bound to the first components of the first dashboard, and
        a second dashboard file of a second dashboard from a second designer, the second dashboard file containing second components of the second dashboard, the second dashboard displays the second components for visualizing second data, the second dashboard file includes a second dashboard metadata file and a second dashboard data file, wherein
            the second dashboard metadata file comprises second metadata, the second metadata includes information of the second components of the second dashboard, and the second dashboard data file comprises the second data bound to the second components of the second dashboard;

performing conflict analysis on the first and second dashboard files, including the first dashboard metadata and data files and the second dashboard metadata and data files;

in the event no conflicts are detected, merging the first and second dashboard files to form a merged dashboard file of a merged dashboard;

in the event conflicts are detected, resolving the conflicts and merging the first and second dashboard files to form a merged dashboard file of a merged dashboard;

wherein merging the first and second dashboard files to form the merged dashboard file comprises
combining the first and second dashboard metadata files together to form a merged metadata file,
combining the first and second dashboard data files together to form a merged data file, and
the merged metadata file and the merged data file; and wherein the dashboard merger facilitates non-sequential collaboration by the different designers in designing a dashboard.

2. The method of claim 1 wherein the first and second metadata files are in .xml format files and the first and second data files are in xldoc format files.

3. The method of claim 1 wherein the conflict analysis comprises:
comparing the first and second dashboard metadata files for any metadata conflicts;
resolving the metadata conflicts between the first and second metadata files in the event metadata conflicts are detected;
merging the metadata of the first and second dashboard metadata files after resolving the metadata conflicts when metadata conflicts are detected or when no metadata conflicts are detected;
comparing the first and second dashboard data files for any data conflicts;
resolving the data conflicts between the first and second data files in the event data conflicts are detected; and
merging the data of the first and second dashboard data files after resolving the data conflicts when data conflicts are detected or when no data conflicts are detected.

4. The method of claim 3 wherein the first and second metadata files are compared prior to comparing the first and second dashboard data files.

5. The method of claim 3 wherein the resolving conflicts comprises an automatic mode of conflict resolution or a manual mode of conflict resolution.

6. The method of claim 5 wherein the metadata conflicts are resolved in the manual mode and the data conflicts are resolved in the manual or the automatic mode.

7. The method of claim 6 wherein a user may select whether the data conflicts are resolved in the manual or the automatic mode.

8. The method of claim 7 wherein the data conflicts are effectively resolved in the manual mode when there are metadata conflicts, regardless of whether the user has selected the automatic or manual mode.

9. The method of claim 3 wherein the metadata conflicts are resolved by:
requesting a user to select a dashboard from the first or second dashboard to be a base dashboard, wherein a non-selected dashboard from the first or second dashboard is a non-base dashboard;
metadata which are not in conflict are used; and
for metadata which are in conflict, the metadata of the base dashboard is used and the metadata of the non-base dashboard is not used.

10. The method of claim 9 wherein:
the metadata of the base dashboard is copied into a merged metadata file;
the metadata of the non-base dashboard which are not in conflict are copied into the merged metadata file; and
the metadata of the non-base dashboard which are in conflict are not copied into the merged metadata file.

11. The method of claim 6 wherein data conflict resolution in the automatic mode comprises:
determining for data conflicts between the first and second dashboard data files;
merging the data of the first and second dashboard data files into a merged dashboard data file when no data conflicts are detected; and
merging and updating binding of the data from the first and second dashboard data files into a merged dashboard data file in the event data conflicts are detected.

12. The method of claim 6 wherein data conflicts resolution in the manual mode comprises:
requesting a user to select a dashboard from the first or second dashboard to be a base dashboard, wherein a non-selected dashboard from the first or second dashboard is a non-base dashboard;
data of the base dashboard are used in the merged dashboard; and
for data which are in conflict, the data of the base dashboard is used and the data of the non-base dashboard is not used.

13. The method of claim 12 wherein:
data of the base dashboard are merged into a merged dashboard data file; and
data of the non-base dashboard which are in conflict are copied into the merged dashboard data file but are not used.

14. A non-transitory computer-readable medium having stored thereon program code, the program code executable by a computer to perform a method for collaboration in designing a dashboard by different designers comprising:
selecting a first dashboard file of a first dashboard from a first designer, the first dashboard file containing first components of the first dashboard, the first dashboard displays the first components for visualizing first data, the first dashboard file includes a first dashboard metadata file and a first dashboard data file, wherein
the first dashboard metadata file comprises first metadata, the first metadata includes information of the first components of the first dashboard, and
the first dashboard data file comprises the first data bound to the first components of the first dashboard;
selecting a second dashboard file of a second dashboard from a second designer, the second dashboard file containing second components of the second dashboard, the second dashboard displays the second components for visualizing second data, the second dashboard file includes a second dashboard metadata file and a second dashboard data file, wherein
the second dashboard metadata file comprises second metadata, the second metadata includes information of the second components of the second dashboard, and
the second dashboard data file comprises the second data bound to the second components of the second dashboard;

performing conflict analysis on the first and second dashboard files, wherein the conflict analysis comprises
analyzing the first and second dashboard metadata files, and
analyzing the first and second dashboard data files;
when no conflicts are detected, merging the first and second dashboard files to form a merged dashboard file of a merged dashboard;
when conflicts are detected, resolving the conflicts and merging the first and second dashboard files to form a merged dashboard file of a merged dashboard;
wherein merging the first and second dashboard files to form the merged dashboard file comprises
combining the first and second dashboard metadata files together to form a merged metadata file,
combining the first and second dashboard data files together to form a merged data file, and
the merged metadata file and the merged data file; and
wherein the method facilitates non-sequential collaboration by the different designers in designing a dashboard.

15. A system for designing dashboards comprising:
a data source for storing dashboard files of dashboards, wherein the data source includes
a first dashboard file of a first dashboard from a first designer, the first dashboard file containing first components of the first dashboard, the first dashboard displays the first components for visualizing first data, the first dashboard file includes a first dashboard metadata file and a first dashboard data file, wherein
the first dashboard metadata file comprises first metadata, the first metadata includes information of the first components of the first dashboard, and
the first dashboard data file comprises the first data bound to the first components of the first dashboard, and
a second dashboard file of a second dashboard from a second designer, the second dashboard file containing second components of the second dashboard, the second dashboard displays the second components for visualizing second data, the second dashboard file includes a second dashboard metadata file and a second dashboard data file, wherein
the second dashboard metadata file comprises second metadata, the second metadata includes information of the second components of the second dashboard, and
the second dashboard data file comprises the second data bound to the second components of the second dashboard;
a processor that implements a dashboard design module, wherein the processor is configured to execute processing including,
selecting the first and second dashboard files of the first and second dashboards from the data source,
performing conflict analysis on the first and second dashboard files,
in the event no conflicts are detected, merging the first and second dashboard files to form a merged dashboard file,
in the event conflicts are detected, resolving the conflicts and merging the first and second dashboard files to form a merged dashboard file,
wherein merging the first and second dashboard files to form the merged dashboard file comprises
combining the first and second dashboard metadata files together to form a merged metadata file, and
combining the first and second dashboard data files together to form a merged data file, and
the merged metadata file and the merged data file; and
wherein the dashboard design module facilitates non-sequential collaboration by different designers in designing a dashboard.

16. The system of claim 15 wherein the first and second metadata files are in .xml format files and the first and second data files are in xldoc format files.

17. The system of claim 16 wherein the conflict analysis comprises:
comparing the first and second metadata files for any metadata conflicts;
resolving the metadata conflicts between the first and second metadata files in the event metadata conflicts are detected;
merging the metadata of the first and second dashboard metadata files after resolving the metadata conflicts when metadata conflicts are detected or when no metadata conflicts are detected;
comparing the data files of the first and second dashboard data files for any data conflicts;
resolving the data conflicts between the first and second data files in the event data conflicts are detected; and
merging the data of the first and second dashboard data files after resolving the data conflicts when data conflicts are detected or when no data conflicts are detected.

18. The system of claim 15 wherein the resolving conflicts comprises an automatic mode of conflict resolution or a manual mode of conflict resolution.

19. The non-transitory computer-readable medium of claim 14 wherein the conflict analysis comprises:
comparing the first and second dashboard metadata files for any metadata conflicts;
resolving the metadata conflicts between the first and second metadata files in the event metadata conflicts are detected;
merging the metadata of the first and second dashboard metadata files after resolving the metadata conflicts when metadata conflicts are detected or when no metadata conflicts are detected;
comparing the first and second dashboard data files for any data conflicts;
resolving the data conflicts between the first and second data files in the event data conflicts are detected; and
merging the data of the first and second dashboard data files after resolving the data conflicts when data conflicts are detected or when no data conflicts are detected.

20. The non-transitory computer-readable medium of claim 14 wherein a user may select whether the data conflicts are resolved in a manual or automatic mode.

* * * * *